US007507268B2

(12) United States Patent
Rosenflanz

(10) Patent No.: US 7,507,268 B2
(45) Date of Patent: *Mar. 24, 2009

(54) $AL_2O_3$-$Y_2O_3$-$ZRO_2$/$HFO_2$ MATERIALS, AND METHODS OF MAKING AND USING THE SAME

(75) Inventor: Anatoly Z. Rosenflanz, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 557 days.

This patent is subject to a terminal disclaimer.

(21) Appl. No.: 10/211,638

(22) Filed: Aug. 2, 2002

(65) Prior Publication Data

US 2003/0110708 A1    Jun. 19, 2003

Related U.S. Application Data

(63) Continuation-in-part of application No. 09/922,530, filed on Aug. 2, 2001, now abandoned.

(51) Int. Cl.
    *C01F 7/04*    (2006.01)
(52) U.S. Cl. .............................. 51/309; 65/21.1; 65/66; 428/332; 428/426; 501/6; 501/17; 501/27; 501/73; 501/77; 501/78; 501/103; 501/126; 501/127; 501/153
(58) Field of Classification Search ................. 428/426, 428/332; 501/6, 27, 17, 73, 77, 78, 103, 501/126, 127, 153; 51/309; 65/21.1, 66
See application file for complete search history.

(56) References Cited

U.S. PATENT DOCUMENTS

| 659,926 | A | 10/1900 | Jacobs |
| 906,339 | A | 12/1908 | Tone |
| 960,712 | A | 6/1910 | Saunders |
| 1,037,999 | A | 9/1912 | Saunders |
| 1,107,011 | A | 8/1914 | Allen |
| 1,149,064 | A | 8/1915 | Kalmus |
| 1,161,620 | A | 11/1915 | Coulter |

(Continued)

FOREIGN PATENT DOCUMENTS

AT            333146         10/1976

(Continued)

OTHER PUBLICATIONS

Imakoa, Minoru et al., "Refractive Index and Abbe's Number of Glass of Lanthanum Borate System", Journal Ceramic Assoc. Japan, vol. 70, No. 5, (1962), pp. 115.

(Continued)

*Primary Examiner*—A. A. Turner
(74) *Attorney, Agent, or Firm*—Gregory D. Allen

(57) ABSTRACT

$Al_2O_3$—$Y_2O_3$—$ZrO_2$/$HfO_2$ ceramics (including glasses, crystalline ceramics, and glass-ceramics) and methods of making the same. Ceramics according to the present invention can be made, formed as, or converted into glass beads, articles (e.g., plates), fibers, particles, and thin coatings. The particles and fibers are useful, for example, as thermal insulation, filler, or reinforcing material in composites (e.g., ceramic, metal, or polymeric matrix composites). The thin coatings can be useful, for example, as protective coatings in applications involving wear, as well as for thermal management. Certain ceramic particles according to the present invention can be are particularly useful as abrasive particles.

80 Claims, 3 Drawing Sheets

U.S. PATENT DOCUMENTS

| | | |
|---|---|---|
| 1,192,709 A | 7/1916 | Tone |
| 1,240,490 A | 9/1917 | Saunders et al. |
| 1,247,337 A | 11/1917 | Saunders et al. |
| 1,257,356 A | 2/1918 | Hutchins |
| 1,263,708 A | 4/1918 | Saunders et al. |
| 1,263,709 A | 4/1918 | Saunders et al. |
| 1,263,710 A | 4/1918 | Saunders et al. |
| 1,268,532 A | 6/1918 | Allen |
| 1,268,533 A | 6/1918 | Allen |
| 1,314,061 A | 8/1919 | Harrison |
| 1,339,344 A | 5/1920 | Hutchins |
| 1,402,714 A | 1/1922 | Brockbank |
| 1,448,586 A | 3/1923 | Allen |
| 1,910,444 A | 5/1933 | Nicholson |
| 2,000,857 A | 5/1935 | Masin |
| 2,206,081 A | 7/1940 | Eberlin |
| 2,424,645 A | 7/1947 | Baumann, Jr. et al. |
| 2,618,567 A | 11/1952 | Comstock, III |
| 2,805,166 A * | 9/1957 | Loffler ........................ 501/64 |
| 2,958,593 A | 11/1960 | Hoover et al. |
| 2,961,296 A | 11/1960 | Fenerty |
| 3,041,156 A | 6/1962 | Rowse et al. |
| 3,141,747 A | 7/1964 | Marshall |
| 3,174,871 A | 3/1965 | Geffcken et al. |
| 3,181,939 A | 5/1965 | Marshall et al. |
| 3,216,794 A | 11/1965 | Roschuk |
| 3,377,660 A | 4/1968 | Marshall et al. |
| 3,498,769 A | 3/1970 | Coes, Jr. |
| 3,519,448 A | 7/1970 | Alper et al. |
| 3,625,717 A | 12/1971 | Grubba et al. |
| 3,635,739 A * | 1/1972 | MacDowell et al. .......... 501/10 |
| 3,637,361 A | 1/1972 | Kita et al. |
| 3,646,713 A | 3/1972 | Marshall et al. |
| 3,650,780 A | 3/1972 | Connelley |
| 3,714,059 A | 1/1973 | Shaw et al. |
| 3,717,583 A | 2/1973 | Shaw et al. |
| 3,726,621 A | 4/1973 | Cichy |
| 3,754,978 A | 8/1973 | Elmer et al. |
| 3,781,172 A | 12/1973 | Pett et al. |
| 3,792,553 A | 2/1974 | Schleifer et al. |
| 3,859,407 A | 1/1975 | Blanding et al. |
| 3,881,282 A | 5/1975 | Watson |
| 3,891,408 A | 6/1975 | Rowse et al. |
| 3,893,826 A | 7/1975 | Quinan et al. |
| 3,916,584 A | 11/1975 | Howard et al. |
| 3,925,603 A | 12/1975 | Plesslinger et al. |
| 3,928,515 A | 12/1975 | Richmond et al. |
| 3,940,276 A | 2/1976 | Wilson |
| 3,947,281 A * | 3/1976 | Bacon ........................ 501/64 |
| 3,973,977 A | 8/1976 | Wilson |
| 3,996,702 A | 12/1976 | Leahy |
| 4,014,122 A * | 3/1977 | Woods ........................ 428/13 |
| 4,035,162 A | 7/1977 | Brothers et al. |
| 4,049,397 A | 9/1977 | Bockstiegel et al. |
| 4,059,417 A | 11/1977 | Ilmaier et al. |
| 4,070,796 A | 1/1978 | Scott |
| 4,073,096 A | 2/1978 | Ueltz et al. |
| 4,111,668 A | 9/1978 | Walker et al. |
| 4,111,707 A | 9/1978 | Komorita et al. |
| 4,126,429 A | 11/1978 | Watson |
| 4,140,494 A | 2/1979 | Coes, Jr. |
| 4,157,898 A | 6/1979 | Walker et al. |
| 4,182,437 A | 1/1980 | Roberts et al. |
| 4,194,887 A | 3/1980 | Ueltz et al. |
| 4,217,264 A | 8/1980 | Mabie et al. |
| 4,218,253 A | 8/1980 | Dworak et al. |
| 4,238,213 A | 12/1980 | Pallo et al. |
| 4,261,706 A | 4/1981 | Blanding et al. |
| 4,311,489 A | 1/1982 | Kressner |
| 4,314,827 A | 2/1982 | Leitheiser et al. |
| 4,316,964 A | 2/1982 | Lange |
| 4,341,533 A | 7/1982 | Daire et al. |
| 4,366,253 A | 12/1982 | Yagi |
| RE31,128 E | 1/1983 | Walker et al. |
| 4,405,545 A | 9/1983 | Septier et al. |
| 4,415,510 A | 11/1983 | Richmond |
| 4,439,845 A | 3/1984 | Geohegan, Jr. et al. |
| 4,457,767 A | 7/1984 | Poon et al. |
| 4,467,767 A | 8/1984 | Kampichler et al. |
| 4,472,511 A | 9/1984 | Mennemann et al. |
| RE31,725 E | 11/1984 | Walker et al. |
| 4,489,022 A | 12/1984 | Robyn et al. |
| 4,518,397 A | 5/1985 | Leitheiser et al. |
| 4,530,909 A * | 7/1985 | Makishima et al. ......... 501/152 |
| 4,543,107 A | 9/1985 | Rue |
| 4,552,199 A | 11/1985 | Onoyama et al. |
| 4,584,279 A | 4/1986 | Grabowski et al. |
| 4,588,419 A | 5/1986 | Caul et al. |
| 4,595,663 A | 6/1986 | Krohn et al. |
| 4,623,364 A | 11/1986 | Cottringer et al. |
| 4,652,275 A | 3/1987 | Bloecher et al. |
| 4,705,656 A | 11/1987 | Onoyama et al. |
| 4,734,104 A | 3/1988 | Broberg |
| 4,737,163 A | 4/1988 | Larkey |
| 4,741,743 A | 5/1988 | Narayanan et al. |
| 4,744,802 A | 5/1988 | Schwabel |
| 4,751,137 A | 6/1988 | Halg et al. |
| 4,752,459 A | 6/1988 | Pepper |
| 4,756,746 A | 7/1988 | Kemp, Jr. et al. |
| 4,757,036 A | 7/1988 | Kaar et al. |
| 4,762,677 A | 8/1988 | Dolgin |
| 4,770,671 A * | 9/1988 | Monroe et al. ................ 51/295 |
| 4,772,511 A | 9/1988 | Wood et al. |
| 4,780,268 A | 10/1988 | Papsi et al. |
| 4,789,501 A | 12/1988 | Day et al. |
| 4,799,939 A | 1/1989 | Bloecher et al. |
| 4,800,685 A | 1/1989 | Haynes, Jr. |
| 4,812,422 A | 3/1989 | Yuhaku et al. |
| 4,829,031 A | 5/1989 | Roy et al. |
| 4,881,951 A | 11/1989 | Monroe et al. |
| 4,898,587 A | 2/1990 | Mera |
| 4,898,597 A | 2/1990 | Hay et al. |
| 4,950,294 A | 8/1990 | Hakamatsuka |
| 4,960,441 A | 10/1990 | Pellow et al. |
| 4,997,461 A | 3/1991 | Markhof-Matheny et al. |
| 5,007,943 A | 4/1991 | Kelly et al. |
| 5,009,675 A | 4/1991 | Kunz et al. |
| 5,009,676 A | 4/1991 | Rue et al. |
| 5,011,508 A * | 4/1991 | Wald et al. .................... 51/307 |
| 5,013,696 A | 5/1991 | Greskovich et al. |
| 5,023,212 A | 6/1991 | Dubots et al. |
| 5,038,453 A | 8/1991 | Kurita et al. |
| 5,042,991 A | 8/1991 | Kunz et al. |
| 5,045,402 A | 9/1991 | Adams, Jr. et al. |
| 5,057,018 A | 10/1991 | Bowen |
| 5,071,801 A | 12/1991 | Bedard et al. |
| 5,085,671 A | 2/1992 | Martin et al. |
| 5,090,968 A | 2/1992 | Pellow |
| 5,094,672 A | 3/1992 | Giles, Jr. et al. |
| 5,104,319 A | 4/1992 | Evans et al. |
| 5,104,830 A | 4/1992 | Drouet et al. |
| 5,108,477 A | 4/1992 | Cornelius et al. |
| 5,110,332 A | 5/1992 | Isaksson |
| 5,118,326 A | 6/1992 | Lee et al. |
| 5,122,176 A | 6/1992 | Goettler |
| 5,131,926 A | 7/1992 | Rostoker et al. |
| 5,139,978 A | 8/1992 | Wood |
| 5,143,522 A | 9/1992 | Gibson et al. |
| 5,152,917 A | 10/1992 | Pieper et al. |
| 5,164,348 A | 11/1992 | Wood |
| 5,185,299 A | 2/1993 | Wood et al. |
| 5,194,072 A | 3/1993 | Rue et al. |
| 5,201,916 A | 4/1993 | Berg et al. |
| 5,203,884 A | 4/1993 | Buchanan et al. |

| | | | | | | |
|---|---|---|---|---|---|---|
| 5,203,886 A | 4/1993 | Sheldon et al. | | 5,975,988 A | 11/1999 | Christianson |
| 5,213,591 A * | 5/1993 | Celikkaya et al. ............. 51/293 | | 5,976,274 A | 11/1999 | Inoue et al. |
| 5,215,563 A | 6/1993 | LaCourse et al. | | 5,981,413 A | 11/1999 | Hale |
| 5,227,104 A | 7/1993 | Bauer | | 5,981,415 A | 11/1999 | Waku et al. |
| 5,248,318 A | 9/1993 | Tamamaki et al. | | 6,053,956 A | 4/2000 | Wood |
| 5,259,147 A | 11/1993 | Falz et al. | | 6,054,093 A | 4/2000 | Torre, Jr. et al. |
| 5,273,566 A | 12/1993 | Balcar et al. | | 6,123,743 A | 9/2000 | Carman et al. |
| 5,282,875 A | 2/1994 | Wood et al. | | 6,128,430 A | 10/2000 | Chu et al. |
| 5,312,789 A | 5/1994 | Wood | | 6,146,244 A | 11/2000 | Atsugi et al. |
| 5,336,280 A | 8/1994 | Dubots et al. | | 6,214,429 B1 * | 4/2001 | Zou et al. .................... 428/426 |
| 5,348,914 A | 9/1994 | Thometzek et al. | | 6,245,700 B1 | 6/2001 | Budd et al. |
| 5,352,254 A * | 10/1994 | Celikkaya .................... 51/295 | | 6,251,813 B1 | 6/2001 | Sato |
| 5,366,523 A | 11/1994 | Rowenhorst et al. | | 6,254,981 B1 | 7/2001 | Castle |
| 5,372,620 A | 12/1994 | Rowse et al. | | 6,268,303 B1 | 7/2001 | Aitken et al. |
| 5,376,470 A | 12/1994 | Sprouse | | 6,277,161 B1 | 8/2001 | Castro et al. |
| 5,378,251 A | 1/1995 | Culler et al. | | 6,287,353 B1 | 9/2001 | Celikkaya |
| 5,378,662 A * | 1/1995 | Tsuyuki ....................... 501/17 | | 6,306,926 B1 | 10/2001 | Bretscher et al. |
| 5,395,407 A | 3/1995 | Cottringer et al. | | 6,329,309 B1 | 12/2001 | Kanamaru et al. |
| 5,413,974 A | 5/1995 | Yokoyama et al. | | 6,335,083 B1 | 1/2002 | Kasai et al. |
| 5,417,726 A | 5/1995 | Stout et al. | | 6,355,586 B1 | 3/2002 | Usui et al. |
| 5,427,595 A | 6/1995 | Pihl et al. | | 6,361,414 B1 | 3/2002 | Ravkin et al. |
| 5,429,647 A | 7/1995 | Larmie | | 6,362,119 B1 | 3/2002 | Chiba |
| 5,431,704 A | 7/1995 | Tamamaki et al. | | 6,395,368 B1 | 5/2002 | Yamaguchi et al. |
| 5,436,063 A | 7/1995 | Follett et al. | | 6,447,937 B1 | 9/2002 | Murakawa et al. |
| 5,443,906 A | 8/1995 | Pihl et al. | | 6,451,077 B1 | 9/2002 | Rosenflanz |
| 5,449,389 A | 9/1995 | Yoshizumi et al. | | 6,454,822 B1 | 9/2002 | Rosenflanz |
| 5,484,752 A | 1/1996 | Waku et al. | | 6,458,731 B1 | 10/2002 | Rosenflanz |
| 5,496,386 A | 3/1996 | Broberg et al. | | 6,461,988 B2 | 10/2002 | Budd et al. |
| 5,498,269 A * | 3/1996 | Larmie ......................... 51/295 | | 6,469,825 B1 | 10/2002 | Digonnet et al. |
| 5,516,348 A | 5/1996 | Conwell et al. | | 6,482,758 B1 * | 11/2002 | Weber et al. .................... 501/78 |
| 5,520,711 A | 5/1996 | Helmin | | 6,482,761 B1 | 11/2002 | Watanabe et al. |
| 5,534,843 A | 7/1996 | Tsunoda et al. | | 6,484,539 B1 | 11/2002 | Nordine et al. |
| 5,547,479 A * | 8/1996 | Conwell et al. ............. 501/153 | | 6,490,081 B1 | 12/2002 | Feillens et al. |
| 5,549,962 A | 8/1996 | Holmes et al. | | 6,511,739 B2 | 1/2003 | Kasai et al. |
| 5,551,963 A * | 9/1996 | Larmie ......................... 51/307 | | 6,514,892 B1 | 2/2003 | Kasai et al. |
| 5,552,213 A | 9/1996 | Eschner | | 6,521,004 B1 | 2/2003 | Culler et al. |
| 5,569,547 A | 10/1996 | Waku et al. | | 6,592,640 B1 * | 7/2003 | Rosenflanz et al. .......... 501/153 |
| 5,593,467 A | 1/1997 | Monroe | | 6,620,214 B2 | 9/2003 | McArdle et al. |
| 5,605,870 A | 2/1997 | Strom-Olsen et al. | | 6,666,750 B1 * | 12/2003 | Rosenflanz .................... 51/295 |
| 5,609,706 A | 3/1997 | Benedict et al. | | 6,749,653 B2 | 6/2004 | Castro et al. |
| 5,611,829 A * | 3/1997 | Monroe et al. ............... 501/153 | | 6,818,578 B2 | 11/2004 | Tachiwama |
| 5,641,469 A | 6/1997 | Garg et al. | | 6,833,014 B2 | 12/2004 | Welygan et al. |
| 5,643,840 A | 7/1997 | Hikata et al. | | 6,878,456 B2 | 4/2005 | Castro et al. |
| 5,645,619 A | 7/1997 | Erickson et al. | | 6,984,261 B2 | 1/2006 | Cummings et al. |
| 5,648,302 A | 7/1997 | Brow et al. | | 2001/0030811 A1 | 10/2001 | Kasai et al. |
| 5,651,925 A | 7/1997 | Ashley et al. | | 2002/0066233 A1 | 6/2002 | McArdle et al. |
| 5,395,407 A | 8/1997 | Cottringer et al. | | 2002/0160694 A1 | 10/2002 | Wood et al. |
| 5,653,775 A | 8/1997 | Plovnick et al. | | 2003/0040423 A1 | 2/2003 | Harada et al. |
| 5,665,127 A | 9/1997 | Moltgen et al. | | 2003/0126804 A1 | 7/2003 | Rosenflanz |
| 5,679,067 A | 10/1997 | Johnson et al. | | 2004/0148888 A1 | 8/2004 | Anderson et al. |
| 5,682,082 A | 10/1997 | Wei et al. | | | | |
| 5,689,374 A | 11/1997 | Xue et al. | | FOREIGN PATENT DOCUMENTS | | |
| 5,693,239 A | 12/1997 | Wang et al. | | | | |
| 5,721,188 A | 2/1998 | Sung et al. | | DE | 20 34 011 | 7/1970 |
| 5,725,162 A | 3/1998 | Garg et al. | | DE | 134 638 A | 3/1979 |
| 5,733,178 A | 3/1998 | Obishi | | DE | 141 420 | 4/1980 |
| 5,733,564 A | 3/1998 | Lehtinen | | DE | 3534575 | 4/1986 |
| 5,738,696 A | 4/1998 | Wu | | EP | 0 200 487 | 11/1986 |
| 5,747,397 A * | 5/1998 | McPherson et al. ........... 501/78 | | EP | 0 227 374 | 7/1987 |
| 5,763,345 A | 6/1998 | Ohshima et al. | | EP | 0 236 507 | 9/1987 |
| 5,782,940 A | 7/1998 | Jayan et al. | | EP | 0 291 029 A1 | 11/1988 |
| 5,804,513 A | 9/1998 | Sakatani et al. | | EP | 0 408 771 A1 | 1/1991 |
| 5,827,791 A | 10/1998 | Pauliny et al. | | EP | 0 469 271 | 2/1992 |
| 5,847,865 A | 12/1998 | Gopinath et al. | | EP | 0 480 678 A1 | 4/1992 |
| 5,856,254 A | 1/1999 | Feige et al. | | EP | 0 494 638 | 7/1992 |
| 5,863,308 A | 1/1999 | Qi et al. | | EP | 0 495 536 A2 | 7/1992 |
| 5,876,470 A | 3/1999 | Abrahamson | | EP | 0 579 281 A1 | 1/1994 |
| 5,902,763 A | 5/1999 | Waku et al. | | EP | 0 601 453 A2 | 6/1994 |
| 5,903,951 A | 5/1999 | Ionta et al. | | EP | 0 647 601 A1 | 4/1995 |
| 5,916,498 A | 6/1999 | Hoffmann et al. | | EP | 0 666 238 B1 | 8/1995 |
| 5,952,256 A | 9/1999 | Morishita et al. | | EP | 0 666 239 B1 | 8/1995 |
| 5,954,844 A | 9/1999 | Law et al. | | EP | 0 709 347 | 5/1996 |
| 5,961,674 A | 10/1999 | Gagliardi et al. | | EP | 0 722 919 A1 | 7/1996 |

| | | |
|---|---|---|
| EP | 0 291 029 B2 | 11/1996 |
| FR | 1547989 | 10/1968 |
| FR | 2 118 026 | 7/1972 |
| FR | 2538370 | 6/1984 |
| FR | 2 609 708 | 7/1988 |
| GB | 793503 | 4/1958 |
| GB | 1005338 | 9/1965 |
| GB | 1 121 875 | 7/1968 |
| GB | 1 260 933 A | 1/1972 |
| GB | 1 411 398 | 10/1975 |
| GB | 2 116 992 | 10/1983 |
| JP | 50025608 | 3/1975 |
| JP | 59 22 7726 A | 12/1984 |
| JP | 60221338 | 11/1985 |
| JP | 61099665 | 5/1986 |
| JP | 62-003041 * | 1/1987 |
| JP | S 63-156024 | 6/1988 |
| JP | 63-225548 | 9/1988 |
| JP | 02608648 | 9/1988 |
| JP | S 63-303821 | 12/1988 |
| JP | 3-113428 | 5/1991 |
| JP | HEI 4-119941 | 4/1992 |
| JP | 05-085821 | 4/1993 |
| JP | 5-226733 | 9/1993 |
| JP | 06 040765 A | 2/1994 |
| JP | 06-171974 * | 6/1994 |
| JP | HEI 11-189926 | 7/1999 |
| JP | 11-335136 | 12/1999 |
| JP | 10-208229 | 2/2000 |
| JP | 10-208244 | 2/2000 |
| JP | 200045128 A | 2/2000 |
| JP | 200045129 A | 2/2000 |
| JP | 201294480 | 10/2001 |
| KR | 9601009 | 4/1993 |
| RU | 2002771 | 11/1993 |
| RU | 1455569 | 10/1996 |
| RU | 2148569 | 5/2000 |
| SU | 1217809 | 3/1986 |
| SU | 1455569 | 10/1986 |
| SU | 1768561 | 10/1992 |
| WO | WO 93/21120 | 10/1993 |
| WO | WO 94/14722 | 7/1994 |
| WO | WO 97/16385 | 5/1997 |
| WO | WO 97/25284 | 7/1997 |
| WO | WO 00/34201 | 6/2000 |
| WO | WO 01/16047 A2 | 3/2001 |
| WO | WO 01/23321 A1 | 4/2001 |
| WO | WO 01/23323 A1 | 4/2001 |
| WO | WO 01/27046 A1 | 4/2001 |
| WO | WO 01/56946 A | 8/2001 |
| WO | WO 01/56947 A | 8/2001 |
| WO | WO 01/56949 A | 8/2001 |
| WO | WO 01/56950 A | 8/2001 |
| WO | WO 02/08146 A | 1/2002 |

OTHER PUBLICATIONS

Kingery, W.D., Introduction to Ceramics, Second Edition, Chpt. III subchapter 8.8, Glass-Ceramic Materials, pp. 368-374, (1976).
Kokubo, Tadashi et al., "Infrared Transmission of ($R_2O$ or R'O)-($TiO_2$, $Nb_2O_5$ or $Ta_2O_5$)-$Al_2O_3$ Glasses", Journal of Non-Crystalline Solids 22 (1970) 125-134.
McMillan, P.W., *Glass-Ceramics*, Academic Press, Inc., 2nd Edition (1979).
Stookey. S. D., Ceramics Made by Nucleation of Glass-Comparison of Microstructure and Properties with Sintered Ceramics, The American Ceramic Society, (1992), pp. 1-4.
Varshneya, Arun K., "Fundamentsal of Inorganic Glasses", pp. 425-427 (1994).
"Rare Earth Oxide-Aluminum Oxide Glasses for Mid-Range IR Devices," Weber et al., reference obtained in 2003, and believed to be based on a talk presented Jan. 25, 2003 (See website http://www.spie.org/Conferences/Programs/03/pw/bios/index.cfm?fuseaction=4957, pp. 1 and 4 of 6).
Device Materials Based on Er-, Ho-, Tm-, and Yb-Doped Rare Earth Aluminum Oxide (REAl™) Glass, Weber et al., reference obtained in 2003, and believed to be based on a talk presented Jan. 28, 2003 (See website http://www.spie.org/Conferences/Programs/03/pw/opto/index.cfm?fuseaction=4999, pp. 1 and 2 of 5).
Abstract for "Kinetics of Nonisothermal Sintering of Some Eutectic Oxide Compositions," I. Yu Volkova et al., 1986 (abstract from Database Chemabs 'Online! Chemical Abstracts Service, Columbus, Ohio, US).
"Eutectic Precipitation of the Spinel Solid Solution-Yttrium Aluminum Garnet (YAG) System," Shuqiang Wang et al., *Journal of the American Ceramic Society*, 1998, vol. 81, No. 1, pp. 263-265.
"Microstructures of laser-treated $Al_2O_3$-$ZrO_2$$CeO_2$ composites," Zan-Hwey Chen et al., *Materials Science & Engineering A (Structural Materials: Properties, Microstructure and Processing)*, 1995, vol. A196, No. 1-2, pp. 253-260.
"Advances in the Grinding Efficiency of Sintered Alumina Abrasives," Andreas Krell et al., *Journal of the American Ceramic Society*, 1996, vol. 79, No. 3, pp. 763-769.
"Interface modification for increased fracture toughness in reaction-formed yttrium aluminum garnet/alumina eutectic composites," Luke N. Brewer et al., 1999, vol. 14, No. 10, pp. 3907-3912.
Dow Jones Interactive Internet Printout on Jun. 20, 2001 for web address "http://ptg.djnr.com/ccroot/asp/publib/story.asp"; "China's Rare Earth Industry In the Doldrums", Asia Pulse, Jan. 28, 1999, 2 pages.
Dow Jones Interactive Internet Printout on Jun. 20, 2001 for web address "http://ptg.djnr.com/ccroot/asp/publib/story.asp"; "China's Rare Earth Export Quota Set at 45,000 Tons", Asia Pulse, Jan. 9, 2001, 1 page.
Dow Jones Interactive Internet Printout on Jun. 20, 2001 for web address "http://ptg.djnr.com/ccroot/asp/publib/story.asp"; "ELEMENTS: China to Impose Quotas on Rare Earth Exports", Chemical Business NewsBase, Feb. 4, 1999, 1 page.
Dow Jones Interactive Internet Printout on Jun. 20, 2001 for web address "http://ptg.djnr.com/ccroot/asp/publib/story.asp"; "Rare Earth Prices and Market Outlook", Chemical Business NewsBase, May 27, 1999, 2 pages.
Dow Jones Interactive Internet Printout on Jun. 20, 2001 for web address "http://ptg.djnr.com/ccroot/asp/publib/story.asp"; "In Asia", Engineering & Mining Journal, Feb. 28, 2000, 4 pages.
Dow Jones Interactive Internet Printout on Jun. 20, 2001 for web address "http://ptg.djnr.com/ccroot/asp/publib/story.asp"; "Rare Earths: An Industry Review and Market Outlook—Part 1", Chemical Business NewsBase, Dec. 8, 2000, 2 pages.
Dow Jones Interactive Internet Printout on Jun. 20, 2001 for web address "http://ptg.djnr.com/ccroot/asp/publib/story.asp"; "Traders' View on Chemical Business (Part 2): Rare Earth: Market Confusion Inevitable Due to China's Unstable Supply", Chemical Business NewsBase, Aug. 10, 2000, 2 pages.
"China: Oversupply Puts Rare Earths Projects On Hold", Industrial Minerals, Aug. 1997, 1 page.
"Increase in Value of Rare Earth Products Boosts Yixing Xinwei", W. Yau, South China Morning Post, Apr. 12, 2000, 2 pages.
"Rare Earth—Market Confusion Inevitable Due to China's Unstable Supply", Japan Chemical Week, vol. 41, No. 2080, Jul. 6, 2000, pp. 6-7.
"Rare Earths Prices Recover Despite China's Overcapacity", Louise Rodriquez, America Metal Market, vol. 109, No. 14, Jan. 22, 2001, p. 13.
"Prices: Minerals", Asian Ceramics & Glass, Jan. 2001, 2 pages.
"China Rare Earth Information", China Rare Earth Information Center, vol. 6, No. 4, Aug. 2000, 3 pages.
"Microstructure and Thermal Stability of $Al_2O_3$/$Y_3Al_5O_{12}$ (YAG) Eutectic Composite Prepared by an Arc Discharge Method", T. Isobe et al., J. Ceram. Soc. Jap., 109, [1], 2001, pp. 66-70, Abstract in English.

"Divorced Eutectic and Interface Characteristics in a Solidified YAG-Spinel Composite With Spinel-Rich Composition", S. Wang et al., J. Mat. Sci., 35, 2000, pp. 2757-2761.

"Processing, Microstructure, and Strength of Alumina-YAG Eutectic Polycrystals", Tai-Il Mah et al., J. Am. Ceram. Soc., 83, [8], 2000, pp. 2088-2090.

"Phase Identification of $Al_2O_3/RE_3Al_5O_{12}$ and $Al_2O_3/REAlO_3$ (RE= Sm-Lu, Y) Eutectics", J. Crystal Growth, 218, 2000, pp. 67-73.

"Crystallization and Thermal Properties of $Al_2O_3$-$Y_2O_3$ Melts", S. V. Stankus et al., J. Crystal Growth, 167, 1996, pp. 165-170.

Dialog © file 319: Chem Bus NewsBase © 2001 Royal Soc Chemistry. Abstract for "China: Oversupply Puts Rare Earths Projects On Hold", Industrial Minerals n 359, p. 10.

"Rare-Earth Metals", J. Hedrick, pp. 61.1-61.6, 1997.

"Rare-Earth Metal Prices in the USA ca. 1960 to 1994", J. Hedrick, J. Alloys and Compounds, 1997, pp. 471-481.

"Preliminary data on subsolidus phase equilibria in the $La_2O_3$-$Al_2O_3$-$Mn_2O_3$ and $La_2O_3$-$Al_2O_3$-$Fe_2O_3$ systems", Hrovat et al., Journal of Materials Science Letters, vol. 14, 1995, pp. 265-267.

"Aspects of Synthesis of Decorite Opacified Glass", Keramika, Glass and Ceramics, vol. 58, Nos. 1-2, pp. 8-11, Jan. 2001.

"A New Ceramic Eutectic Composite with High Strength at 1873 K", Yoshiharu Waku, Advanced Materials, vol. 10, No. 8, 1998, pp. 615-617.

"Synthesis of Y-Al Garnet", Krokhin et al., Glass and Ceramics, vol. 55, Nos. 5-6, 1998, pp. 151-152.

"High-temperature strength and thermal stability of a unidirectionally solidified $Al_2O_3$/YAG eutectic composite", Waku et al., pp. 1217-1225.

"Sapphire matrix composites reinforced with single crystal VAG phases", Waku et al., Journal of Materials Science, vol. 31, 1996, pp. 4663-4670.

"Thermo-Mechanical Stability Of Directionally Solidified $Al_2O_3$-$ZrO_2(Y_2O_3)$ Eutectic Fibers", Yang and Zhu, Scripta Materialia, vol. 36, No. 8, 1997, pp. 961-965.

"A ductile ceramic eutectic composite with high strength at 1,873 K", Waku et al., Nature, vol. 389, Sep. 1997, pp. 49-52.

"The Liquidus Surface In The $Al_2O_3$-$ZrO_2$-$Y_2O_3$ Phase Diagram", Lakiza et al., Powder Metallurgy and Metal Ceramics, vol. 33, No. 11-12, 1994, pp. 595-597.

"Powder-Material Research Methods And Properties Polythermal Sections Of The $Al_2O_3$-$ZrO_2$-$Y_2O_3$ Phase Diagram", Lakiza et al., Powder Metallurgy and Metal Ceramics, vol. 34, No. 11-12, 1995, pp. 655-659.

"Metastable Phase Relationships In The System $Al_2O_3$-$ZrO_2$-$Y_2O_3$", Lakiz and Lopato, Powder Metallurgy and Metal Ceramics, vol. 35, Nos. 11-12, 1996, pp. 621-626.

"Solidus Surface And Phase Equilibria During The Solidification Of Alloys In The $Al_2O_3$-$ZrO_2$-$Y_2O_3$ System", Lakiza et al., Powder Metallurgy and Metal Ceramics, vol. 34, Nos. 1-2, 1995, pp. 64-67.

"Methods Of Investigation Of Properties Of Powder Materials, Interactions In The $Al_2O_3$-$ZrO_2$-$Y_2O_3$ System", Lakiza et al., Powder Metallurgy and Metal Ceramics, vol. 33, Nos. 9-10, 1994, pp. 486-490.

"Rapid Solidification of Ceramics a Technology Assessment", Brockway et al. Metals and Ceramics Information Center, MCIC Report, Jan. 1984 MCIC 84-49.

Figs. 311, 346, 350, 354-56, 373, and 716, Phase Diagrams For Ceramists, The American Ceramic Society, 1964, pp. 122, 136, 138, 140, 144, 248.

Figs. 2340-44, 2363, 2370, 2374-75, 2382-83, 2385, 2387, 2390, and 2392, Phase Diagrams For Ceramists, 1969 Supplement, The American Ceramic Society, 1969, pp. 95-96, 100, 102-103, 105-108.

Figs. 4366-71, 4377-78, 4404-05, 4417, 4426, 4430, 4433, 4437, 4440, 4444, 4457, 4572, and 4602, Phase Diagrams For Ceramists, 1975 Supplement, The American Ceramic Society, 1975, pp. 130-132, 135-136, 147, 152, 157, 159-160, 163-164, 166, 172-173, 238, 257.

Figs. 5042, 5211, 5217, 5224, 5228, 5232, 5237, 5239, 5241, 5245, 5251, 5257, 5418, and 5437, Phase Diagrams For Ceramists, vol. IV, The American Ceramic Society, 1981, pp. 29, 125, 127, 129-131, 133, 135-137, 139, 141, 143, 220, 228.

Fig. 6464, Phase Diagrams For Ceramists, vol. VI, The American Ceramic Society, 1981, p. 162.

Figs. 9262, and 9264, Phase Diagrams For Ceramists, vol. XI, Oxides, The American Ceramic Society, 1995, pp. 105-106.

"Phase Equilibria in the Yttrium Oxide-Alumina System", Toropov et al., Bulletin of the Academy of Sciences, USSR, Division of Chemical Science, No. 7, Jul. 1964, pp. 1076-1081, A translation of Seriya Khimicheskaya.

McKittrick, Joanna, et al., "Non-stoichiometry and defect structures in rapidly solidified $MgO$-$Al_2O_3$-$ZrO_2$ ternary eutectics," Materials Science and Engineering A231 (1997) 90-97.

Weber, J.K. Richard et al., "Glass fibres of pure and erbium- or neodymium-doped yttria-alumina compositions", Nature, Jun. 25, 1998, vol. 393, pp. 769-771.

Waku, Yoshiharu, et al., "A jelly-like ceramic fiber at 1193 K", Mat Res Innovat, 2000, vol. 3, pp. 185-189.

Weber, J.K. Richard et al., "Glass Formation and Polyamorphism in Rare-Earth Oxide-Aluminum Oxide Compositions", J. American Ceramic Society, 83 [8], 2000, 1868-1872.

Aguilar, E.A., "Processing and crystallization of rapidly solidified $Al_2O_3$-$Y_2O_3$ fibres", British Ceramic Transactions, 2000, vol. 99, No. 6, pp. 256-259.

U.S. Patent Application entitled "Fused $Al_2O_3$-$Y_2O_3$ Eutectic Abrasive Particles, Abrasive Articles, And Methods Of Making And Using The Same", filed Jul. 19, 2000, Rosenflanz et al. having U.S. Appl. No. 09/620,262.

U.S. Patent Application entitled "Fused-$Al_2O_3$-$MgO$-$Y_2O_3$ Eutectic Abrasive Particles, Abrasive Articles, And Methods Of Making And Using The Same", filed Nov. 2, 2000, Rosenflanz having U.S. Appl. No. 09/704,843.

U.S. Patent Application entitled "Fused $Al_2O_3$ Rare Earth Oxide Eutectic Abrasive Particles, Abrasive Articles, And Methods Of Making And Using The Same", filed Jul. 19, 2000, Rosenflanz et al. having U.S. Appl. No. 09/618,879.

U.S. Patent Application entitled "Fused Abrasive Particles, Abrasive Articles, And Methods Of Making And Using The Same", filed Jul. 19, 2000, Rosenflanz et al. having U.S. Appl. No. 09/619,191.

U.S. Patent Application entitled "Fused Aluminum Oxycarbide/Nitride- $Al_2O_3$ Rare Earth Oxide Eutectic Abrasive Particles, Abrasive Articles, And Methods Of Making And Using The Same", filed Jul. 19, 2000, Rosenflanz having U.S. Appl. No. 09/619,289.

U.S. Patent Application entitled "Fused Aluminum Oxycarbide/Nitride-$Al_2O_3$ Rare Earth Oxide Eutectic Materials", filed Jul. 19, 2000, Rosenflanz having U.S. Appl. No. 09/619,106.

U.S. Patent Application entitled "Fused $Al_2O_3$-$Y_2O_3$-$ZrO_2$ Eutectic Abrasive Particles, Abrasive Articles, And Methods Of Making And Using The Same", filed Jul. 19, 2000, Rosenflanz having U.S. Appl. No. 09/618,876.

U.S. Patent Application entitled "Fused $Al_2O_3$-Rare Earth Oxide-$ZrO_2$ Eutectic Materials", filed Jul. 19, 2000, Rosenflanz having U.S. Appl. No. 09/619,192.

U.S. Patent Application entitled "Fused $Al_2O_3$-Rare Earth Oxide-$ZrO_2$ Eutectic Abrasive Particles, Abrasive Articles, And Methods Of Making And Using The Same", filed Jul. 19, 2000, Rosenflanz having U.S. Appl. No. 09/619,744.

U.S. Patent Application entitled "Fused $Al_2O_3$ Rare Earth Oxide $ZrO_2$ Eutectic Materials", filed Jan. 30, 2001, Rosenflanz having U.S. Appl. No. 09/772,730.

U.S. Patent Application entitled "$Al_2O_3$-Rare Earth Oxide-$ZrO_2$/$HfO_2$ Materials, and Methods of Making and Using the Same", filed Aug. 2, 2002, Rosenflanz having U.S. Appl. No. 10/211,597.

U.S. Patent Application entitled, "Abrasive Particles, and Methods of Making and Using the Same", filed Aug. 2, 2002, Rosenflanz having U.S. Appl. No. 10/211,629.

U.S. Patent Application entitled, "Abrasive Particles, Abrasive Articles, and Methods of Making and Using the Same", filed Aug. 2, 2002, Rosenflanz et al. having U.S. Appl. No. 10/211,598.

U.S. Patent Application entitled, "Abrasive Particles, and Methods of Making and Using the Same", filed Aug. 2, 2002, Rosenflanz et al. having U.S. Appl. No. 10/211,630.

U.S. Patent Application entitled, "Method for Making Amorphous Materials and Ceramics", filed Aug. 2, 2002, Rosenflanz et al. having U.S. Appl. No. 10/211,639.

U.S. Patent Application entitled, "Ceramic Materials, Abrasive Particles, Abrasive Articles, and Methods of Making and Using the Same", filed Aug. 2, 2002, Rosenflanz having U.S. Appl. No. 10/211,034.

U.S. Patent Application entitled, "Glass-Ceramics", filed Aug. 2, 2002, Rosenflanz having U.S. Appl. No. 10/211,044.

U.S. Patent Application entitled, "Method of Making Ceramic Articles", filed Aug. 2, 2002, Rosenflanz having U.S. Appl. No. 10/211,481.

U.S. Patent Application entitled "Plasma Spraying", filed Aug. 2, 2002, Rosenflanz et al. having U.S. Appl. No. 10/211,640.

U.S. Patent Application entitled "Method of Making Amorphous and Ceramics via Melt Spinning," filed Aug. 2, 2002, Rosenflanz et al. having U.S. Appl. No. 10/211,684.

"$Gd_3Al_5O_{12}$ Phase Obtained by Crystallization of Amorphous $Gd_2O_3 \, ^5/_3 \, Al_2O_3$," Shishido et al., Journal of the American Ceramic Society, vol. 61, No. 7-8, Jul.-Aug. 1978, pp. 373-374.

"Rapid Quenching on the Binary Systems of High Temperature Oxides," Suzuki et al., Mat. Res. Bull., vol. 9, 1974, pp. 745-754.

"Unusual Glass Formation in the A1-Nd-O System," Yajima et al., Chemistry Letters (published by the Chemical Society of Japan), 1973, pp. 741-742.

Glass Formation in the Ln-Al-O System, (Ln: Lanthanoid and Yttrium Elements), Yajima et al., Chemistry Letters, 1973, pp. 1327-1330.

"Production and Studies of Alumina Based Refractory Glass," Coutures et al., Mat. Res. Bull., vol. 10, No. 6, 1975, pp. 539-546.

"Net Optical Gain at 1.53 μm in Er-DOPED $Al_2O_3$ Waveguides on Silicon," van den Hoven et al., Appl. Phys. Lett. 68 (14), Apr. 1, 1966, pp. 1886-1888.

"DURABLE 3—5 μm Transmitting Infrared Window Materials," Harris et al., Infrared Physics & Technology 39, 1998, pp. 185-201.

"Erbium-Doped Phosphate Glass Waveguide on Silicon with 4.1 dB/cm Gain at 1.535 μm," Yan et al., Appl. Phys. Lett, 71 (20), Nov. 17, 1997.

Kondrashov V I et al., "Opacified Glass "Decorit" Synthesis Directions", Steklo I Keramika 2001, No. 1, pp. 8-11.

U.S. Application entitled "Ceramic Aggregate Particles", filed Feb. 11, 2004, having U.S. Appl. No. 10/776,156.

U.S. Application entitled "Methods of Making Ceramic Particles", filed Sep. 5, 2003, having U.S. Appl. No. 10/655,729.

U.S. Application entitled "Methods of Making Ceramics Comprising $Al_2O_3$, REO, $ZrO_2$ and/or $HfO_2$, and $Nb_2O_5$ and/or $Ta_2O_5$", filed Sep. 18, 2003, having U.S. Appl. No. 10/666,615.

U.S. Application entitled "Ceramics Comprising $Al_2O_3$, REO, $ZrO_2$ and/or $HfO_2$, and $Nb_2O_5$ and/or $Ta_2O_5$, and Methods of Making The Same", filed Sep. 18, 2003, having U.S. Appl. No. 10/666,212.

U.S. Application entitled "Ceramics Comprising $Al_2O_3$, $Y_2O_3$, $ZrO_2$ and/or $HfO_2$, and $Nb_2O_5$ and/or $Ta_2O_5$, and Methods of Making The Same", filed Sep. 18, 2003, having U.S. Appl. No. 10/666,098.

U.S. Application entitled "Alumina-Yttria Particles and Methods of Making The Same", filed Dec. 18, 2003, having U.S. Appl. No. 10/740,262.

U.S. Application entitled "Method of Making Abrasive Particles", filed Dec. 18, 2003, having U.S. Appl. No. 10/739,420.

U.S. Application entitled "Transparent Fused Crystalline Ceramics, And Method of Making The Same", filed Dec. 18, 2003, having U.S. Appl. No. 10/739,439.

U.S. Application entitled "Method of Making Abrasive Particles", filed Dec. 18, 2003, having U.S. Appl. No. 10/739,440.

U.S. Application entitled "Method of Making Abrasive Particles", filed Dec. 18, 2003, having U.S. Appl. No. 10/740,096.

U.S. Application entitled "Method of Making Abrasive Particles", filed Dec. 18, 2003, having U.S. Appl. No. 10/73944.

U.S. Application entitled "Powder Feeding Method and Apparatus", filed Dec. 18, 2003, having U.S. Appl. No. 10/739,233.

U.S. Application entitled "Use of Ceramics In Dental And Orthodontic Applications", filed Feb. 5, 2003, having U.S. Appl. No. 10/358,856.

U.S. Application entitled "Use of Glasses Containing Rare Earth Oxide, Alumina, and Zirconia And Dopant In Optical Waveguides", filed Apr. 28, 2003, having U.S. Appl. No. 10/425,039.

U.S. Application entitled "Method of Making Abrasive Particles", filed Dec. 18, 2003, having U.S. Appl. No. 10/739,624.

U.S. Application entitled "Ceramics, and Methods of Making and Using the Same", filed Jul. 29, 2004.

U.S. Application entitled "Method of Making Ceramic Articles", filed Jul. 29, 2004.

Aasland and McMillan, Nature 369, 633 (1994).

Aguilar et al, "Melt Extraction Processing of Structural $Y_2O_3$-$Al_2O_3$ Fibers", J. Eur. Ceram. Soc. 20 1091-1098 (2000).

Gandhi, A.S. and Jarayam, V., "Pressure Consolidation of Amorphous $ZrO_2$-$Al_2O_3$ by Plastic Deformation of Powder Particles", Acta Materiala, 50 (2002), 2137-2149.

Gonzalez, Eduardo J., et al., "High Pressure Compaction and Sintering of Nano-Size γ-$Al_2O_3$ Powder", Materials and Manufacturing Processes vol. 11, No. 6, 951-967, 1996.

Jantzen, C.M., Krepski, R.P., & Herman, H., "Ultra-Rapid Quenching of Laser-Method Binary and Unary Oxides", Mat. Res. Bull. 15, 1313-1326 (1980).

Khor K.A., "Novel ZrO2-Mullite Composites Produced By Plasma Spraying", Proceedings of the 15th International Thermal Pray Conference, May 25-29, 1998, Nice, France.

Ray, C.S. and Day, D.E., "Determining the Nucleation Rate Curve for Lithium Disilicate Glass by Differential Thermal Analysis", J. Am. Ceram. Soc. 73(2) 439-442 (1990).

Schmucker, M, et al., "Constitution of Mullite Glasses Produced by Ultra-Rapid Quenching of Plasma-Sprayed Melts", Journal of the European Ceramic Society 15 (1995) 1201-1205.

Sarjeant, P.T, & Roy, R., in Reactivity of Solids (ed. J. W. Mitchell, R.C., DeVries, R.W., Roberts and P. Cannon) 725-33 (John Wiley & Sons, Inc., New York 1969).

Takamori, T., & Roy, R., "Rapid Crystallization of SiO2-Al2O3 Glasses", Journal of American Society, vol. 56, No. 12, Dec. 1973.

Weber et al., "Synthesis and Optical Properties of Rare-Earth-Aluminum Oxide Glasses", J. Am. Ceram. Soc. 85(5) 1309-1311 (2002).

Wilding, M.C., McMillan, P.F., "Polyamorphic Transitions in Yttria-Alumina Liquids", J. Non-Cryst. Solids. 293-295, 357-365 (2001).

MacChesney, J.B. et al., "The System $La_2O_3$-$TiO_2$, Phase Equilbria and Electrical Properties," Bell Telephone Laboratories, Incorporated, Murray Hill, New Jersey.

Shishido, Toetsu et al., "Ln-M-O Glasses Obtained by Rapid Quenching Using a Laser Beam," Oaraie Branch, Reasearch Institute for Iron, Steel and Other Metals, Tohoku University, Ibaraki-ken, 311-13, Japan.

Topoi, L.E. et al., "Formation of New Oxide Glasses by Laser Spin Melting and Free Fall Cooling," North American Rockwell Science Center, Thousand Oaks, California, 91360, USA.

White, R.W. et al., "A Lanthanum Titanium Porous Glass Ceramic," Council for Scientific Research, National Institute for Materials Research, Pretoria, Republic of South Africa.

U.S. Patent Application entitled "Metal Oxide Ceramic and Method of Making Articles Therewith," filed Jan. 15, 2007, Rosenflanz having U.S. Appl. No. 11/623,129.

U.S. Patent Application entitled "AI2103-Rare Earth Oxide -ZrO2/HFO2 Materials, and Method of Making and Using the Same," filed Jun. 26, 2007. Rosenflanz having U.S. Appl. No. 11/768,806.

Adylov, G.T. et al., "Research on Mullite Produced by Melting in Solar Furnaces," Federal Technical Institute - Research and Production Association "Physics - Sun" - FTI NOP "Fizika - Solntse".

Bataliants et al., "Application of Low-Temperature Plasma in Glass and Glass Ceramic Industry," TSNIITEI Publishers (1973) pp. 26-27.

Batygin, V.N. et al., "Vacuum-Dense Ceramic and Its Alloys with Metals," Chemical-Mineralogical Composition and Structure.

Choudhury, Samrat, et al., "Bulk, Dense, Nanocrystalline Yttrium Aluminum Garnet by Consolidation of Amorphous Powders at Low Temperatures and High Pressures," J. Am. Ceram. Soc. 86[2] 247-51 (2003).

Kriuchkov et al., "$Al_2O$.- $ZRO_2$ Ceramics Made of Powders Obtained by Technique of High-Speed Hardening from Melt," No. 5 Refractory Materials, 1989, No. 6, pp. 19-22.

Kryuchkov, V.A. et al., $Al_2O_3$-$ZrO_2$ Ceramics from Powders Produced by the Method of High-Speed Melt Solidification, Institute of Organic and Inorganic Chemistry of USSR Academy of Sciences, pp. 19-21.

McMillan, P.U., Glass Ceramic, (1967) pp. 26-27.

Pavlushkin, N.M., "Fundamentals of Glass Ceramics Technology," Stroyizdat Publishers, (1979) pp. 71-72.

Polling L., General Biochemistry, Moscow, Mir, 1964, pp. 426-427.

Shvedkov, E.L. et al, "Vocabulary-Dictionary of powder metallurgy", Kiev, "Naukova dumka", 1982, p. 17 "Amorphous condition", "Amorphous materials".

Strelov, K.K.. et al., "Technology of Refractory Materials," Metallurgiya Publishers, (1988), p. 137.

Zhou, Xinzhang, "Metastable Phase Formation in Plasma-SprayedZrO2 (Y2O3)-Al2O3," Journal of the American Ceramic Society, vol. 86, No. 8 (2003) pp. 1415-1420.

U.S. Appl. No. 10/358,772, filed Feb. 5, 2003, Methods of Making Ceramic Particles.

U.S. Appl. No. 10/358,765, filed Feb. 5, 2003, Methods of Making Ceramics.

U.S. Appl. No. 10/358,910, filed Feb. 5, 2003, Ceramics and Methods of Making the Same.

U.S. Appl. No. 10/358,855, filed Feb. 5, 2003, $Al_2O_3$-$La_2O_3$-$Y_2O_3$-MgO Ceramics, And Methods of Making The Same.

U.S. Appl. No. 10/358,708, filed Feb. 5, 2003, Methods of Making $Al_2O_3$-$SiO_2$ Ceramics.

"A New Ceramic Eutectic Composite with High Strength at 1873 K", Yoshiharu Waku, *Advanced Materials*, vol. 10, No. 8, 1998, pp. 615-617.

"Synthesis of Y-Al Garnet", Krokhin et al., *Glass and Ceramics*, vol. 55, Nos. 5-6, 1998, pp. 151-152.

"High-temperature strength and thermal stability of a unidirectionally solidified $Al_2O_3$/YAG eutectic composite", Waku et al., pp. 1217-1225, 1998.

"Sapphire matrix composites reinforced with single crystal VAG phases", Waku et al., *Journal of Materials Science*, vol. 31, 1996, pp. 4663-4670.

"Thermo-Mechanical Stability Of Directionally Solidified $Al_2O_3$-$ZrO_2(Y_2O_3)$ Eutectic Fibers", Yang and Zhu, *Scripta Materialia*, vol. 36, No. 8, 1997, pp. 961-965.

"A ductile ceramic eutectic composite with high strength at 1,873 K", Waku et al., *Nature*, vol. 389, Sep. 1997, pp. 49-52.

"The Liquidus Surface In The $Al_2O_3$-$ZrO_2$-$Y_2O_3$ Phase Diagram", Lakiza et al., *Powder Metallurgy and Metal Ceramics*, vol. 33, No. 11-12, 1994, pp. 595-597.

"Powder-Material Research Methods And Properties Polythermal Sections Of The $Al_2O_3$-$ZrO_2$-$Y_2O_3$ Phase Diagram", Lakiza et al., *Powder Metallurgy and Metal Ceramics*, vol. 34, No. 11-12, 1995, pp. 655-659.

"Metastable Phase Relationships In The System $Al_2O_3$-$ZrO_2$-$Y_2O_3$", Lakiz and Lopato, *Powder Metallurgy and Metal Ceramics*, vol. 35, Nos. 11-12, 1996, pp. 621-626.

"Solidus Surface And Phase Equilibria During The Solidifiction Of Alloys In The $Al_2O_3$-$ZrO_2Y_2O_3$ System", Lakiza et al., *Powder Metallurgy and Metal Ceramics*, vol. 34, Nos. 1-2, 1995, pp. 64-67.

"Methods Of Investigation Of Properties Of Powder Materials, Interactions In The $Al_2O_3$-$ZrO_2$-$Y_2O_3$ System", Lakiza et al, *Powder Metallurgy and Metal Ceramics*, vol. 33, Nos. 9-10, 1994, pp. 486-490.

"Rapid Solidification of Ceramics a Technology Assessment", Brockway et al. *Metals and Ceramics Information Center*, MCIC Report, Jan. 1984 MCIC 84-49.

Figs. 311, 346, 350, 354-56, 373, and 716, *Phase Diagrams For Ceramists*, The American Ceramic Society, 1964, pp. 122, 136, 138, 140, 144, 248.

Figs. 2340-44, 2363, 2370, 2374-75, 2382-83, 2385, 2387, 2390, and 2392, *Phase Diagrams For Ceramists, 1969 Supplement*, The American Ceramic Society, 1969, pp. 95-6, 100, 102-03, 105-08.

Figs. 4366-71, 4377-78, 4404-05, 4417, 4426, 4430, 4433, 4437, 4440, 4444, 4457, 4572, and 4602, *Phase Diagrams For Ceramists, 1975 Supplement*, The American Ceramic Society, 1975, pp. 130-32, 135-36, 147, 152, 157, 159-60, 163-64, 166, 172-73, 238, 257.

Figs. 5042, 5211, 5217, 5224, 5228, 5232, 5237, 5239, 5241, 5245, 5251, 5257, 5418, and 5437, *Phase Diagrams For Ceramists, vol. IV*, The American Ceramic Society, 1981, pp. 29, 125, 127, 129-31, 133, 135-37, 139, 141, 143, 220, 228.

* cited by examiner

$Al_2O_3$-$Y_2O_3$-$ZrO_2$/$HfO_2$ MATERIALS, AND METHODS OF MAKING AND USING THE SAME

This application is a continuation-in-part of U.S. Ser. No. 09/922,530, filed Aug. 2, 2001 now abandoned, the disclosure of which is incorporated herein by reference.

FIELD OF THE INVENTION

The present invention relates to $Al_2O_3$—$Y_2O_3$—$ZrO_2$/$HfO_2$ amorphous and/or ceramic materials (including glasses, crystalline ceramics, and glass-ceramics) and methods of making the same.

DESCRIPTION OF THE RELATED ART

A large number of amorphous (including glass) and glass-ceramic compositions are known. The majority of oxide glass systems utilize well-known glass-formers such as $SiO_2$, $B_2O_3$, $P_2O_5$, $GeO_2$, $TeO_2$, $As_2O_3$, and $V_2O_5$ to aid in the formation of the glass. Some of the glass compositions formed with these glass-formers can be heat-treated to form glass-ceramics. The upper use temperature of glasses and glass-ceramics formed from such glass formers is generally less than 1200° C., typically about 700-800° C. The glass-ceramics tend to be more temperature resistant than the glass from which they are formed.

In addition, many properties of known glasses and glass-ceramics are limited by the intrinsic properties of glass-formers. For example, for $SiO_2$, $B_2O_3$, and $P_2O_5$-based glasses and glass-ceramics, the Young's modulus, hardness, and strength are limited by such glass-formers. Such glass and glass-ceramics generally have inferior mechanical properties as compared, for example, to $Al_2O_3$ or $ZrO_2$. Glass-ceramics having any mechanical properties similar to that of $Al_2O_3$ or $ZrO_2$ would be desirable.

Although some non-conventional glasses such as glasses based on rare earth oxide-aluminum oxide (see, e.g., PCT application having publication No. WO 01/27046 A1, published Apr. 19, 2001, and Japanese Document No. JP 2000-045129, published Feb. 15, 2000) are known, additional novel glasses and glass-ceramic, as well as use for both known and novel glasses and glass-ceramics is desired.

In another aspect, a variety of abrasive particles (e.g., diamond particles, cubic boron nitride particles, fused abrasive particles, and sintered, ceramic abrasive particles (including sol-gel-derived abrasive particles) known in the art. In some abrading applications, the abrasive particles are used in loose form, while in others the particles are incorporated into abrasive products (e.g., coated abrasive products, bonded abrasive products, non-woven abrasive products, and abrasive brushes). Criteria used in selecting abrasive particles used for a particular abrading application include: abrading life, rate of cut, substrate surface finish, grinding efficiency, and product cost.

From about 1900 to about the mid-1980's, the premier abrasive particles for abrading applications such as those utilizing coated and bonded abrasive products were typically fused abrasive particles. There are two general types of fused abrasive particles: (1) fused alpha alumina abrasive particles (see, e.g., U.S. Pat. No. 1,161,620 (Coulter), U.S. Pat. No. 1,192,709 (Tone), U.S. Pat. No. 1,247,337 (Saunders et al.), U.S. Pat. No. 1,268,533 (Allen), and U.S. Pat. No. 2,424,645 (Baumann et al.)), and (2) fused (sometimes also referred to as "co-fused") alumina-zirconia abrasive particles (see, e.g., U.S. Pat. No. 3,891,408 (Rowse et al.), U.S. Pat. No. 3,781,172 (Pett et al.), U.S. Pat. No. 3,893,826 (Quinan et al.), U.S. Pat. No. 4,126,429 (Watson), U.S. Pat. No. 4,457,767 (Poon et al.), and U.S. Pat. No. 5,143,522 (Gibson et al.))(also see, e.g., U.S. Pat. No. 5,023,212 (Dubots et al.), and U.S. Pat. No. 5,336,280 (Dubots et al.), which report the certain fused oxynitride abrasive particles). Fused alumina abrasive particles are typically made by charging a furnace with an alumina source such as aluminum ore or bauxite, as well as other desired additives, heating the material above its melting point, cooling the melt to provide a solidified mass, crushing the solidified mass into particles, and then screening and grading the particles to provide the desired abrasive particle size distribution. Fused alumina-zirconia abrasive particles are typically made in a similar manner, except the furnace is charged with both an alumina source and a zirconia source, and the melt is more rapidly cooled than the melt used to make fused alumina abrasive particles. For fused alumina-zirconia abrasive particles, the amount of alumina source is typically about 50-80 percent by weight, and the amount of zirconia, 50-20 percent by weight zirconia. The processes for making the fused alumina and fused alumina abrasive particles may include removal of impurities from the melt prior to the cooling step.

Although fused alpha alumina abrasive particles and fused alumina-zirconia abrasive particles are still widely used in abrading applications (including those utilizing coated and bonded abrasive products, the premier abrasive particles for many abrading applications since about the mid-1980's are sol-gel-derived alpha alumina particles (see, e.g., U.S. Pat. No. 4,314,827 (Leitheiser et al.), U.S. Pat. No. 4,518,397 (Leitheiser et al.), U.S. Pat. No. 4,623,364 (Cottringer et al.), U.S. Pat. No. 4,744,802 (Schwabel), U.S. Pat. No. 4,770,671 (Monroe et al.), U.S. Pat. No. 4,881,951 (Wood et al.), U.S. Pat. No. 4,960,441 (Pellow et al.), U.S. Pat. No. 5,139,978 (Wood), U.S. Pat. No. 5,201,916 (Berg et al.), U.S. Pat. No. 5,366,523 (Rowenhorst et al.), U.S. Pat. No. 5,429,647 (Larmie), U.S. Pat. No. 5,547,479 (Conwell et al.), U.S. Pat. No. 5,498,269 (Larmie), U.S. Pat. No. 5,551,963 (Larmie), and U.S. Pat. No. 5,725,162 (Garg et al.)).

The sol-gel-derived alpha alumina abrasive particles may have a microstructure made up of very fine alpha alumina crystallites, with or without the presence of secondary phases added. The grinding performance of the sol-gel derived abrasive particles on metal, as measured, for example, by life of abrasive products made with the abrasive particles was dramatically longer than such products made from conventional fused alumina abrasive particles.

Typically, the processes for making sol-gel-derived abrasive particles are more complicated and expensive than the processes for making conventional fused abrasive particles. In general, sol-gel-derived abrasive particles are typically made by preparing a dispersion or sol comprising water, alumina monohydrate (boehmite), and optionally peptizing agent (e.g., an acid such as nitric acid), gelling the dispersion, drying the gelled dispersion, crushing the dried dispersion into particles, screening the particles to provide the desired sized particles, calcining the particles to remove volatiles, sintering the calcined particles at a temperature below the melting point of alumina, and screening and grading the particles to provide the desired abrasive particle size distribution. Frequently a metal oxide modifier(s) is incorporated into the sintered abrasive particles to alter or otherwise modify the physical properties and/or microstructure of the sintered abrasive particles.

There are a variety of abrasive products (also referred to "abrasive articles") known in the art. Typically, abrasive products include binder and abrasive particles secured within the abrasive product by the binder. Examples of abrasive products include: coated abrasive products, bonded abrasive products, nonwoven abrasive products, and abrasive brushes.

Examples of bonded abrasive products include: grinding wheels, cutoff wheels, and honing stones. The main types of bonding systems used to make bonded abrasive products are: resinoid, vitrified, and metal. Resinoid bonded abrasives utilize an organic binder system (e.g., phenolic binder systems) to bond the abrasive particles together to form the shaped mass (see, e.g., U.S. Pat. No. 4,741,743 (Narayanan et al.), U.S. Pat. No. 4,800,685 (Haynes et al.), U.S. Pat. No. 5,037,453 (Narayanan et al.), and U.S. Pat. No. 5,110,332 (Narayanan et al.)). Another major type are vitrified wheels in which a glass binder system is used to bond the abrasive particles together mass (see, e.g., U.S. Pat. No. 4,543,107 (Rue), U.S. Pat. No. 4,898,587 (Hay et al.), U.S. Pat. No. 4,997,461 (Markhoff-Matheny et al.), and U.S. Pat. No. 5,863,308 (Qi et al.)). These glass bonds are usually matured at temperatures between 900° C. to 1300° C. Today vitrified wheels utilize both fused alumina and sol-gel-derived abrasive particles. However, fused alumina-zirconia is generally not incorporated into vitrified wheels due in part to the thermal stability of alumina-zirconia. At the elevated temperatures at which the glass bonds are matured, the physical properties of alumina-zirconia degrade, leading to a significant decrease in their abrading performance. Metal bonded abrasive products typically utilize sintered or plated metal to bond the abrasive particles.

The abrasive industry continues to desire abrasive particles and abrasive products that are easier to make, cheaper to make, and/or provide performance advantage(s) over conventional abrasive particles and products.

SUMMARY OF THE INVENTION

The present invention provides amorphous (including glasses) and/or ceramic (including glass, crystalline ceramic, glass-ceramic) materials comprising (on a theoretical oxide basis; e.g., may be present as a reaction product (e.g., $Y_3AL_5O_{12}$)), $Al_2O_3$, $Y_2O_3$, and at least one of $ZrO_2$ or $HfO_2$, including glass, crystalline ceramic (e.g., crystallites of a complex metal oxide(s) (e.g., complex $Al_2O_3.Y_2O_3$) and/or $ZrO_2$), and glass-ceramic materials, wherein in amorphous materials not having a $T_g$, certain preferred embodiments have x, y, and z dimensions each perpendicular to each other, and wherein each of the x, y, and z dimensions is at least 5 mm (in some embodiments at least 10 mm), the x, y, and z dimensions is at least 30 micrometers, 35 micrometers, 40 micrometers, 45 micrometers, 50 micrometers, 75 micrometers, 100 micrometers, 150 micrometers, 200 micrometers, 250 micrometers, 500 micrometers, 1000 micrometers, 2000 micrometers, 2500 micrometers, 1 mm, 5 mm, or even at least 10 mm. The x, y, and z dimensions of a material are determined either visually or using microscopy, depending on the magnitude of the dimensions. The reported z dimension is, for example, the diameter of a sphere, the thickness of a coating, or the longest length of a prismatic shape. Some embodiments of ceramic materials according to the present invention may comprise, for example, less than 40 (35, 30, 25, 20, 15, 10, 5, 3, 2, 1, or even zero) percent by weight traditional glass formers such as $SiO_2$, $As_2O_3$, $B_2O_3$, $P_2O_5$, $GeO_2$, $TeO_2$, $V_2O_5$, and/or combinations thereof, based on the total weight of the ceramic. Ceramics according to the present invention may comprise, for example, at least 1, 2, 3, 5, 10, 15, 20, 25, 30, 35, 40, 45, 50, 55, 60, 65, 70, 75, 80, 85, 90, 95, or even 100 percent by volume amorphous material. Some embodiments of ceramics according to the present invention may comprise, for example, at least 1, 2, 3, 5, 10, 15, 20, 25, 30, 35, 40, 45, 50, 55, 60, 65, 70, 75, 80, 85, 90, 95, 97, 98, 99, or even 100 percent by volume crystalline ceramic, based on the total volume of the ceramic.

Typically, ceramics according to the present invention comprises at least 30 percent by weight of the $Al_2O_3$, based on the total weight of the ceramic. More typically, ceramics according to the present invention comprise at least 30 (desirably, in a range of about 30 to about 60) percent by weight $Al_2O_3$, at least 20 (about 20 to about 65) percent by weight $Y_2O_3$, and at least 5 (about 5 to about 30) percent by weight $ZrO_2$ and/or $HfO_2$, based on the total weight of the ceramic. The weight ratio of $ZrO_2$:$HfO_2$ can range of 1:zero (i.e., all $ZrO_2$; no $HfO_2$) to zero:1, as well as, for example, at least about 99, 98, 97, 96, 95, 90, 85, 80, 75, 70, 65, 60, 55, 50, 45, 40, 35, 30, 25, 20, 20, 15, 10, and 5 parts (by weight) $ZrO_2$ and a corresponding amount of $HfO_2$ (e.g., at least about 99 parts (by weight) $ZrO_2$ and not greater than about 1 part $HfO_2$) and at least about 99, 98, 97, 96, 95, 90, 85, 80, 75, 70, 65, 60, 55, 50, 45, 40, 35, 30, 25, 20, 20, 15, 10, and 5 parts $HfO_2$ and a corresponding amount of $ZrO_2$. Optionally, ceramics according to the present invention further comprise REO.

For ceramics according to the present invention comprising crystalline ceramic, some embodiments include those wherein, the ceramic (a) exhibits a microstructure comprising crystallites (e.g., crystallites of a complex metal oxide(s) (e.g., complex $Al_2O_3.Y_2O_3$) and/or $ZrO_2$) having an average crystallite size of less than 1 micrometer (typically, less than 500 nanometers, even less than 300, 200, or 150 nanometers; and in some embodiments, less than 100, 75, 50, 25, or 20 nanometers), and (b) is free of at least one of eutectic microstructure features (i.e., is free of colonies and lamellar structure) or a non-cellular microstructure. It is also within the scope of the present invention for some embodiments to have at least one crystalline phase within a specified average crystallite value and at least one (different) crystalline phase outside of a specified average crystallite value.

Some embodiments of the present invention include amorphous material comprising $Al_2O_3$, $Y_2O_3$, and at least one of $ZrO_2$ or $HfO_2$, wherein at least 80 (85, 90, 95, 97, 98, 99, or even 100) percent by weight of the amorphous material collectively comprises the $Al_2O_3$, $Y_2O_3$, and at least one of $ZrO_2$ or $HfO_2$, based on the total weight of the amorphous material.

Some embodiments of the present invention include amorphous material comprising $Al_2O_3$, $Y_2O_3$, and at least one of $ZrO_2$ or $HfO_2$, wherein at least 60 (65, 70, 75, 80, 85, 90, 95, 97, 98, 99, or even 100) percent by weight of the amorphous material collectively comprises the $Al_2O_3$, $Y_2O_3$, and at least one of $ZrO_2$ or $HfO_2$, and less than 20 (preferably, less than 15, 10, 5, or even 0) percent by weight $SiO_2$ and less than 20 (preferably, less than 15, 10, 5, or even 0) percent by weight $B_2O_3$, based on the total weight of the amorphous material.

Some embodiments of the present invention include provides amorphous material comprising $Al_2O_3$, $Y_2O_3$, and at least one of $ZrO_2$ or $HfO_2$, wherein at least 60 (65, 70, 75, 80, 85, 90, 95, 97, 98, 99, or even 100) percent by weight of the amorphous material collectively comprises the $Al_2O_3$, $Y_2O_3$, and at least one of $ZrO_2$ or $HfO_2$, and less than 40 (preferably, less than 35, 30, 25, 20, 15, 10, 5, or even 0) percent by weight collectively $SiO_2$, $B_2O_3$, and $P_2O_5$, based on the total weight of the amorphous material.

Some embodiments of the present invention include ceramic comprising amorphous material (e.g., at least 5, 10, 15, 20, 25, 30, 35, 40, 45, 50, 55, 60, 65, 70, 75, 80, 85, 90, 95, 97, 98, 99, or even 100 percent by volume amorphous material), the amorphous material comprising $Al_2O_3$, $Y_2O_3$, and at least one of $ZrO_2$ or $HfO_2$, wherein at least 80 (85, 90, 95, 97, 98, 99, or even 100) percent by weight of the amorphous material collectively comprises the $Al_2O_3$, $Y_2O_3$, and at least one of $ZrO_2$ or $HfO_2$, based on the total weight of the amorphous material.

Some embodiments of the present invention include ceramic comprising amorphous material (e.g., at least 5, 10, 15, 20, 25, 30, 35, 40, 45, 50, 55, 60, 65, 70, 75, 80, 85, 90, 95, 97, 98, 99, or even 100 percent by volume amorphous material), the amorphous material comprising $Al_2O_3$, $Y_2O_3$, and at least one of $ZrO_2$ or $HfO_2$, wherein at least 60 (65, 70, 75, 80, 85, 90, 95, 97, 98, 99, or even 100) percent by weight of the amorphous material collectively comprises the $Al_2O_3$, $Y_2O_3$, and at least one of $ZrO_2$ or $HfO_2$, and less than 20 (preferably, less than 15, 10, 5, or even 0) percent by weight $SiO_2$, and less than 20 percent by weight $B_2O_3$, based on the total weight of the amorphous material. The ceramic may further comprise crystalline ceramic (e.g., at least 95, 90, 85, 80, 75, 70, 65, 60, 55, 50, 45, 40, 35, 30, 25, 20, 15, 10, 5, 3, 2, or 1 percent by volume crystalline ceramic).

Some embodiments of the present invention include ceramic comprising amorphous material (e.g., at least 5, 10, 15, 20, 25, 30, 35, 40, 45, 50, 55, 60, 65, 70, 75, 80, 85, 90, 95, 97, 98, 99, or even 100 percent by volume amorphous material), the amorphous material comprising $Al_2O_3$, $Y_2O_3$, and at least one of $ZrO_2$ or $HfO_2$, wherein at least 60 (65, 70, 75, 80, 85, 90, 95, 97, 98, 99, or even 100) percent by weight of the amorphous material collectively comprises the $Al_2O_3$, $Y_2O_3$, and at least one of $ZrO_2$ or $HfO_2$, and less than 40 percent by weight collectively $SiO_2$, $B_2O_3$, and $P_2O_5$, based on the total weight of the amorphous material. The ceramic may further comprise crystalline ceramic (e.g., at least 95, 90, 85, 80, 75, 70, 65, 60, 55, 50, 45, 40, 35, 30, 25, 20, 15, 10, 5, 3, 2, or 1 percent by volume crystalline ceramic).

Some embodiments of the present invention include glass-ceramic comprising $Al_2O_3$, $Y_2O_3$, and at least one of $ZrO_2$ or $HfO_2$, wherein at least 80 (85, 90, 95, 97, 98, 99, or even 100) percent by weight of the glass-ceramic collectively comprises the $Al_2O_3$, $Y_2O_3$, and at least one of $ZrO_2$ or $HfO_2$, based on the total weight of the glass-ceramic. The glass-ceramic may comprise, for example, at least 1, 2, 3, 5, 10, 15, 20, 25, 30, 35, 40, 45, 50, 55, 60, 65, 70, 75, 80, 85, 90, or 95 percent by volume glass. The glass-ceramic may comprise, for example, at least 99, 98, 97, 95, 90, 85, 80, 75, 70, 65, 60, 55, 50, 45, 40, 35, 30, 25, 20, 15, 10, or 5 percent by volume crystalline ceramic.

Some embodiments of the present invention include glass-ceramic comprising $Al_2O_3$, $Y_2O_3$, and at least one of $ZrO_2$ or $HfO_2$, wherein at least 60 (65, 70, 75, 80, 85, 90, 95, 97, 98, 99, or even 100) percent by weight of the glass-ceramic collectively comprises the $Al_2O_3$, $Y_2O_3$, and at least one of $ZrO_2$ or $HfO_2$, and less than 20 (preferably, less than 15, 10, 5, or even 0) percent by weight $SiO_2$ and less than 20 (preferably, less than 15, 10, 5, or even 0) percent by weight $B_2O_3$, based on the total weight of the glass-ceramic. The glass-ceramic may comprise, for example, at least 1, 2, 3, 5, 10, 15, 20, 25, 30, 35, 40, 45, 50, 55, 60, 65, 70, 75, 80, 85, 90, or 95 percent by volume glass. The glass-ceramic may comprise, for example, at least 99, 98, 97, 95, 90, 85, 80, 75, 70, 65, 60, 55, 50, 45, 40, 35, 30, 25, 20, 15, 10, or 5 percent by volume crystalline ceramic.

Some embodiments of the present invention include glass-ceramic comprising $Al_2O_3$, $Y_2O_3$, and at least one of $ZrO_2$ or $HfO_2$, wherein at least 60 (65, 70, 75, 80, 85, 90, 95, 97, 98, 99, or even 100) percent by weight of the glass-ceramic collectively comprises the $Al_2O_3$, $Y_2O_3$, and at least one of $ZrO_2$ or $HfO_2$, and less than 40 percent by weight collectively $SiO_2$, $B_2O_3$, and $P_2O_5$, based on the total weight of the glass-ceramic. The glass-ceramic may comprise, for example, at least 1, 2, 3, 5, 10, 15, 20, 25, 30, 35, 40, 45, 50, 55, 60, 65, 70, 75, 80, 85, 90, 95, percent by volume amorphous material. The glass-ceramic may comprise, for example, at least 99, 98, 97, 95, 90, 85, 80, 75, 70, 65, 60, 55, 50, 45, 40, 35, 30, 25, 20, 15, 10, or 5 percent by volume crystalline ceramic.

Some embodiments of the present invention include glass-ceramic comprising $Al_2O_3$, $Y_2O_3$, and at least one of $ZrO_2$ or $HfO_2$, wherein the glass-ceramic (a) exhibits a microstructure comprising crystallites (e.g., crystallites of a complex metal oxide(s) (e.g., complex $Al_2O_3 \cdot Y_2O_3$) and/or $ZrO_2$) having an average crystallite size of less than 1 micrometer (typically, less than 500 nanometers, or even less than 300, 220, or 150 nanometers; and in some embodiments, less than 100, 75, 50, 25, or 20 nanometers), and (b) is free of eutectic microstructure features. Some embodiments of the present invention include glass-ceramic comprising $Al_2O_3$, $Y_2O_3$, and at least one of $ZrO_2$ or $HfO_2$, wherein the glass-ceramic (a) exhibits a non-cellular microstructure comprising crystallites (e.g., crystallites of a complex metal oxide(s) (e.g., complex $Al_2O_3 \cdot Y_2O_3$) and/or $ZrO_2$) having an average crystallite size of less than 1 micrometer (typically, less than 500 nanometers, even less than 300, 200, or 150 nanometers; and in some embodiments, less than 100, 75, 50, 25, or 20 nanometers). The glass-ceramic may comprise, for example, at least 1, 2, 3, 5, 10, 15, 20, 25, 30, 35, 40, 45, 50, 55, 60, 65, 70, 75, 80, 85, 90, 95, percent by volume amorphous material. The glass-ceramic may comprise, for example, at least 99, 98, 97, 95, 90, 85, 80, 75, 70, 65, 60, 55, 50, 45, 40, 35, 30, 25, 20, 15, 10, or 5 percent by volume crystalline ceramic. It is also within the scope of the present invention for some embodiments to have at least one crystalline phase within a specified average crystallite value and at least one (different) crystalline phase outside of a specified average crystallite value.

Some embodiments of the present invention include ceramic comprising crystalline ceramic (e.g., at least 1, 2, 3, 5, 10, 15, 20, 25, 30, 35, 40, 45, 50, 55, 60, 65, 70, 75, 80, 85, 90, 95, 97, 98, 99, or even 100 percent by volume crystalline ceramic), the crystalline ceramic comprising $Al_2O_3$, $Y_2O_3$, and at least one of $ZrO_2$ or $HfO_2$, wherein at least 80 (85, 90, 95, 97, 98, 99, or even 100) percent by weight of the crystalline ceramic collectively comprises the $Al_2O_3$, $Y_2O_3$, and at least one of $ZrO_2$ or $HfO_2$, based on the total weight of the crystalline ceramic. Some desirable embodiments include those wherein the ceramic (a) exhibits a microstructure comprising crystallites (e.g., crystallites of a complex metal oxide(s) (e.g., complex $Al_2O_3 \cdot Y_2O_3$) and/or $ZrO_2$) having an average crystallite size of less than 1 micrometer (typically, less than 500 nanometers, or even less than 300, 200, or 150 nanometers; and in some embodiments, less than 100, 75, 50, 25, or 20 nanometers), and (b) is free of eutectic microstructure features. Some embodiments of the present invention include those wherein the ceramic (a) exhibits a non-cellular microstructure comprising crystallites (e.g., crystallites of a complex metal oxide(s) (e.g., complex $Al_2O_3$ $Y_2O_3$) and/or $ZrO_2$) having an average crystallite size of less than 1 micrometer (typically, less than 500 nanometers, even less than 300, 200, or 150 nanometers; and in some embodiments, less than 100, 75, 50, 25, or 20 nanometers). The ceramic may comprise, for example, at least 99, 98, 97, 95, 90, 85, 80, 75, 70, 65, 60, 55, 50, 45, 40, 35, 30, 25, 20, 15, 10, 5, 3, 2, or 1 percent by volume amorphous material. It is also within the scope of the present invention for some embodiments to have at least one crystalline phase within a specified average crystallite value and at least one (different) crystalline phase outside of a specified average crystallite value.

Some embodiments of the present invention include ceramic comprising crystalline ceramic (e.g., at least 1, 2, 3, 5, 10, 15, 20, 25, 30, 35, 40, 45, 50, 55, 60, 65, 70, 75, 80, 85, 90, 95, 97, 98, 99, or even 100 percent by volume crystalline ceramic), the crystalline ceramic comprising $Al_2O_3$, $Y_2O_3$, and at least one of $ZrO_2$ or $HfO_2$, wherein at least 60 (65, 70, 75, 80, 85, 90, 95, 97, 98, 99, or even 100) percent by volume crystalline ceramic), the crystalline ceramic comprises the $Al_2O_3$, $Y_2O_3$, and at least one of $ZrO_2$ or $HfO_2$, wherein at least 60 (65, 70, 75, 80, 85, 90, 95, 97, 98, 99, or even 100) percent by weight of the crystalline ceramic collectively comprises the $Al_2O_3$.$Y_2O_3$, and at least one of $ZrO_2$ or $HfO_2$, and less than 20 (preferably, less than 15, 10, 5, or even 0) percent by weight $SiO_2$ and less than 20 (preferably, less than 15, 10, 5, or even 0) percent by weight $B_2O_3$, based on the total weight of the crystalline ceramic. Some desirable embodiments include those wherein the ceramic (a) exhibits a microstructure comprising crystallites (e.g., crystallites of a complex metal oxide(s) (e.g., complex $Al_2O_3$.$Y_2O_3$) and/or $ZrO_2$) having an average crystallite size of less than 1 micrometer (typically, less than 500 nanometers, or even less than 300, 200, or 150 nanometers; and in some embodiments, less than 100, 75, 50, 25, or 20 nanometers), and (b) is free of eutectic microstructure features. Some embodiments of the present invention include those wherein the ceramic (a) exhibits a non-cellular microstructure comprising crystallites (e.g., crystallites of a complex metal oxide(s) (e.g., complex $Al_2O_3$.$Y_2O_3$) and/or $ZrO_2$) having an average crystallite size of less than 1 micrometer (typically, less than 500 nanometers, even less than 300, 200, or 150 nanometers; and in some embodiments, less than 100, 75, 50, 25, or 20 nanometers). The ceramic may comprise, for example, at least 99, 98, 97, 95, 90, 85, 80, 75, 70, 65, 60, 55, 50, 45, 40, 35, 30, 25, 20, 15, 10, 5, 3, 2, or 1 percent by volume amorphous material. It is also within the scope of the present invention for some embodiments to have at least one crystalline phase within a specified average crystallite value and at least one (different) crystalline phase outside of a specified average crystallite value.

Some embodiments of the present invention include ceramic comprising crystalline ceramic (e.g., at least 1, 2, 3, 5, 10, 15, 20, 25, 30, 35, 40, 45, 50, 55, 60, 65, 70, 75, 80, 85, 90, 95, 97, 98, 99, or even 100 percent by volume crystalline ceramic), the crystalline ceramic comprising $Al_2O_3$, $Y_2O_3$, and at least one of $ZrO_2$ or $HfO_2$, wherein at least 60 (65, 70, 75, 80, 85, 90, 95, 97, 98, 99, or even 100) percent by weight of the crystalline ceramic collectively comprises the $Al_2O_3$, $Y_2O_3$, and at least one of $ZrO_2$ or $HfO_2$, and less than 40 percent by weight collectively $SiO_2$, $B_2O_3$, and $P_2O_5$, based on the total weight of the crystalline ceramic. Some desirable embodiments include those wherein the ceramic (a) exhibits a microstructure comprising crystallites (e.g., crystallites of a complex metal oxide(s) (e.g., complex $Al_2O_3$.$Y_2O_3$) and/or $ZrO_2$) having an average crystallite size of less than 1 micrometer (typically, less than 500 nanometers, or even less than less than 300, 200, or 150 nanometers; and in some embodiments, less than 100, 75, 50, 25, or 20 nanometers), and (b) is free of eutectic microstructure features. Some embodiments of the present invention include those wherein the ceramic (a) exhibits a non-cellular microstructure comprising crystallites (e.g., crystallites of a complex metal oxide(s) (e.g., complex $Al_2O_3$.$Y_2O_3$) and/or $ZrO_2$) having an average crystallite size of less than 1 micrometer (typically, less than 500 nanometers, even less than 300, 200, or 150 nanometers; and in some embodiments, less than 100, 75, 50, 25, or 20 nanometers). The ceramic may comprise, for example, at least 99, 98, 97, 95, 90, 85, 80, 75, 70, 65, 60, 55, 50, 45, 40, 35, 30, 25, 20, 15, 10, 5, 3, 2, or 1 percent by volume amorphous material. It is also within the scope of the present invention for some embodiments to have at least one crystalline phase within a specified average crystallite value and at least one (different) crystalline phase outside of a specified average crystallite value.

Some embodiments of the present invention include ceramic comprising crystalline ceramic (e.g., at least 1, 2, 3, 5, 10, 15, 20, 25, 30, 35, 40, 45, 50, 55, 60, 65, 70, 75, 80, 85, 90, 95, 97, 98, 99, or even 100 percent by volume crystalline ceramic), the ceramic comprising $Al_2O_3$, $Y_2O_3$, and at least one of $ZrO_2$ or $HfO_2$. Some desirable embodiments include those wherein the ceramic (a) exhibits a microstructure comprising crystallites (e.g., crystallites of a complex metal oxide(s) (e.g., complex $Al_2O_3$ $Y_2O_3$) and/or $ZrO_2$) having an average crystallite size of less than 1 micrometer (typically, less than 500 nanometers, or even less than 300, 200, or 150 nanometers; and in some embodiments, less than 100, 75, 50, 25, or 20 nanometers), and (b) is free of eutectic microstructure features. Some embodiments of the present invention include those wherein the ceramic (a) exhibits a non-cellular microstructure comprising crystallites (e.g., crystallites of a complex metal oxide(s) (e.g., complex $Al_2O_3$.$Y_2O_3$) and/or $ZrO_2$) having an average crystallite size of less than 1 micrometer (typically, less than 500 nanometers, even less than 300, 200, or 150 nanometers; and in some embodiments, less than 100, 75, 50, 25, or 20 nanometers). The ceramic may comprise, for example, at least 99, 98, 97, 95, 90, 85, 80, 75, 70, 65, 60, 55, 50, 45, 40, 35, 30, 25, 20, 15, 10, 5, 3, 2, or 1 percent by volume glass. It is also within the scope of the present invention for some embodiments to have at least one crystalline phase within a specified average crystallite value and at least one (different) crystalline phase outside of a specified average crystallite value.

Some embodiments of the present invention include ceramic comprising crystalline ceramic (e.g., at least 1, 2, 3, 5, 10, 15, 20, 25, 30, 35, 40, 45, 50, 55, 60, 65, 70, 75, 80, 85, 90, 95, 97, 98, 99, or even 100 percent by volume crystalline ceramic), the ceramic comprising $Al_2O_3$, $Y_2O_3$, and at least one of $ZrO_2$ or $HfO_2$, wherein at least 80 (85, 90, 95, 97, 98, 99, or even 100) percent by weight of the ceramic collectively comprises the $Al_2O_3$, $Y_2O_3$, and at least one of $ZrO_2$ or $HfO_2$, based on the total weight of the ceramic. Some desirable embodiments include those wherein the ceramic (a) exhibits a microstructure comprising crystallites (e.g., crystallites of a complex metal oxide(s) (e.g., complex $Al_2O_3$.$Y_2O_3$) and/or $ZrO_2$) having an average crystallite size of less than 1 micrometer (typically, less than 500 nanometers, or even less than 300, 200, or 150 nanometers; and in some embodiments, less than 100, 75, 50, 25, or 20 nanometers), and (b) is free of eutectic microstructure features. Some embodiments of the present invention include those wherein the ceramic (a) exhibits a non-cellular microstructure comprising crystallites (e.g., crystallites of a complex metal oxide(s) (e.g., complex $Al_2O_3$.$Y_2O_3$) and/or $ZrO_2$) having an average crystallite size of less than 1 micrometer (typically, less than 500 nanometers, even less than 300, 200, or 150 nanometers; and in some embodiments, less than 100, 75, 50, 25, or 20 nanometers). The ceramic may comprise, for example, at least 99, 98, 97, 95, 90, 85, 80, 75, 70, 65, 60, 55, 50, 45, 40, 35, 30, 25, 20, 15, 10, 5, 3, 2, or 1 percent by volume glass. It is also within the scope of the present invention for some embodiments to have at least one crystalline phase within a specified average crystallite value and at least one (different) crystalline phase outside of a specified average crystallite value.

Some embodiments of the present invention include ceramic comprising crystalline ceramic (e.g., at least 1, 2, 3, 5, 10, 15, 20, 25, 30, 35, 40, 45, 50, 55, 60, 65, 70, 75, 80, 85, 90, 95, 97, 98, 99, or even 100 percent by volume crystalline ceramic), the ceramic comprising $Al_2O_3$, $Y_2O_3$, and at least one of $ZrO_2$ or $HfO_2$, wherein at least 60 (65, 70, 75, 80, 85, 90, 95, 97, 98, 99, or even 100) percent by weight of the ceramic collectively comprises the $Al_2O_3$, $Y_2O_3$, and at least one of $ZrO_2$ or $HfO_2$, and less than 20 (preferably, less than 15, 10, 5, or even 0) percent by weight $SiO_2$ and less than 20 (preferably, less than 15, 10, 5, or even 0) percent by weight $B_2O_3$, based on the total weight of the ceramic. Some desirable embodiments include those wherein the ceramic (a) exhibits a microstructure comprising crystallites (e.g., crystallites of a complex metal oxide(s) (e.g., complex $Al_2O_3$ $Y_2O_3$) and/or $ZrO_2$) having an average crystallite size of less than 1 micrometer (typically, less than 500 nanometers, or even less than 300, 200, or 150 nanometers; and in some embodiments, less than 100, 75, 50, 25, or 20 nanometers), and (b) is free of eutectic microstructure features. Some embodiments of the present invention include those wherein the ceramic (a) exhibits a non-cellular microstructure comprising crystallites (e.g., crystallites of a complex metal oxide(s) (e.g., complex $Al_2O_3.Y_2O_3$) and/or $ZrO_2$) having an average crystallite size of less than 1 micrometer (typically, less than 500 nanometers, even less than 300, 200, or 150 nanometers; and in some embodiments, less than 100, 75, 50, 25, or 20 nanometers). The ceramic may comprise, for example, at least 99, 98, 97, 95, 90, 85, 80, 75, 70, 65, 60, 55, 50, 45, 40, 35, 30, 25, 20, 15, 10, 5, 3, 2, or 1 percent by volume glass. It is also within the scope of the present invention for some embodiments to have at least one crystalline phase within a specified average crystallite value and at least one (different) crystalline phase outside of a specified average crystallite value.

Some embodiments of the present invention include ceramic comprising crystalline ceramic (e.g., at least 1, 2, 3, 5, 10, 15, 20, 25, 30, 35, 40, 45, 50, 55, 60, 65, 70, 75, 80, 85, 90, 95, 97, 98, 99, or even 100 percent by volume crystalline ceramic), the ceramic comprising $Al_2O_3$, $Y_2O_3$, and at least one of $ZrO_2$ or $HfO_2$, wherein at least 60 (65, 70, 75, 80, 85, 90, 95, 97, 98, 99, or even 100) percent by weight of the ceramic collectively comprises the $Al_2O_3$, $Y_2O_3$, and at least one of $ZrO_2$ or $HfO_2$, and less than 40 percent by weight collectively $SiO_2$, $B_2O_3$, and $P_2O_5$, based on the total weight of the ceramic. Some desirable embodiments include those wherein the ceramic (a) exhibits a microstructure comprising crystallites (e.g., crystallites of a complex metal oxide(s) (e.g., complex $Al_2O_3$ $Y_2O_3$) and/or $ZrO_2$) having an average crystallite size of less than 1 micrometer (typically, less than 500 nanometers, or even less than 300, 200, or 150 nanometers; and in some embodiments, less than 100, 75, 50, 25, or 20 nanometers), and (b) is free of eutectic microstructure features. Some embodiments of the present invention include those wherein the ceramic (a) exhibits a non-cellular microstructure comprising crystallites (e.g., crystallites of a complex metal oxide(s) (e.g., complex $Al_2O_3.Y_2O_3$) and/or $ZrO_2$) having an average crystallite size of less than 1 micrometer (typically, less than 500 nanometers, even less than 300, 200, or 150 nanometers; and in some embodiments, less than 100, 75, 50, 25, or 20 nanometers). The ceramic may comprise, for example, at least 99, 98, 97, 95, 90, 85, 80, 75, 70, 65, 60, 55, 50, 45, 40, 35, 30, 25, 20, 15, 10, 5, 3, 2, or 1 percent by volume glass. It is also within the scope of the present invention for some embodiments to have at least one crystalline phase within a specified average crystallite value and at least one (different) crystalline phase outside of a specified average crystallite value.

Some embodiments of the present invention include glass-ceramic comprising $Al_2O_3$, $Y_2O_3$, and at least one of $ZrO_2$ or $HfO_2$, wherein the glass-ceramic (a) exhibits a microstructure comprising crystallites (e.g., crystallites of a complex metal oxide(s) (e.g., complex $Al_2O_3.Y_2O_3$) and/or $ZrO_2$) having an average crystallite size of less than 200 nanometers (150 nanometers, 100 nanometers, 75 nanometers, or even 50 nanometers) and (b) has a density of at least 90% (95%, 96%, 97%, 98%, 99%, 99.5%, or 100%) of theoretical density. Some embodiments can be free of at least one of eutectic microstructure features or a non-cellular microstructure. It is also within the scope of the present invention for some embodiments to have at least one crystalline phase within a specified average crystallite value and at least one (different) crystalline phase outside of a specified average crystallite value.

Some embodiments of the present invention include glass-ceramic comprising $Al_2O_3$, $Y_2O_3$, and at least one of $ZrO_2$ or $HfO_2$, herein the glass-ceramic (a) exhibits a microstructure comprising crystallites (e.g., crystallites of a complex metal oxide(s) (e.g., complex $Al_2O_3.Y_2O_3$) and/or $ZrO_2$), wherein none of the crystallites are greater than 200 nanometers (150 nanometers, 100 nanometers, 75 nanometers, or even 50 nanometers) in size and (b) has a density of at least 90% (95%, 96%, 97%, 98%, 99%, 99.5%, or 100%) of theoretical density. Some embodiments can be free of at least one of eutectic microstructure features or a non-cellular microstructure. It is also within the scope of the present invention for some embodiments to have at least one crystalline phase within a specified crystallite value and at least one (different) crystalline phase outside of a specified crystallite value.

Some embodiments of the present invention include glass-ceramic comprising $Al_2O_3$, $Y_2O_3$, and at least one of $ZrO_2$ or $HfO_2$, wherein the glass-ceramic (a) exhibits a microstructure comprising crystallites (e.g., crystallites of a complex metal oxide(s) (e.g., complex $Al_2O_3.Y_2O_3$) and/or $ZrO_2$), wherein at least a portion of the crystallites are not greater than 150 nanometers (100 nanometers, 75 nanometers, or even 50 nanometers) in size and (b) has a density of at least 90% (95%, 96%, 97%, 98%, 99%, 99.5%, or 100%) of theoretical density. Some embodiments can be free of at least one of eutectic microstructure features or a non-cellular microstructure. It is also within the scope of the present invention for some embodiments to have at least one crystalline phase within a specified crystallite value and at least one (different) crystalline phase outside of a specified crystallite value.

Some embodiments of the present invention include fully crystallized glass-ceramic comprising $Al_2O_3$, $Y_2O_3$, and at least one of $ZrO_2$ or $HfO_2$ wherein the glass-ceramic (a) exhibits a microstructure comprising crystallites (e.g., crystallites of a complex metal oxide(s) (e.g., complex $Al_2O_3.Y_2O_3$) and/or $ZrO_2$) having an average crystallite size not greater than 1 micrometer (500 nanometers, 300 nanometers, 200 nanometers, 150 nanometers, 100 nanometers, 75 nanometers, or even 50 nanometers) in size and (b) has a density of at least 90% (95%, 96%, 97%, 98%, 99%, 99.5%, or 100%) of theoretical density. Some embodiments can be free of at least one of eutectic microstructure features or a non-cellular microstructure. It is also within the scope of the present invention for some embodiments to have at least one crystalline phase within a specified average crystallite value and at least one (different) crystalline phase outside of a specified average crystallite value.

For ceramics according to the present invention comprising crystalline ceramic, some embodiments include those wherein the ceramic (a) exhibits a microstructure comprising crystallites (e.g., crystallites of a complex metal oxide(s)

(e.g., complex $Al_2O_3 \cdot Y_2O_3$) and/or $ZrO_2$) having an average crystallite size of less than 200 nanometers (150 nanometers, 100 nanometers, 75 nanometers, or even 50 nanometers) and (b) has a density of at least 90% (95%, 96%, 97%, 98%, 99%, 99.5%, or 100%) of theoretical density. Some embodiments can be free of at least one of eutectic microstructure features or a non-cellular microstructure. It is also within the scope of the present invention for some embodiments to have at least one crystalline phase within a specified average crystallite value and at least one (different) crystalline phase outside of a specified average crystallite value.

For ceramics according to the present invention comprising crystalline ceramic, some embodiments include those comprising $Al_2O_3$, $Y_2O_3$, and at least one of $ZrO_2$ or $HfO_2$, wherein the ceramic (a) exhibits a microstructure comprising crystallites (e.g., crystallites of a complex metal oxide(s) (e.g., complex $Al_2O_3$ $Y_2O_3$) and/or $ZrO_2$), wherein none of the crystallites are greater than 200 nanometers (150 nanometers, 100 nanometers, 75 nanometers, or even 50 nanometers) in size and (b) has a density of at least 90% (95%, 96%, 97%, 98%, 99%, 99.5%, or 100%) of theoretical density. Some embodiments can be free of at least one of eutectic microstructure features or a non-cellular microstructure. It is also within the scope of the present invention for some embodiments to have at least one crystalline phase within a specified crystallite value and at least one (different) crystalline phase outside of a specified crystallite value.

For ceramics according to the present invention comprising crystalline ceramic, some embodiments include those comprising $Al_2O_3$, $Y_2O_3$, and at least one of $ZrO_2$ or $HfO_2$, wherein the ceramic (a) exhibits a microstructure comprising crystallites (e.g., crystallites of a complex metal oxide(s) (e.g., complex $Al_2O_3 \cdot Y_2O_3$) and/or $ZrO_2$), wherein at least a portion of the crystallites are not greater than 150 nanometers (100 nanometers, 75 nanometers, or even 50 nanometers) in size and (b) has a density of at least 90% (95%, 96%, 97%, 98%, 99%, 99.5%, or 100%) of theoretical density. Some embodiments can be free of at least one of eutectic microstructure features or a non-cellular microstructure. It is also within the scope of the present invention for some embodiments to have at least one crystalline phase within a specified crystallite value and at least one (different) crystalline phase outside of a specified crystallite value.

For ceramics according to the present invention comprising crystalline ceramic, some embodiments include those comprising $Al_2O_3$, $Y_2O_3$, and at least one of $ZrO_2$ or $HfO_2$, wherein the ceramic (a) exhibits a microstructure comprising crystallites (e.g., crystallites of a complex metal oxide(s) (e.g., complex $Al_2O_3 \cdot Y_2O_3$) and/or $ZrO_2$) having an average crystallite size not greater than 1 micrometer (500 nanometers, 300 nanometers, 200 nanometers, 150 nanometers, 100 nanometers, 75 nanometers, or even 50 nanometers) in size and (b) has a density of at least 90% (95%, 96%, 97%, 98%, 99%, 99.5%, or 100%) of theoretical density. Some embodiments can be free of at least one of eutectic microstructure features or a non-cellular microstructure. It is also within the scope of the present invention for some embodiments to have at least one crystalline phase within a specified crystallite value and at least one (different) crystalline phase outside of a specified average value.

Some embodiments of the present invention include a glass-ceramic comprising alpha $Al_2O_3$, crystalline $ZrO_2$, and a first complex $Al_2O_3 \cdot Y_2O_3$, wherein at least one of the alpha $Al_2O_3$, the crystalline $ZrO_2$, or the first complex $Al_2O_3 \cdot Y_2O_3$ has an average crystal size not greater than 200 nanometers (in some embodiments preferably, not greater than 75 nanometers, or even not greater than 50 nanometers), and wherein the abrasive particles have a density of at least 90 (in some embodiments at least 95, 96, 97, 98, 99, 99.5, or even 100) percent of theoretical density. In some embodiments, preferably at least 75 (80, 85, 90, 95, 97, or even at least 99) percent by number of the crystal sizes are not greater than 200 nanometers. In some embodiments preferably, the glass-ceramic further comprises a second, different complex $Al_2O_3 \cdot Y_2O_3$. In some embodiments preferably, the glass-ceramic further comprises a complex $Al_2O_3 \cdot REO$.

Some embodiments of the present invention a glass-ceramic comprising a first complex $Al_2O_3 \cdot Y_2O_3$, a second, different complex $Al_2O_3 \cdot Y_2O_3$, and crystalline $ZrO_2$, wherein for at least one of the first complex $Al_2O_3 \cdot Y_2O_3$, the second complex $Al_2O_3 \cdot Y_2O_3$, or the crystalline $ZrO_2$, at least 90 (in some embodiments preferably, 95, or even 100) percent by number of the crystal sizes thereof are not greater than 200 nanometers (in some embodiments preferably, not greater than 100 nanometers, not greater than 75 nanometers, or even not greater than 50 nanometers), and wherein the abrasive particles have a density of at least 90 (in some embodiments at least 95, 96, 97, 98, 99, 99.5, or even 100) percent of theoretical density. In some embodiments preferably, the glass-ceramic further comprises a second, different complex $Al_2O_3 \cdot Y_2O_3$. In some embodiments preferably, the glass-ceramic particles further comprises a complex $Al_2O_3 \cdot REO$.

Some embodiments of the present invention include a glass-ceramic comprising a first complex $Al_2O_3 \cdot Y_2O_3$, a second, different complex $Al_2O_3 \cdot Y_2O_3$, and crystalline $ZrO_2$, wherein at least one of the first complex $Al_2O_3 \cdot Y_2O_3$, the second, different complex $Al_2O_3 \cdot Y_2O_3$, or the crystalline $ZrO_2$ has an average crystal size not greater than 100 nanometers (in some embodiments preferably, not greater than 75 nanometers, or even not greater than 50 nanometers), and wherein the abrasive particles have a density of at least 90 (in some embodiments at least 95, 96, 97, 98, 99, 99.5, or even 100) percent of theoretical density. In some embodiments, preferably at least 75 (80, 85, 90, 95, 97, or even at least 99) percent by number of the crystal sizes are not greater than 200 nanometers. In some embodiments preferably, the glass-ceramic further comprises a second, different complex $Al_2O_3 \cdot Y_2O_3$. In some embodiments preferably, the glass-ceramic further comprises a complex $Al_2O_3 \cdot REO$.

Some embodiments of the present invention include a glass-ceramic comprising a first complex $Al_2O_3 \cdot Y_2O_3$, a second, different complex $Al_2O_3 \cdot Y_2O_3$, and crystalline $ZrO_2$, wherein for at least one of the first complex $Al_2O_3 \cdot Y_2O_3$, the second, different complex $Al_2O_3 \cdot Y_2O_3$, or the crystalline $ZrO_2$, at least 90 (in some embodiments preferably, 95, or even 100) percent by number of the crystal sizes thereof are not greater than 200 nanometers (in some embodiments preferably, not greater than 100 nanometers, not greater 75 nanometers, or even not greater 50 nanometers), and wherein the abrasive particles have a density of at least 90 (in some embodiments at least 95, 96, 97, 98, 99, 99.5, or even 100) percent of theoretical density. In some embodiments preferably, the glass-ceramic further comprises a complex $Al_2O_3 \cdot REO$.

In another aspect, the present invention provides methods for making ceramics according to the present invention. For example, the present invention provides a method for making ceramic according to the present invention comprising material (e.g., glass, or glass and crystalline ceramic(including glass-ceramic)), the method comprising:

melting sources of at least $Al_2O_3$, $Y_2O_3$, and at least one of $ZrO_2$ or $HfO_2$ to provide a melt; and cooling the melt to provide ceramic comprising material.

It is also within the scope of the present invention to heat-treat certain amorphous material or ceramics comprising amorphous material described herein to a ceramic comprising crystalline ceramic (including glass-ceramic) (i.e., such that at least a portion of the amorphous material is converted to a glass-ceramic).

In this application:

"amorphous material" refers to material derived from a melt and/or a vapor phase that lacks any long range crystal structure as determined by X-ray diffraction and/or has an exothermic peak corresponding to the crystallization of the amorphous material as determined by a DTA (differential thermal analysis) as determined by the test described herein entitled "Differential Thermal Analysis";

"ceramic" includes glass, crystalline ceramic, glass-ceramic, and combinations thereof;

"complex metal oxide" refers to a metal oxide comprising two or more different metal elements and oxygen (e.g., $CeAl_{11}O_{18}$, $Dy_3Al_5O_{12}$, $MgAl_2O_4$, and $Y_3Al_5O_{12}$);

"complex $Al_2O_3$.metal oxide" refers to a complex metal oxide comprising, on a theoretical oxide basis, $Al_2O_3$ and one or more metal elements other than Al (e.g., $CeAl_{11}O_{18}$, $Dy_3Al_5O_{12}$, $MgAl_2O_4$, and $Y_3Al_5O_{12}$);

"complex $Al_2O_3.Y_2O_3$" refers to a complex metal oxide comprising, on a theoretical oxide basis, $Al_2O_3$ and $Y_2O_3$ (e.g., $Y_3Al_5O_{12}$);

"complex $Al_2O_3$.REO" refers to a complex metal oxide comprising, on a theoretical oxide basis, $Al_2O_3$ and rare earth oxide (e.g., $CeAl_{11}O_{18}$ and $Dy_3Al_5O_{12}$);

"glass" refers to amorphous material exhibiting a glass transition temperature;

"glass-ceramic" refers to ceramics comprising crystals formed by heat-treating amorphous material;

"$T_g$" refers to the glass transition temperature as determined by the test described herein entitled "Differential Thermal Analysis";

"$T_x$" refers to the crystallization temperature as determined by the test described herein entitled "Differential Thermal Analysis";

"rare earth oxides" refers to cerium oxide (e.g., $CeO_2$), dysprosium oxide (e.g., $Dy_2O_3$), erbium oxide (e.g., $Er_2O_3$), europium oxide (e.g., $Eu_2O_3$), gadolinium (e.g., $Gd_2O_3$), holmium oxide (e.g., $Ho_2O_3$), lanthanum oxide (e.g., $La_2O_3$), lutetium oxide (e.g., $Lu_2O_3$), neodymium oxide (e.g., $Nd_2O_3$), praseodymium oxide (e.g., $Pr_6O_{11}$), samarium oxide (e.g., $Sm_2O_3$), terbium (e.g., $Tb_2O_3$), thorium oxide (e.g., $Th_4O_7$), thulium (e.g., $Tm_2O_3$), and ytterbium oxide (e.g., $Yb_2O_3$), and combinations thereof;

"REO" refers to rare earth oxide(s).

Further, it is understood herein that unless it is stated that a metal oxide (e.g., $Al_2O_3$, complex $Al_2O_3$.metal oxide, etc.) is crystalline, for example, in a glass-ceramic, it may be amorphous, crystalline, or portions amorphous and portions crystalline. For example if a glass-ceramic comprises $Al_2O_3$ and $ZrO_2$, the $Al_2O_3$ and $ZrO_2$ may each be in an amorphous state, crystalline state, or portions in an amorphous state and portions in a crystalline state, or even as a reaction product with another metal oxide(s) (e.g., unless it is stated that, for example, $Al_2O_3$ is present as crystalline $Al_2O_3$ or a specific crystalline phase of $Al_2O_3$ (e.g., alpha $Al_2O_3$), it may be present as crystalline $Al_2O_3$ and/or as part of one or more crystalline complex $Al_2O_3$.metal oxides.

Further, it is understood that glass-ceramics formed by heating amorphous material not exhibiting a $T_g$ may not actually comprise glass, but rather may comprise the crystals and amorphous material that does not exhibiting a $T_g$.

Ceramics articles according to the present invention can be made, formed as, or converted into glass beads (e.g., beads having diameters of at least 1 micrometers, 5 micrometers, 10 micrometers, 25 micrometers, 50 micrometers, 100 micrometers, 150 micrometers, 250 micrometers, 500 micrometers, 750 micrometers, 1 mm, 5 mm, or even at least 10 mm), plates, fibers, particles, and coatings (e.g., thin coatings). The glass beads can be useful, for example, in reflective devices such as retroreflective sheeting, alphanumeric plates, and pavement markings. The particles and fibers are useful, for example, as thermal insulation, filler, or reinforcing material in composites (e.g., ceramic, metal, or polymeric matrix composites). The thin coatings can be useful, for example, as protective coatings in applications involving wear, as well as for thermal management. Examples of articles according of the present invention include kitchenware (e.g., plates), dental brackets, and reinforcing fibers, cutting tool inserts, abrasive materials, and structural components of gas engines, (e.g., valves and bearings). Other articles include those having a protective coating of ceramic on the outer surface of a body or other substrate. Certain ceramic particles according to the present invention can be particularly useful as abrasive particles. The abrasive particles can be incorporated into an abrasive article, or used in loose form.

Abrasive articles according to the present invention comprise binder and a plurality of abrasive particles, wherein at least a portion of the abrasive particles are the abrasive particles according to the present invention. Exemplary abrasive products include coated abrasive articles, bonded abrasive articles (e.g., wheels), non-woven abrasive articles, and abrasive brushes. Coated abrasive articles typically comprise a backing having first and second, opposed major surfaces, and wherein the binder and the plurality of abrasive particles form an abrasive layer on at least a portion of the first major surface.

In some embodiments, preferably, at least 5, 10, 15, 20, 25, 30, 35, 40, 45, 50, 55, 60, 65, 70, 75, 80, 85, 90, 95, or even 100 percent by weight of the abrasive particles in an abrasive article are the abrasive particles according to the present invention, based on the total weight of the abrasive particles in the abrasive article.

Abrasive particles are usually graded to a given particle size distribution before use. Such distributions typically have a range of particle sizes, from coarse particles fine particles. In the abrasive art this range is sometimes referred to as a "coarse", "control" and "fine" fractions. Abrasive particles graded according to industry accepted grading standards specify the particle size distribution for each nominal grade within numerical limits. Such industry accepted grading standards (i.e., specified nominal grades) include those known as the American National Standards Institute, Inc. (ANSI) standards, Federation of European Producers of Abrasive Products (FEPA) standards, and Japanese Industrial Standard (JIS) standards. In one aspect, the present invention provides a plurality of abrasive particles having a specified nominal grade, wherein at least a portion of the plurality of abrasive particles are abrasive particles according to the present invention. In some embodiments, preferably, at least 5, 10, 15, 20, 25, 30, 35, 40, 45, 50, 55, 60, 65, 70, 75, 80, 85, 90, 95, or even 100 percent by weight of the plurality of abrasive particles are the abrasive particles according to the present invention, based on the total weight of the plurality of abrasive particles.

The present invention also provides a method of abrading a surface, the method comprising:

contacting abrasive particles according to the present invention with a surface of a workpiece; and moving at least one of the abrasive particles according to the present invention or the contacted surface to abrade at least a portion of the surface with at least one of the abrasive particles according to the present invention.

DETAILED DESCRIPTION

Figure 1:
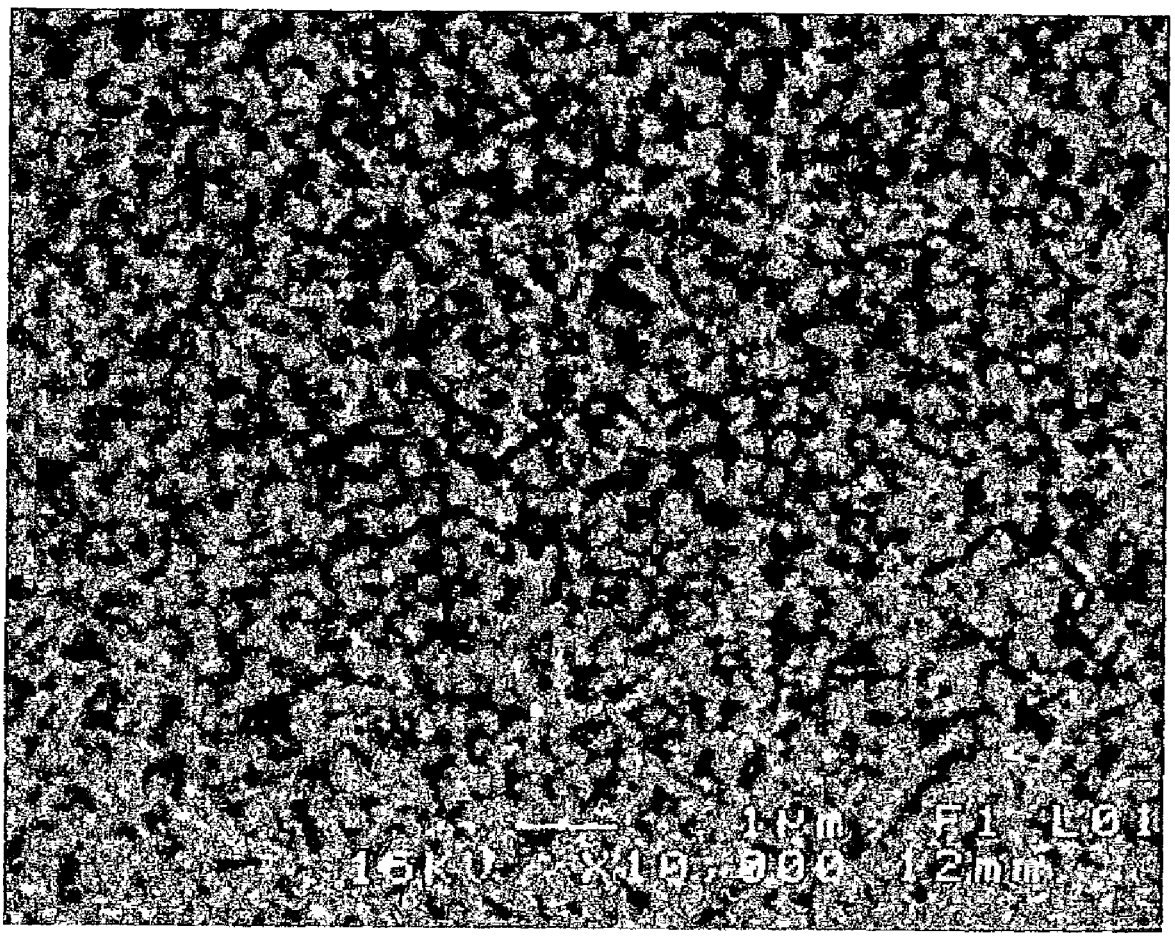
FIG. 1 is a SEM photomicrograph of polished cross-sections of heat-treated Example 1 material.

In general, ceramics according to the present invention can be made by heating (including in a flame) the appropriate metal oxide sources to form a melt, desirably a homogenous melt, and then rapidly cooling the melt to provide amorphous materials or ceramic comprising amorphous materials. Amorphous materials and ceramics comprising amorphous materials according to the present invention can be made, for example, by heating (including in a flame) the appropriate metal oxide sources to form a melt, desirably a homogenous melt, and then rapidly cooling the melt to provide amorphous material. Some embodiments of amorphous materials can be made, for example, by melting the metal oxide sources in any suitable furnace (e.g., an inductive heated furnace, a gas-fired furnace, or an electrical furnace), or, for example, in a plasma. The resulting melt is cooled (e.g., discharging the melt into a cooling media (e.g., high velocity air jets, liquids, metal plates (including chilled metal plates), metal rolls (including chilled metal rolls), metal balls (including chilled metal balls), and the like)).

In one method, amorphous materials and ceramic comprising amorphous materials according to the present invention can be made utilizing flame fusion as disclosed, for example, in U.S. Pat. No. 6,254,981 (Castle), the disclosure of which is incorporated herein by reference. In this method, the metal oxide sources materials are fed (e.g., in the form of particles, sometimes referred to as "feed particles") directly into a burner (e.g., a methane-air burner, an acetylene-oxygen burner, a hydrogen-oxygen burner, and like), and then quenched, for example, in water, cooling oil, air, or the like. Feed particles can be formed, for example, by grinding, agglomerating (e.g., spray-drying), melting, or sintering the metal oxide sources. The size of feed particles fed into the flame generally determine the size of the resulting amorphous material comprising particles.

Some embodiments of amorphous materials can also be obtained by other techniques, such as: laser spin melt with free fall cooling, Taylor wire technique, plasmatron technique, hammer and anvil technique, centrifugal quenching, air gun splat cooling, single roller and twin roller quenching, roller-plate quenching and pendant drop melt extraction (see, e.g., *Rapid Solidification of Ceramics*, Brockway et. al, Metals And Ceramics Information Center, A Department of Defense Information Analysis Center, Columbus, Ohio, January, 1984, the disclosure of which is incorporated here as a reference). Some embodiments of amorphous materials may also be obtained by other techniques, such as: thermal (including flame or laser or plasma-assisted) pyrolysis of suitable precursors, physical vapor synthesis (PVS) of metal precursors and mechanochemical processing.

Useful $Al_2O_3$—$Y_2O_3$—$ZrO_2$/$HfO_2$ formulations include those at or near a eutectic composition(s) (e.g., ternary eutectic compositions). In addition to $Al_2O_3$—$Y_2O_3$—$ZrO_2$/$HfO_2$ compositions disclosed herein, other such compositions, including quaternary and other higher order eutectic compositions, may be apparent to those skilled in the art after reviewing the present disclosure.

Sources, including commercial sources, of (on a theoretical oxide basis) $Al_2O_3$ include bauxite (including both natural occurring bauxite and synthetically produced bauxite), calcined bauxite, hydrated aluminas (e.g., boehmite, and gibbsite), aluminum, Bayer process alumina, aluminum ore, gamma alumina, alpha alumina, aluminum salts, aluminum nitrates, and combinations thereof. The $Al_2O_3$ source may contain, or only provide, $Al_2O_3$. Alternatively, the $Al_2O_3$ source may contain, or provide $Al_2O_3$, as well as one or more metal oxides other than $Al_2O_3$ (including materials of or containing complex $Al_2O_3$.metal oxides (e.g., $Dy_3Al_5O_{12}$, $Y_3Al_5O_{12}$, $CeAl_{11}O_{18}$, etc.)).

Sources, including commercial sources, of (on a theoretical oxide basis) $Y_2O_3$ include yttrium oxide powders, yttrium, yttrium-containing ores, and yttrium salts (e.g., yttrium carbonates, nitrates, chlorides, hydroxides, and combinations thereof). The $Y_2O_3$ source may contain, or only provide, $Y_2O_3$. Alternatively, the $Y_2O_3$ source may contain, or provide $Y_2O_3$, as well as one or more metal oxides other than $Y_2O_3$ (including materials of or containing complex $Y_2O_3$ metal oxides (e.g., $Y_3Al_5O_{12}$)).

Sources, including commercial sources, of (on a theoretical oxide basis) $ZrO_2$ include zirconium oxide powders, zircon sand, zirconium, zirconium-containing ores, and zirconium salts (e.g., zirconium carbonates, acetates, nitrates, chlorides, hydroxides, and combinations thereof). In addition, or alternatively, the $ZrO_2$ source may contain, or provide $ZrO_2$, as well as other metal oxides such as hafnia. Sources, including commercial sources, of (on a theoretical oxide basis) $HfO_2$ include hafnium oxide powders, hafnium, hafnium-containing ores, and hafnium salts. In addition, or alternatively, the $HfO_2$ source may contain, or provide $HfO_2$, as well as other metal oxides such as $ZrO_2$.

Optionally, ceramics according to the present invention further comprise other oxide metal oxides (i.e., metal oxides other than $Al_2O_3$, rare earth oxide(s), and $ZrO_2$/$HfO_2$). Other useful metal oxide may also include, on a theoretical oxide basis, BaO, CaO, $Cr_2O_3$, CoO, $Fe_2O_3$, $GeO_2$, $Li_2O$, MgO, MnO, NiO, $Na_2O$, $Sc_2O_3$, SrO, $TiO_2$, ZnO, and combinations thereof. Sources, including commercial sources, include the oxides themselves, complex oxides, ores, carbonates, acetates, nitrates, chlorides, hydroxides, etc. These metal oxides are added to modify a physical property of the resulting ceramic and/or improve processing. These metal oxides are typically are added anywhere from 0 to 50% by weight, in some embodiments preferably 0 to 25% by weight and more preferably 0 to 50% by weight of the ceramic material depending, for example, upon the desired property.

In some embodiments, it may be advantageous for at least a portion of a metal oxide source (in some embodiments, preferably, 10 15, 20, 25, 30, 35, 40, 45, or even 50, percent by weight) to be obtained by adding particulate, metallic material comprising at least one of a metal (e.g., Al, Ca, Cu, Cr, Fe, Li, Mg, Ni, Ag, Ti, Zr, and combinations thereof), M, that has a negative enthalpy of oxide formation or an alloy thereof to the melt, or otherwise metal them with the other raw materials. Although not wanting to be bound by theory, it is believed that the heat resulting from the exothermic reaction associated with the oxidation of the metal is beneficial in the formation of a homogeneous melt and resulting amorphous material. For example, it is believed that the additional heat generated by the oxidation reaction within the raw material eliminates or minimizes insufficient heat transfer, and hence facilitates formation and homogeneity of the melt, particularly when forming amorphous particles with x, y, and z dimensions over 150 micrometers. It is also believed that the availability of the additional heat aids in driving various chemical reactions and physical processes (e.g., densification, and spherodization) to completion. Further, it is believed for some embodiments, the presence of the additional heat generated by the oxidation reaction actually enables the formation of a melt, which otherwise is difficult or otherwise not practical due to high melting point of the materials. Further, the presence of the additional heat generated by the oxidation reaction actually enables the formation of amorphous material that otherwise could not be made, or could not be made in the desired size range. Another advantage of the invention include, in forming the amorphous materials, that many of the chemical and physical processes such as melting, densification and spherodizing can be achieved in a short time, so that very high quench rates be can achieved. For additional details, see copending application having U.S. Ser. No. 10/211,639, filed the same date as the instant application, the disclosure of which is incorporated herein by reference.

The addition of certain metal oxides may alter the properties and/or crystalline structure or microstructure of ceramics according to the present invention, as well as the processing of the raw materials and intermediates in making the ceramic. For example, oxide additions such as MgO, CaO, $Li_2O$, and $Na_2O$ have been observed to alter both the $T_g$ and $T_x$ (wherein $T_x$ is the crystallization temperature) of glass. Although not wishing to be bound by theory, it is believed that such additions influence glass formation. Further, for example, such oxide additions may decrease the melting temperature of the overall system (i.e., drive the system toward lower melting eutectic), and ease of glass-formation. Complex eutectics in multi component systems (quaternary, etc.) may result in better glass-forming ability. The viscosity of the liquid melt and viscosity of the glass in its "working" range may also be affected by the addition of metal oxides other than $Al_2O_3$, $Y_2O_3$, and $ZrO_2/HfO_2$ (such as MgO, CaO, $Li_2O$, and $Na_2O$).

Typically, amorphous materials and the glass-ceramics according to the present invention have x, y, and z dimensions each perpendicular to each other, and wherein each of the x, y, and z dimensions is at least 10 micrometers. In some embodiments, the x, y, and z dimensions is at least 30 micrometers, 35 micrometers, 40 micrometers, 45 micrometers, 50 micrometers, 75 micrometers, 100 micrometers, 150 micrometers, 200 micrometers, 250 micrometers, 500 micrometers, 1000 micrometers, 2000 micrometers, 2500 micrometers, 1 mm, 5 mm, or even at least 10 mm. The x, y, and z dimensions of a material are determined either visually or using microscopy, depending on the magnitude of the dimensions. The reported z dimension is, for example, the diameter of a sphere, the thickness of a coating, or the longest length of a prismatic shape. Crystallization of amorphous material and ceramic comprising the amorphous material to form glass-ceramics may also be affected by the additions of materials. For example, certain metals, metal oxides (e.g., titanates and zirconates), and fluorides, for example, may act as nucleation agents resulting in beneficial heterogeneous nucleation of crystals. Also, addition of some oxides may change nature of metastable phases devitrifying from the glass upon reheating. In another aspect, for ceramics according to the present invention comprising crystalline $ZrO_2$, it may be desirable to add metal oxides (e.g., $TiO_2$, CaO, and MgO) that are known to stabilize tetragonal/cubic form of $ZrO_2$. $Y_2O_3$ is also known to stabilize tetragonal/cubic form of $ZrO_2$.

The particular selection of metal oxide sources and other additives for making ceramics according to the present invention typically takes into account, for example, the desired composition and microstructure of the resulting crystalline containing ceramics, the desired degree of crystallinity, if any, the desired physical properties (e.g., hardness or toughness) of the resulting ceramics, avoiding or minimizing the presence of undesirable impurities, the desired characteristics of the resulting ceramics, and/or the particular process (including equipment and any purification of the raw materials before and/or during fusion and/or solidification) being used to prepare the ceramics.

In some instances, it may be preferred to incorporate limited amounts of metal oxides selected from the group consisting of: $Na_2O$, $P_2O_5$, $SiO_2$, $TeO_2$, $V_2O_3$, and combinations thereof. Sources, including commercial sources, include the oxides themselves, complex oxides, ores, carbonates, acetates, nitrates, chlorides, hydroxides, etc. These metal oxides may be added, for example, to modify a physical property of the resulting abrasive particles and/or improve processing. These metal oxides when used are typically are added from greater than 0 to 20% by weight, preferably greater than 0 to 5% by weight and more preferably greater than 0 to 2% by weight of the glass-ceramic depending, for example, upon the desired property.

The metal oxide sources and other additives can be in any form suitable to the process and equipment being used to make ceramics according to the present invention. The raw materials can be melted and quenched using techniques and equipment known in the art for making oxide glasses and amorphous metals. Desirable cooling rates include those of 50K/s and greater. Cooling techniques known in the art include roll-chilling. Roll-chilling can be carried out, for example, by melting the metal oxide sources at a temperature typically 20-200° C. higher than the melting point, and cooling/quenching the melt by spraying it under high pressure (e.g., using a gas such as air, argon, nitrogen or the like) onto a high-speed rotary roll(s). Typically, the rolls are made of metal and are water cooled. Metal book molds may also be useful for cooling/quenching the melt.

Other techniques for forming melts, cooling/quenching melts, and/or otherwise forming glass include vapor phase quenching, plasma spraying, melt-extraction, and gas or centrifugal atomization. Vapor phase quenching can be carried out, for example, by sputtering, wherein the metal alloys or metal oxide sources are formed into a sputtering target(s) which are used. The target is fixed at a predetermined position in a sputtering apparatus, and a substrate(s) to be coated is placed at a position opposing the target(s). Typical pressures of $10^{-3}$ torr of oxygen gas and Ar gas, discharge is generated between the target(s) and a substrate(s), and Ar or oxygen ions collide against the target to start reaction sputtering, thereby depositing a film of composition on the substrate. For additional details regarding plasma spraying, see, for example, copending application having U.S. Ser. No. 10/211,640, filed the same date as the instant application, the disclosure of which is incorporated herein by reference.

Gas atomization involves melting feed particles to convert them to melt. A thin stream of such melt is atomized through contact with a disruptive air jet (i.e., the stream is divided into fine droplets). The resulting substantially discrete, generally ellipsoidal glass particles (e.g., beads) are then recovered. Examples of bead sizes include those having a diameter in a range of about 5 micrometers to about 3 mm. Melt-extraction can be carried out, for example, as disclosed in U.S. Pat. No. 5,605,870 (Strom-Olsen et al.), the disclosure of which is incorporated herein by reference. Containerless glass forming techniques utilizing laser beam heating as disclosed, for example, in PCT application having Publication No. WO 01/27046 A1, published Apr. 4, 2001, the disclosure of which is incorporated herein by reference, may also be useful in making glass according to the present invention.

The cooling rate is believed to affect the properties of the quenched amorphous material. For instance, glass transition temperature, density and other properties of glass typically change with cooling rates.

Rapid cooling may also be conducted under controlled atmospheres, such as a reducing, neutral, or oxidizing environment to maintain and/or influence the desired oxidation states, etc. during cooling. The atmosphere can also influence glass formation by influencing crystallization kinetics from undercooled liquid. For example, larger undercooling of $Al_2O_3$ melts without crystallization has been reported in argon atmosphere as compared to that in air.

The microstructure or phase composition (glassy/amorphous/crystalline) of a material can be determined in a number of ways. Various information can be obtained using optical microscopy, electron microscopy, differential thermal analysis (DTA), and x-ray diffraction (XRD), for example.

Using optical microscopy, amorphous material is typically predominantly transparent due to the lack of light scattering centers such as crystal boundaries, while crystalline material shows a crystalline structure and is opaque due to light scattering effects.

A percent amorphous yield can be calculated for beads using a −100+120 mesh size fraction (i.e., the fraction collected between 150-micrometer opening size and 125-micrometer opening size screens). The measurements are done in the following manner. A single layer of beads is spread out upon a glass slide. The beads are observed using an optical microscope. Using the crosshairs in the optical microscope eyepiece as a guide, beads that lay along a straight line are counted either amorphous or crystalline depending on their optical clarity. A total of 500 beads are counted and a percent amorphous yield is determined by the amount of amorphous beads divided by total beads counted.

Using DTA, the material is classified as amorphous if the corresponding DTA trace of the material contains an exothermic crystallization event ($T_x$). If the same trace also contains an endothermic event ($T_g$) at a temperature lower than $T_x$ it is considered to consist of a glass phase. If the DTA trace of the material contains no such events, it is considered to contain crystalline phases.

Differential thermal analysis (DTA) can be conducted using the following method. DTA runs can be made (using an instrument such as that obtained from Netzsch Instruments, Selb, Germany under the trade designation "NETZSCH STA 409 DTA/TGA") using a −140+170 mesh size fraction (i.e., the fraction collected between 105-micrometer opening size and 90-micrometer opening size screens). An amount of each screened sample (typically about 400 milligrams (mg)) is placed in a 100-microliter $Al_2O_3$ sample holder. Each sample is heated in static air at a rate of 10° C./minute from room temperature (about 25° C.) to 1100° C.

Using powder x-ray diffraction, XRD, (using an x-ray diffractometer such as that obtained under the trade designation "PHILLIPS XRG 3100" from Phillips, Mahwah, N.J., with copper K α1 radiation of 1.54050 Angstrom) the phases present in a material can be determined by comparing the peaks present in the XRD trace of the crystallized material to XRD patterns of crystalline phases provided in JCPDS (Joint Committee on Powder Diffraction Standards) databases, published by International Center for Diffraction Data. Furthermore, an XRD can be used qualitatively to determine types of phases. The presence of a broad diffused intensity peak is taken as an indication of the amorphous nature of a material. The existence of both a broad peak and well-defined peaks is taken as an indication of existence of crystalline matter within an amorphous matrix. The initially formed amorphous material or ceramic (including glass prior to crystallization) may be larger in size than that desired. The amorphous material or ceramic can be converted into smaller pieces using crushing and/or comminuting techniques known in the art, including roll crushing, canary milling, jaw crushing, hammer milling, ball milling, jet milling, impact crushing, and the like. In some instances, it is desired to have two or multiple crushing steps. For example, after the ceramic is formed (solidified), it may be in the form of larger than desired. The first crushing step may involve crushing these relatively large masses or "chunks" to form smaller pieces. This crushing of these chunks may be accomplished with a hammer mill, impact crusher or jaw crusher. These smaller pieces may then be subsequently crushed to produce the desired particle size distribution. In order to produce the desired particle size distribution (sometimes referred to as grit size or grade), it may be necessary to perform multiple crushing steps. In general the crushing conditions are optimized to achieve the desired particle shape(s) and particle size distribution. Resulting particles that are of the desired size may be recrushed if they are too large, or "recycled" and used as a raw material for re-melting if they are too small.

The shape of particles can depend, for example, on the composition and/or microstructure of the ceramic, the geometry in which it was cooled, and the manner in which the ceramic is crushed (i.e., the crushing technique used). In general, where a "blocky" shape is preferred, more energy may be employed to achieve this shape. Conversely, where a "sharp" shape is preferred, less energy may be employed to achieve this shape. The crushing technique may also be changed to achieve different desired shapes. For some abrasive particle an average aspect ratio ranging from 1:1 to 5:1 is typically desired, and in some embodiments 1.25:1 to 3:1, or even 1.5:1 to 2.5:1.

It is also within the scope of the present invention, for example, to directly form articles in desired shapes. For example, desired articles may be formed (including molded) by pouring or forming the melt into a mold.

Surprisingly, it was found that ceramics of present invention could be obtained without limitations in dimensions. This was found to be possible through a coalescing step performed at temperatures above glass transition temperature. This coalescing step in essence forms a larger sized body from two or more smaller particles. For instance, as evident from FIG. 2, glass of present invention undergoes glass transition ($T_g$) before significant crystallization occurs ($T_x$) as evidenced by the existence of endotherm ($T_g$) at lower temperature than exotherm ($T_x$). For example, ceramic (including glass prior to crystallization), may also be provided by heating, for example, particles comprising the amorphous material, and/or fibers, etc. above the $T_g$ such that the particles, etc. coalesce to form a shape and cooling the coalesced shape. The temperature and pressure used for coalescing may depend, for example, upon composition of the amorphous material and the desired density of the resulting material. The temperature should below glass crystallization temperature, and for glasses, greater than the glass transition temperature. In certain embodiments, the heating is conducted at at least one temperature in a range of about 850° C. to about 1100° C. (in some embodiments, preferably 900° C. to 1000° C.). Typically, the amorphous material is under pressure (e.g., greater than zero to 1 GPa or more) during coalescence to aid the coalescence of the amorphous material. In one embodiment, a charge of the particles, etc. is placed into a die and hot-pressing is performed at temperatures above glass transition where viscous flow of glass leads to coalescence into a relatively large part. Examples of typical coalescing techniques include hot pressing, hot isostatic pressure, hot extrusion and the like. For example, amorphous material comprising particles (obtained, for example, by crushing) (including beads and microspheres), fibers, etc. may formed into a larger particle size. Typically, it is generally preferred to cool the resulting coalesced body before further heat treatment. After heat treatment if so desired, the coalesced body may be crushed to smaller particle sizes or a desired particle size distribution.

It is also within the scope of the present invention to conduct additional heat-treatment to further improve desirable properties of the material. For example, hot-isostatic pressing may be conducted (e.g., at temperatures from about 900° C. to about 1400° C.) to remove residual porosity, increasing the density of the material. Optionally, the resulting, coalesced article can be heat-treated to provide glass-ceramic, crystalline ceramic, or ceramic otherwise comprising crystalline ceramic.

Coalescing of the amorphous material and/or glass-ceramic (e.g., particles) may also be accomplished by a variety of methods, including pressureless or pressure sintering (e.g., sintering, plasma assisted sintering, hot pressing, HIPing, hot forging, hot extrusion, etc.).

Heat-treatment can be carried out in any of a variety of ways, including those known in the art for heat-treating glass to provide glass-ceramics. For example, heat-treatment can be conducted in batches, for example, using resistive, inductively or gas heated furnaces. Alternatively, for example, heat-treatment can be conducted continuously, for example, using rotary kilns. In the case of a rotary kiln, the material is fed directly into a kiln operating at the elevated temperature. The time at the elevated temperature may range from a few seconds (in some embodiments even less than 5 seconds) to a few minutes to several hours. The temperature may range anywhere from 900° C. to 1600° C., typically between 1200° C. to 1500° C. It is also within the scope of the present invention to perform some of the heat-treatment in batches (e.g., for the nucleation step) and another continuously (e.g., for the crystal growth step and to achieve the desired density). For the nucleation step, the temperature typically ranges between about 900° C. to about 1100° C., in some embodiments, preferably in a range from about 925° C. to about 1050° C. Likewise for the density step, the temperature typically is in a range from about 1100° C. to about 1600° C., in some embodiments, preferably in a range from about 1200° C. to about 1500° C. This heat treatment may occur, for example, by feeding the material directly into a furnace at the elevated temperature. Alternatively, for example, the material may be feed into a furnace at a much lower temperature (e.g., room temperature) and then heated to desired temperature at a predetermined heating rate. It is within the scope of the present invention to conduct heat-treatment in an atmosphere other than air. In some cases it might be even desirable to heat-treat in a reducing atmosphere(s). Also, for example, it may be desirable to heat-treat under gas pressure as in, for example, hot-isostatic press, or in gas pressure furnace. It is within the scope of the present invention to convert (e.g., crush) the resulting article or heat-treated article to provide particles (e.g., abrasive particles).

The amorphous material is heat-treated to at least partially crystallize the amorphous material to provide glass-ceramic. The heat-treatment of certain glasses to form glass-ceramics is well known in the art. The heating conditions to nucleate and grow glass-ceramics are known for a variety of glasses. Alternatively, one skilled in the art can determine the appropriate conditions from a Time-Temperature-Transformation (TTT) study of the glass using techniques known in the art. One skilled in the art, after reading the disclosure of the present invention should be able to provide TTT curves for glasses according to the present invention, determine the appropriate nucleation and/or crystal growth conditions to provide glass-ceramics according to the present invention.

Typically, glass-ceramics are stronger than the amorphous materials from which they are formed. Hence, the strength of the material may be adjusted, for example, by the degree to which the amorphous material is converted to crystalline ceramic phase(s). Alternatively, or in addition, the strength of the material may also be affected, for example, by the number of nucleation sites created, which may in turn be used to affect the number, and in turn the size of the crystals of the crystalline phase(s). For additional details regarding forming glass-ceramics, see, for example *Glass-Ceramics*, P. W. McMillan, Academic Press, Inc., $2^{nd}$ edition, 1979, the disclosure of which is incorporated herein by reference.

For example, during heat-treatment of some exemplary amorphous materials for making glass-ceramics according to present invention, formation of phases such as $La_2Zr_2O_7$, and, if $ZrO_2$ is present, cubic/tetragonal $ZrO_2$, in some cases monoclinic $ZrO_2$, have been observed at temperatures above about 900° C. Although not wanting to be bound by theory, it is believed that zirconia-related phases are the first phases to nucleate from the amorphous material. Formation of $Al_2O_3$, $ReAlO_3$ (wherein Re is at least one rare earth cation), $ReAl_{11}O_{18}$, $Re_3Al_5O_{12}$, $Y_3Al_5O_{12}$, etc. phases are believed to generally occur at temperatures above about 925° C. Typically, crystallite size during this nucleation step is on order of nanometers. For example, crystals as small as 10-15 nanometers have been observed. For at least some embodiments, heat-treatment at about 1300° C. for about 1 hour provides a full crystallization. In generally, heat-treatment times for each of the nucleation and crystal growth steps may range of a few seconds (in some embodiments even less than 5 seconds) to several minutes to an hour or more.

Examples of crystalline phases which may be present in ceramics according to the present invention include: complex $Al_2O_3$.metal oxide(s) (e.g., complex $Al_2O_3$.REO (e.g., $ReAlO_3$ (e.g., $GdAlO_3$ $LaAlO_3$), $ReAl_{11}O_{18}$ (e.g., $LaAl_{11}O_{18}$,), and $Re_3Al_5O_{12}$ (e.g., $Dy_3Al_5O_{12}$)), complex $Al_2O_3$.$Y_2O_3$ (e.g., $Y_3Al_5O_{12}$), and complex $ZrO_2$.REO (e.g., $La_2Zr_2O_7$)), $Al_2O_3$ (e.g., $\alpha$-$Al_2O_3$), and $ZrO_2$ (e.g., cubic $ZrO_2$ and tetragonal $ZrO_2$).

It is also with in the scope of the present invention to substitute a portion of the yttrium and/or aluminum cations in a complex $Al_2O_3$.metal oxide (e.g., complex $Al_2O_3$.$Y_2O_3$ (e.g., yttrium aluminate exhibiting a garnet crystal structure)) with other cations. For example, a portion of the Al cations in a complex $Al_2O_3$.$Y_2O_3$ may be substituted with at least one cation of an element selected from the group consisting of: Cr, Ti, Sc, Fe, Mg, Ca, Si, Co, and combinations thereof. For example, a portion of the Y cations in a complex $Al_2O_3$.$Y_2O_3$ may be substituted with at least one cation of an element selected from the group consisting of: Ce, Dy, Er, Eu, Gd, Ho, La, Lu, Nd, Pr, Sm, Th, Tm, Yb, Fe, Ti, Mn, V, Cr, Co, Ni, Cu, Mg, Ca, Sr, and combinations thereof. Similarly, it is also with in the scope of the present invention to substitute a portion of the aluminum cations in alumina. For example, Cr, Ti, Sc, Fe, Mg, Ca, Si, and Co can substitute for aluminum in the alumina. The substitution of cations as described above may affect the properties (e.g. hardness, toughness, strength, thermal conductivity, etc.) of the fused material.

It is also with in the scope of the present invention to substitute a portion of the rare earth and/or aluminum cations in a complex $Al_2O_3$.metal oxide (e.g., complex $Al_2O_3$.REO) with other cations. For example, a portion of the Al cations in a complex $Al_2O_3$.REO may be substituted with at least one cation of an element selected from the group consisting of: Cr, Ti, Sc, Fe, Mg, Ca, Si, Co, and combinations thereof. For example, a portion of the Y cations in a complex $Al_2O_3$.REO may be substituted with at least one cation of an element selected from the group consisting of: Y, Fe, Ti, Mn, V, Cr, Co, Ni, Cu, Mg, Ca, Sr, and combinations thereof. Similarly, it is also with in the scope of the present invention to substitute a portion of the aluminum cations in alumina. For example, Cr, Ti, Sc, Fe, Mg, Ca, Si, and Co can substitute for aluminum in the alumina. The substitution of cations as described above may affect the properties (e.g. hardness, toughness, strength, thermal conductivity, etc.) of the fused material.

The average crystal size can be determined by the line intercept method according to the ASTM standard E 112-96 "Standard Test Methods for Determining Average Grain Size". The sample is mounted in mounting resin (such as that obtained under the trade designation "TRANSOPTIC POWDER" from Buehler, Lake Bluff, Ill.) typically in a cylinder of resin about 2.5 cm in diameter and about 1.9 cm high. The mounted section is prepared using conventional polishing techniques using a polisher (such as that obtained from Buehler, Lake Bluff, Ill. under the trade designation "ECOMET 3"). The sample is polished for about 3 minutes with a diamond wheel, followed by 5 minutes of polishing with each of 45, 30, 15, 9, 3, and 1-micrometer slurries. The mounted and polished sample is sputtered with a thin layer of gold-palladium and viewed using a scanning electron microscopy (such as the JEOL SEM Model JSM 840A). A typical back-scattered electron (BSE) micrograph of the microstructure found in the sample is used to determine the average crystal size as follows. The number of crystals that intersect per unit length ($N_L$) of a random straight line drawn across the micrograph are counted. The average crystal size is determined from this number using the following equation.

$$\text{Average Crystal Size} = \frac{1.5}{N_L M}$$

Where $N_L$ is the number of crystals intersected per unit length and M is the magnification of the micrograph. In another aspect, ceramics (including glass-ceramics) according to the present invention may comprise at least 1, 2, 3, 5, 10, 15, 20, 25, 30, 35, 40, 45, 50, 55, 60, 65, 70, 75, 80, 85, 90, 95, 97, 98, 99, or even 100 percent by volume crystallites, wherein the crystallites have an average size of less than 1 micrometer. In another aspect, ceramics (including glass-ceramics) according to the present invention may comprise less than at least 1, 2, 3, 5, 10, 15, 20, 25, 30, 35, 40, 45, 50, 55, 60, 65, 70, 75, 80, 85, 90, 95, 97, 98, 99, or even 100 percent by volume crystallites, wherein the crystallites have an average size of less than 0.5 micrometer. In another aspect, ceramics (including glass-ceramics) according to the present invention may comprise less than at least 1, 2, 3, 5, 10, 15, 20, 25, 30, 35, 40, 45, 50, 55, 60, 65, 70, 75, 80, 85, 90, 95, 97, 98, 99, or even 100 percent by volume crystallites, wherein the crystallites have an average size of less than 0.3 micrometer.

In another aspect, ceramics (including glass-ceramics) according to the present invention may comprise less than at least 1, 2, 3, 5, 10, 15, 20, 25, 30, 35, 40, 45, 50, 55, 60, 65, 70, 75, 80, 85, 90, 95, 97, 98, 99, or even 100 percent by volume crystallites, wherein the crystallites have an average size of less than 0.15 micrometer.

Crystalline phases that may be present in ceramics according to the present invention include alumina (e.g., alpha and transition aluminas), $Y_2O_3$, $HfO_2$, $ZrO_2$, as well as, for example, one or more other metal oxides such as BaO, CaO, $Cr_2O_3$, CoO, $Fe_2O_3$, $GeO_2$, $Li_2O$, MgO, MnO, NiO, $Na_2O$, $P_2O_5$, REO, $Sc_2O_3$, $SiO_2$, SrO, $TeO_2$, $TiO_2$, $V_2O_3$, ZnO, "complex metal oxides" (including "complex $Al_2O_3$ metal oxide (e.g., complex $Al_2O_3$ $Y_2O_3$)), and combinations thereof.

Some embodiments of the present invention also include glass comprising $Al_2O_3$, at least one of REO or $Y_2O_3$, and at least one of $ZrO_2$ or $HfO_2$, wherein at least 80 (85, 90, 95, 97, 98, 99, or even 100) percent by weight of the glass collectively comprises the $Al_2O_3$, at least one of REO or $Y_2O_3$, and at least one of $ZrO_2$ or $HfO_2$, based on the total weight of the glass.

Some embodiments of the present invention also include glass comprising $Al_2O_3$, at least one of REO or $Y_2O_3$, and at least one of $ZrO_2$ or $HfO_2$, wherein at least 60 (65, 70, 75, 80, 85, 90, 95, 97, 98, 99, or even 100) percent by weight of the glass collectively comprises the $Al_2O_3$, at least one of REO or $Y_2O_3$, and at least one of $ZrO_2$ or $HfO_2$, and less than 20 (preferably, less than 15, 10, 5, or even 0) percent by weight $SiO_2$ and less than 20 (preferably, less than 15, 10, 5, or even 0) percent by weight $B_2O_3$, based on the total weight of the glass.

Some embodiments of the present invention also include provides glass comprising $Al_2O_3$, at least one of REO or $Y_2O_3$, and at least one of $ZrO_2$ or $HfO_2$, wherein at least 60 (65, 70, 75, 80, 85, 90, 95, 97, 98, 99, or even 100) percent by weight of the glass collectively comprises the $Al_2O_3$, at least one of REO or $Y_2O_3$, and at least one of $ZrO_2$ or $HfO_2$, and less than 40 (preferably, less than 35, 30, 25, 20, 15, 10, 5, or even 0) percent by weight collectively $SiO_2$, $B_2O_3$, and $P_2O_5$, based on the total weight of the glass.

Some embodiments of the present invention also include ceramic comprising glass (e.g., at least 5, 10, 15, 20, 25, 30, 35, 40, 45, 50, 55, 60, 65, 70, 75, 80, 85, 90, 95, 97, 98, 99, or even 100 percent by volume glass), the glass comprising $Al_2O_3$, at least one of REO or $Y_2O_3$, and at least one of $ZrO_2$ or $HfO_2$, wherein at least 80 (85, 90, 95, 97, 98, 99, or even 100) percent by weight of the glass collectively comprises the $Al_2O_3$, at least one of REO or $Y_2O_3$, and at least one of $ZrO_2$ or $HfO_2$, based on the total weight of the glass.

Some embodiments of the present invention also include ceramic comprising glass (e.g., at least 5, 10, 15, 20, 25, 30, 35, 40, 45, 50, 55, 60, 65, 70, 75, 80, 85, 90, 95, 97, 98, 99, or even 100 percent by volume glass), the glass comprising $Al_2O_3$, at least one of REO or $Y_2O_3$, and at least one of $ZrO_2$ or $HfO_2$, wherein at least 60 (65, 70, 75, 80, 85, 90, 95, 97, 98, 99, or even 100) percent by weight of the glass collectively comprises the $Al_2O_3$, at least one of REO or $Y_2O_3$, and at least one of $ZrO_2$ or $HfO_2$, and less than 20 (preferably, less than 15, 10, 5, or even 0) percent by weight $SiO_2$ and less than 20 (preferably, less than 15, 10, 5, or even 0) percent by weight $B_2O_3$, based on the total weight of the glass. The ceramic may further comprise crystalline ceramic (e.g., at least 95, 90, 85, 80, 75, 70, 65, 60, 55, 50, 45, 40, 35, 30, 25, 20, 15, 10, 5, 3, 2, or 1 percent by volume crystalline ceramic).

Some embodiments of the present invention also include ceramic comprising glass (e.g., at least 5, 10, 15, 20, 25, 30, 35, 40, 45, 50, 55, 60, 65, 70, 75, 80, 85, 90, 95, 97, 98, 99, or even 100 percent by volume glass), the glass comprising $Al_2O_3$, at least one of REO or $Y_2O_3$, and at least one of $ZrO_2$ or $HfO_2$, wherein at least 60 (65, 70, 75, 80, 85, 90, 95, 97, 98, 99, or even 100) percent by weight of the glass collectively comprises the $Al_2O_3$, at least one of REO or $Y_2O_3$, and at least one of $ZrO_2$ or $HfO_2$, and less than 40 percent by weight collectively $SiO_2$, $B_2O_3$, and $P_2O_5$, based on the total weight of the glass. The ceramic may further comprise crystalline ceramic (e.g., at least 95, 90, 85, 80, 75, 70, 65, 60, 55, 50, 45, 40, 35, 30, 25, 20, 15, 10, 5, 3, 2, or 1 percent by volume crystalline ceramic).

Some embodiments of the present invention also include glass-ceramic comprising $Al_2O_3$, at least one of REO or $Y_2O_3$, and at least one of $ZrO_2$ or $HfO_2$, wherein at least 80 (85, 90, 95, 97, 98, 99, or even 100) percent by weight of the glass-ceramic collectively comprises the $Al_2O_3$, at least one of REO or $Y_2O_3$, and at least one of $ZrO_2$ or $HfO_2$, based on the total weight of the glass-ceramic. The glass-ceramic may comprise, for example, at least 1, 2, 3, 5, 10, 15, 20, 25, 30, 35, 40, 45, 50, 55, 60, 65, 70, 75, 80, 85, 90, or 95 percent by volume glass. The glass-ceramic may comprise, for example, at least 99, 98, 97, 95, 90, 85, 80, 75, 70, 65, 60, 55, 50, 45, 40, 35, 30, 25, 20, 15, 10, or 5 percent by volume crystalline ceramic.

Some embodiments of the present invention also include glass-ceramic comprising $Al_2O_3$, at least one of REO or $Y_2O_3$, and at least one of $ZrO_2$ or $HfO_2$, wherein at least 60 (65, 70, 75, 80, 85, 90, 95, 97, 98, 99, or even 100) percent by weight of the glass-ceramic collectively comprises the $Al_2O_3$, at least one of REO or $Y_2O_3$, and at least one of $ZrO_2$ or $HfO_2$, and less than 20 (preferably, less than 15, 10, 5, or even 0) percent by weight $SiO_2$ and less than 20 (preferably, less than 15, 10, 5, or even 0) percent by weight $B_2O_3$, based on the total weight of the glass-ceramic. The glass-ceramic may comprise, for example, at least 1, 2, 3, 5, 10, 15, 20, 25, 30, 35, 40, 45, 50, 55, 60, 65, 70, 75, 80, 85, 90, or 95 percent by volume glass. The glass-ceramic may comprise, for example, at least 99, 98, 97, 95, 90, 85, 80, 75, 70, 65, 60, 55, 50, 45, 40, 35, 30, 25, 20, 15, 10, or 5 percent by volume crystalline ceramic.

Some embodiments of the present invention also include glass-ceramic comprising $Al_2O_3$, at least one of REO or $Y_2O_3$, and at least one of $ZrO_2$ or $HfO_2$, wherein at least 60 (65, 70, 75, 80, 85, 90, 95, 97, 98, 99, or even 100) percent by weight of the glass-ceramic collectively comprises the $Al_2O_3$, at least one of REO or $Y_2O_3$, and at least one of $ZrO_2$ or $HfO_2$, and less than 40 percent by weight collectively $SiO_2$, $B_2O_3$, and $P_2O_5$, based on the total weight of the glass-ceramic. The glass-ceramic may comprise, for example, at least 1, 2, 3, 5, 10, 15, 20, 25, 30, 35, 40, 45, 50, 55, 60, 65, 70, 75, 80, 85, 90, 95, percent by volume glass. The glass-ceramic may comprise, for example, at least 99, 98, 97, 95, 90, 85, 80, 75, 70, 65, 60, 55, 50, 45, 40, 35, 30, 25, 20, 15, 10, or 5 percent by volume crystalline ceramic.

Additional details regarding ceramics comprising $Al_2O_3$, REO, and at least one of $ZrO_2$ or $HfO_2$, including making, using, and properties, can be found in application having U.S. Ser. Nos. 09/922,526, 09/922,527, and 09/922,526, filed Aug. 2, 2001, and U.S. Ser. Nos. 10/211,630; 10/211,639; 10/211,034; 10/211,044; 10/211,628; 10/211,640; and 10/211,684, filed the same date as the instant application, the disclosures of which are incorporated herein by reference.

Crystals formed by heat-treating amorphous to provide embodiments of glass-ceramics according to the present invention may be, for example, equiaxed, columnar, or flattened splat-like features.

Although an amorphous material, glass-ceramic, etc. according to the present invention may be in the form of a bulk material, it is also within the scope of the present invention to provide composites comprising an amorphous material, glass-ceramic, etc. according to the present invention. Such a composite may comprise, for example, a phase or fibers (continuous or discontinuous) or particles (including whiskers) (e.g., metal oxide particles, boride particles, carbide particles, nitride particles, diamond particles, metallic particles, glass particles, and combinations thereof) dispersed in an amorphous material, glass-ceramic, etc. according to the present invention, invention or a layered-composite structure (e.g., a gradient of glass-ceramic to amorphous material used to make the glass-ceramic and/or layers of different compositions of glass-ceramics).

Certain glasses according to the present invention may have, for example, a $T_g$ in a range of about 810° C. to about 890° C.

The average hardness of the material of the present invention can be determined as follows. Sections of the material are mounted in mounting resin (obtained under the trade designation "TRANSOPTIC POWDER" from Buehler, Lake Bluff, Ill.) typically in a cylinder of resin about 2.5 cm in diameter and about 1.9 cm high. The mounted section is prepared using conventional polishing techniques using a polisher (such as that obtained from Buehler, Lake Bluff, Ill. under the trade designation "ECOMET 3"). The sample is polished for about 3 minutes with a diamond wheel, followed by 5 minutes of polishing with each of 45, 30, 15, 9, 3, and 1-micrometer slurries. The microhardness measurements are made using a conventional microhardness tester (such as that obtained under the trade designation "MITUTOYO MVK-VL" from Mitutoyo Corporation, Tokyo, Japan) fitted with a Vickers indenter using a 100-gram indent load. The microhardness measurements are made according to the guidelines stated in ASTM Test Method E384 Test Methods for Microhardness of Materials (1991), the disclosure of which is incorporated herein by reference.

Certain glasses according to the present invention may have, for example, an average hardness of at least 5 GPa (more desirably, at least 6 GPa, 7 GPa, 8 GPa, or 9 GPa; typically in a range of about 5 GPa to about 10 GPa), crystalline ceramics according to the present invention at least 5 GPa (more desirably, at least 6 GPa, 7 GPa, 8 GPa, 9 GPa, 10 GPa, 11 GPa, 12 GPa, 13 GPa, 14 GPa, 15 GPa, 16 GPa, 17 GPa, or 18 GPa (or more); typically in a range of about 2 GPa to about 18 GPa), and glass-ceramics according to the present invention or ceramics according to the present invention comprising glass and crystalline ceramic at least 5 GPa (more desirably, at least 6 GPa, 7 GPa, 8 GPa, 9 GPa, 10 GPa, 11 GPa, 12 GPa, 13 GPa, 14 GPa, 15 GPa, 16 GPa, 17 GPa, 18 GPa, or 19 GPa; typically in a range of about 5 GPa to about 18 GPa). Abrasive particles according to the present invention have an average hardness of at least 15 GPa, in some embodiments, preferably, at least 16 GPa, at least 17 GPa, or even at least 18 GPa.

Typically, and desirably, the (true) density, sometimes referred to as specific gravity, of ceramic according to the present invention is typically at least 70% of theoretical density. More desirably, the (true) density of ceramic according to the present invention is at least 75%, 80%, 85%, 90%, 95%, 96%, 97%, 98%, 99%, 99.5% or 100% of theoretical density. Abrasive particles according to the present invention have densities of at least 85%, 90%, 92%, 95%, 96%, 97%, 98%, 99%, 99.5% or even 100% of theoretical density.

Articles can be made using ceramics according to the present invention, for example, as a filler, reinforcement material, and/or matrix material. For example, ceramic according to the present invention can be in the form of particles and/or fibers suitable for use as reinforcing materials in composites (e.g., ceramic, metal, or polymeric (thermosetting or thermoplastic)). The particles and/or fibers may, for example, increase the modulus, heat resistance, wear resistance, and/or strength of the matrix material. Although the size, shape, and amount of the particles and/or fibers used to make a composite may depend, for example, on the particular matrix material and use of the composite, the size of the reinforcing particles typically range about 0.1 to 1500 micrometers, more typically 1 to 500 micrometers, and desirably between 2 to 100 micrometers. The amount of particles for polymeric applications is typically about 0.5 percent to about 75 percent by weight, more typically about 1 to about 50 percent by weight. Examples of thermosetting polymers include: phenolic, melamine, urea formaldehyde, acrylate, epoxy, urethane polymers, and the like. Examples of thermoplastic polymers include: nylon, polyethylene, polypropylene, polyurethane, polyester, polyamides, and the like.

Examples of uses for reinforced polymeric materials (i.e., reinforcing particles according to the present invention dispersed in a polymer) include protective coatings, for example, for concrete, furniture, floors, roadways, wood, wood-like materials, ceramics, and the like, as well as, anti-skid coatings and injection molded plastic parts and components.

Further, for example, ceramic according to the present invention can be used as a matrix material. For example, ceramics according to the present invention can be used as a binder for ceramic materials and the like such as diamond, cubic-BN, $Al_2O_3$, $ZrO_2$, $Si_3N_4$, and SiC. Examples of useful articles comprising such materials include composite substrate coatings, cutting tool inserts abrasive agglomerates, and bonded abrasive articles such as vitrified wheels. The use of ceramics according to the present invention can be used as binders may, for example, increase the modulus, heat resistance, wear resistance, and/or strength of the composite article.

Abrasive particles according to the present invention generally comprise crystalline ceramic (e.g., at least 75, 80, 85, 90, 91, 92, 93, 94, 95, 96, 97, 98, 99, 99.5, or even 100 percent by volume) crystalline ceramic. In another aspect, the present invention provides a plurality of particles having a particle size distribution ranging from fine to coarse, wherein at least a portion of the plurality of particles are abrasive particles according to the present invention. In another aspect, embodiments of abrasive particles according to the present invention generally comprise (e.g., at least 75, 80, 85, 90, 91, 92, 93, 94, 95, 96, 97, 98, 99, 99.5, or even 100 percent by volume) glass-ceramic according to the present invention.

Abrasive particles according to the present invention can be screened and graded using techniques well known in the art, including the use of industry recognized grading standards such as ANSI (American National Standard Institute), FEPA (Federation Europeenne des Fabricants de Products Abrasifs), and JIS (Japanese Industrial Standard). Abrasive particles according to the present invention may be used in a wide range of particle sizes, typically ranging in size from about 0.1 to about 5000 micrometers, more typically from about 1 to about 2000 micrometers; desirably from about 5 to about 1500 micrometers, more desirably from about 100 to about 1500 micrometers.

In a given particle size distribution, there will be a range of particle sizes, from coarse particles fine particles. In the abrasive art this range is sometimes referred to as a "coarse", "control" and "fine" fractions. Abrasive particles graded according to industry accepted grading standards specify the particle size distribution for each nominal grade within numerical limits. Such industry accepted grading standards include those known as the American National Standards Institute, Inc. (ANSI) standards, Federation of European Producers of Abrasive Products (FEPA) standards, and Japanese Industrial Standard (JIS) standards. ANSI grade designations (i.e., specified nominal grades) include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. Preferred ANSI grades comprising abrasive particles according to the present invention are ANSI 8-220. FEPA grade designations include P8, P12, P16, P24, P36, P40, P50, P60, P80, P100, P120, P150, P180, P220, P320, P400, P500, P600, P800, P1000, P1200. Preferred FEPA grades comprising abrasive particles according to the present invention are P12-P220. JIS grade designations include JIS8, JIS 12, JIS 16, JIS524, JIS36, JIS46, JIS54, JIS60, JIS80, JIS 100, JIS 150, JIS 180, JIS220, JIS240, J280, JIS320, JIS360, JIS400, JIS600, JIS800, JIS 1000, JIS 1500, JIS2500, JIS4000, JIS6000, JIS8000, and JIS 10,000. Preferred JIS grades comprising abrasive particles according to the present invention are JIS8-220.

After crushing and screening, there will typically be a multitude of different abrasive particle size distributions or grades. These multitudes of grades may not match a manufacturer's or supplier's needs at that particular time. To minimize inventory, it is possible to recycle the off demand grades back into melt to form glass. This recycling may occur after the crushing step, where the particles are in large chunks or smaller pieces (sometimes referred to as "fines") that have not been screened to a particular distribution.

In another aspect, the present invention provides a method for making abrasive particles, the method comprising heat-treating glass particles or glass-containing particles according to the present invention to provide abrasive particles comprising a glass-ceramic according to the present invention. Alternatively, for example, the present invention provides a method for making abrasive particles, the method comprising heat-treating glass according to the present invention, and crushing the resulting heat-treated material to provide abrasive particles comprising a glass-ceramic according to the present invention. When crushed, glass tends to provide sharper particles than crushing significantly crystallized glass-ceramics or crystalline material.

In another aspect, the present invention provides agglomerate abrasive grains each comprising a plurality of abrasive particles according to the present invention bonded together via a binder. In another aspect, the present invention provides an abrasive article (e.g., coated abrasive articles, bonded abrasive articles (including vitrified, resinoid, and metal bonded grinding wheels, cutoff wheels, mounted points, and honing stones), nonwoven abrasive articles, and abrasive brushes) comprising a binder and a plurality of abrasive particles, wherein at least a portion of the abrasive particles are abrasive particles (including where the abrasive particles are agglomerated) according to the present invention. Methods of making such abrasive articles and using abrasive articles are well known to those skilled in the art. Furthermore, abrasive particles according to the present invention can be used in abrasive applications that utilize abrasive particles, such as slurries of abrading compounds (e.g., polishing compounds), milling media, shot blast media, vibratory mill media, and the like.

Coated abrasive articles generally include a backing, abrasive particles, and at least one binder to hold the abrasive particles onto the backing. The backing can be any suitable material, including cloth, polymeric film, fibre, nonwoven webs, paper, combinations thereof, and treated versions thereof. The binder can be any suitable binder, including an inorganic or organic binder (including thermally curable resins and radiation curable resins). The abrasive particles can be present in one layer or in two layers of the coated abrasive article.

Figure 3:
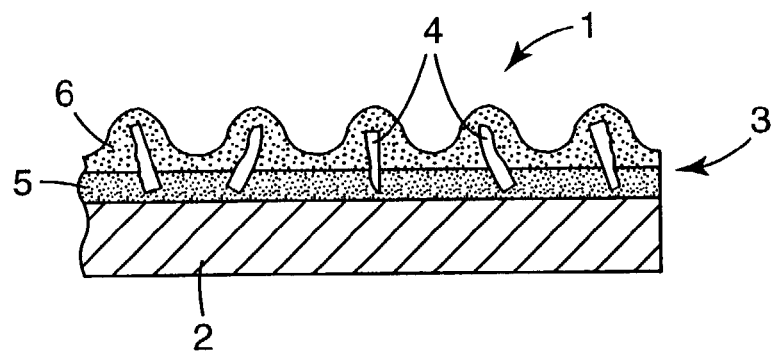
FIG. 3 is a fragmentary cross-sectional schematic view of a coated abrasive article including abrasive particles according to the present invention.

An example of a coated abrasive article is depicted in FIG. 3. Referring to this figure, coated abrasive article 1 has a backing (substrate) 2 and abrasive layer 3. Abrasive layer 3 includes abrasive particles according to the present invention 4 secured to a major surface of backing 2 by make coat 5 and size coat 6. In some instances, a supersize coat (not shown) is used.

Bonded abrasive articles typically include a shaped mass of abrasive particles held together by an organic, metallic, or vitrified binder. Such shaped mass can be, for example, in the form of a wheel, such as a grinding wheel or cutoff wheel. The diameter of grinding wheels typically is about 1 cm to over 1 meter; the diameter of cut off wheels about 1 cm to over 80 cm (more typically 3 cm to about 50 cm). The cut off wheel thickness is typically about 0.5 mm to about 5 cm, more typically about 0.5 mm to about 2 cm. The shaped mass can also be in the form, for example, of a honing stone, segment, mounted point, disc (e.g. double disc grinder) or other conventional bonded abrasive shape. Bonded abrasive articles typically comprise about 3-50% by volume bond material, about 30-90% by volume abrasive particles (or abrasive particle blends), up to 50% by volume additives (including grinding aids), and up to 70% by volume pores, based on the total volume of the bonded abrasive article.

Figure 4:
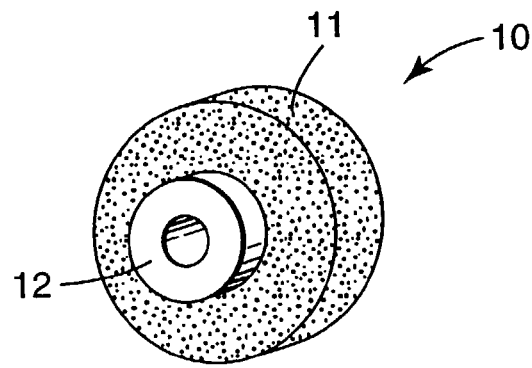
FIG. 4 is a perspective view of a bonded abrasive article including abrasive particles according to the present invention.

A preferred form is a grinding wheel. Referring to FIG. 4, grinding wheel 10 is depicted, which includes abrasive particles according to the present invention 11, molded in a wheel and mounted on hub 12.

Figure 5:
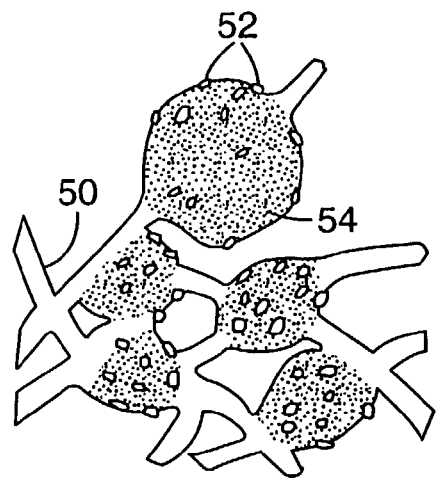
FIG. 5 is an enlarged schematic view of a nonwoven abrasive article including abrasive particles according to the present invention.

Nonwoven abrasive articles typically include an open porous lofty polymer filament structure having abrasive particles according to the present invention distributed throughout the structure and adherently bonded therein by an organic binder. Examples of filaments include polyester fibers, polyamide fibers, and polyaramid fibers. In FIG. 5, a schematic depiction, enlarged about 100×, of a typical nonwoven abrasive article is provided. Such a nonwoven abrasive article comprises fibrous mat 50 as a substrate, onto which abrasive particles according to the present invention 52 are adhered by binder 54.

Useful abrasive brushes include those having a plurality of bristles unitary with a backing (see, e.g., U.S. Pat. No. 5,427,595 (Pihl et al.), U.S. Pat. No. 5,443,906 (Pihl et al.), U.S. Pat. No. 5,679,067 (Johnson et al.), and U.S. Pat. No. 5,903,951 (Ionta et al.), the disclosure of which is incorporated herein by reference). Desirably, such brushes are made by injection molding a mixture of polymer and abrasive particles.

Suitable organic binders for making abrasive articles include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant $\alpha,\beta$-unsaturated carbonyl groups, epoxy resins, acrylated urethane, acrylated epoxies, and combinations thereof. The binder and/or abrasive article may also include additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the desired properties. The coupling agents can improve adhesion to the abrasive particles and/or filler. The binder chemistry may thermally cured, radiation cured or combinations thereof. Additional details on binder chemistry may be found in U.S. Pat. No. 4,588,419 (Caul et al.), U.S. Pat. No. 4,751,138 (Tumey et al.), and U.S. Pat. No. 5,436,063 (Follett et al.), the disclosures of which are incorporated herein by reference.

More specifically with regard to vitrified bonded abrasives, vitreous bonding materials, which exhibit an amorphous structure and are typically hard, are well known in the art. In some cases, the vitreous bonding material includes crystalline phases. Bonded, vitrified abrasive articles according to the present invention may be in the shape of a wheel (including cut off wheels), honing stone, mounted pointed or other conventional bonded abrasive shape. A preferred vitrified bonded abrasive article according to the present invention is a grinding wheel.

Examples of metal oxides that are used to form vitreous bonding materials include: silica, silicates, alumina, soda, calcia, potassia, titania, iron oxide, zinc oxide, lithium oxide, magnesia, boria, aluminum silicate, borosilicate glass, lithium aluminum silicate, combinations thereof, and the like. Typically, vitreous bonding materials can be formed from composition comprising from 10 to 100% glass frit, although more typically the composition comprises 20% to 80% glass frit, or 30% to 70% glass frit. The remaining portion of the vitreous bonding material can be a non-frit material. Alternatively, the vitreous bond may be derived from a non-frit containing composition. Vitreous bonding materials are typically matured at a temperature(s) in a range of about 700° C. to about 1500° C., usually in a range of about 800° C. to about 1300° C., sometimes in a range of about 900° C. to about 1200° C., or even in a range of about 950° C. to about 1100° C. The actual temperature at which the bond is matured depends, for example, on the particular bond chemistry.

Preferred vitrified bonding materials may include those comprising silica, alumina (desirably, at least 10 percent by weight alumina), and boria (desirably, at least 10 percent by weight boria). In most cases the vitrified bonding material further comprise alkali metal oxide(s) (e.g., $Na_2O$ and $K_2O$) (in some cases at least 10 percent by weight alkali metal oxide(s)).

Binder materials may also contain filler materials or grinding aids, typically in the form of a particulate material. Typically, the particulate materials are inorganic materials. Examples of useful fillers for this invention include: metal carbonates (e.g., calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g., talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (lime), aluminum oxide, titanium dioxide), and metal sulfites (e.g., calcium sulfite).

In general, the addition of a grinding aid increases the useful life of the abrasive article. A grinding aid is a material that has a significant effect on the chemical and physical processes of abrading, which results in improved performance. Although not wanting to be bound by theory, it is believed that a grinding aid(s) will (a) decrease the friction between the abrasive particles and the workpiece being abraded, (b) prevent the abrasive particles from "capping" (i.e., prevent metal particles from becoming welded to the tops of the abrasive particles), or at least reduce the tendency of abrasive particles to cap, (c) decrease the interface temperature between the abrasive particles and the workpiece, or (d) decreases the grinding forces.

Grinding aids encompass a wide variety of different materials and can be inorganic or organic based. Examples of chemical groups of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphtalene, pentachloronaphthalene, and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, and magnesium chloride. Examples of metals include, tin, lead, bismuth, cobalt, antimony, cadmium, and iron titanium. Other miscellaneous grinding aids include sulfur, organic sulfur compounds, graphite, and metallic sulfides. It is also within the scope of the present invention to use a combination of different grinding aids, and in some instances this may produce a synergistic effect. The preferred grinding aid is cryolite; the most preferred grinding aid is potassium tetrafluoroborate.

Grinding aids can be particularly useful in coated abrasive and bonded abrasive articles. In coated abrasive articles, grinding aid is typically used in the supersize coat, which is applied over the surface of the abrasive particles. Sometimes, however, the grinding aid is added to the size coat. Typically, the amount of grinding aid incorporated into coated abrasive articles are about 50-300 $g/m^2$ (desirably, about 80-160 $g/m^2$). In vitrified bonded abrasive articles grinding aid is typically impregnated into the pores of the article.

The abrasive articles can contain 100% abrasive particles according to the present invention, or blends of such abrasive particles with other abrasive particles and/or diluent particles. However, at least about 2% by weight, desirably at least about 5% by weight, and more desirably about 30-100% by weight, of the abrasive particles in the abrasive articles should be abrasive particles according to the present invention. In some instances, the abrasive particles according the present invention may be blended with another abrasive particles and/or diluent particles at a ratio between 5 to 75% by weight, about 25 to 75% by weight about 40 to 60% by weight, or about 50% to 50% by weight (i.e., in equal amounts by weight). Examples of suitable conventional abrasive particles include fused aluminum oxide (including white fused alumina, heat-treated aluminum oxide and brown aluminum oxide), silicon carbide, boron carbide, titanium carbide, diamond, cubic boron nitride, garnet, fused alumina-zirconia, and sol-gel-derived abrasive particles, and the like. The sol-gel-derived abrasive particles may be seeded or non-seeded. Likewise, the sol-gel-derived abrasive particles may be randomly shaped or have a shape associated with them, such as a rod or a triangle. Examples of sol gel abrasive particles include those described U.S. Pat. No. 4,314,827 (Leitheiser et al.), U.S. Pat. No. 4,518,397 (Leitheiser et al.), U.S. Pat. No. 4,623,364 (Cottringer et al.), U.S. Pat. No. 4,744,802 (Schwabel), U.S. Pat. No. 4,770,671 (Monroe et al.), U.S. Pat. No. 4,881,951 (Wood et al.), U.S. Pat. No. 5,011,508 (Wald et al.), U.S. Pat. No. 5,090,968 (Pellow), U.S. Pat. No. 5,139,978 (Wood), U.S. Pat. No. 5,201,916 (Berg et al.), U.S. Pat. No. 5,227,104 (Bauer), U.S. Pat. No. 5,366,523 (Rowenhorst et al.), U.S. Pat. No. 5,429,647 (Larmie), U.S. Pat. No. 5,498,269 (Larmie), and U.S. Pat. No. 5,551,963 (Larmie), the disclosures of which are incorporated herein by reference. Additional details concerning sintered alumina abrasive particles made by using alumina powders as a raw material source can also be found, for example, in U.S. Pat. No. 5,259,147 (Falz), U.S. Pat. No. 5,593,467 (Monroe), and U.S. Pat. No. 5,665,127 (Moltgen), the disclosures of which are incorporated herein by reference. Additional details concerning fused abrasive particles, can be found, for example, in U.S. Pat. No. 1,161,620 (Coulter), U.S. Pat. No. 1,192,709 (Tone), U.S. Pat. No. 1,247,337 (Saunders et al.), 1,268,533 (Allen), and U.S. Pat. No. 2,424,645 (Baumann et al.), U.S. Pat. No. 3,891,408 (Rowse et al.), U.S. Pat. No 3,781,172 (Pett et al.), U.S. Pat. No. 3,893,826 (Quinan et al.), U.S. Pat. No. 4,126,429 (Watson), U.S. Pat. No. 4,457,767 (Poon et al.), U.S. Pat. No. 5,023,212 (Dubots et al.), U.S. Pat. No. 5,143,522 (Gibson et al.), and U.S. Pat. No. 5,336,280 (Dubots et al.), and applications having U.S. Ser. Nos. 09/495,978, 09/496,422, 09/496,638, and 09/496,713, each filed on Feb. 2, 2000, and, U.S. Ser. Nos. 09/618,876, 09/618,879, 09/619,106, 09/619,191, 09/619,192, 09/619,215, 09/619,289, 09/619,563, 09/619,729, 09/619,744, and 09/620,262, each filed on Jul. 19, 2000, and U.S. Ser. No. 09/772,730, filed Jan. 30, 2001, the disclosures of which are incorporated herein by reference. In some instances, blends of abrasive particles may result in an abrasive article that exhibits improved grinding performance in comparison with abrasive articles comprising 100% of either type of abrasive particle.

If there is a blend of abrasive particles, the abrasive particle types forming the blend may be of the same size. Alternatively, the abrasive particle types may be of different particle sizes. For example, the larger sized abrasive particles may be abrasive particles according to the present invention, with the smaller sized particles being another abrasive particle type. Conversely, for example, the smaller sized abrasive particles may be abrasive particles according to the present invention, with the larger sized particles being another abrasive particle type.

Examples of suitable diluent particles include marble, gypsum, flint, silica, iron oxide, aluminum silicate, glass (including glass bubbles and glass beads), alumina bubbles, alumina beads and diluent agglomerates. Abrasive particles according to the present invention can also be combined in or with abrasive agglomerates. Abrasive agglomerate particles typically comprise a plurality of abrasive particles, a binder, and optional additives. The binder may be organic and/or inorganic. Abrasive agglomerates may be randomly shape or have a predetermined shape associated with them. The shape may be a block, cylinder, pyramid, coin, square, or the like. Abrasive agglomerate particles typically have particle sizes ranging from about 100 to about 5000 micrometers, typically about 250 to about 2500 micrometers. Additional details regarding abrasive agglomerate particles may be found, for example, in U.S. Pat. No. 4,311,489 (Kressner), U.S. Pat. No. 4,652,275 (Bloecher et al.), U.S. Pat. No. 4,799,939 (Bloecher et al.), U.S. Pat. No. 5,549,962 (Holmes et al.), and U.S. Pat. No. 5,975,988 (Christianson), and applications having U.S. Ser. Nos. 09/688,444 and 09/688,484, filed Oct. 16, 2001, the disclosures of which are incorporated herein by reference.

The abrasive particles may be uniformly distributed in the abrasive article or concentrated in selected areas or portions of the abrasive article. For example, in a coated abrasive, there may be two layers of abrasive particles. The first layer comprises abrasive particles other than abrasive particles according to the present invention, and the second (outermost) layer comprises abrasive particles according to the present invention. Likewise in a bonded abrasive, there may be two distinct sections of the grinding wheel. The outermost section may comprise abrasive particles according to the present invention, whereas the innermost section does not. Alternatively, abrasive particles according to the present invention may be uniformly distributed throughout the bonded abrasive article.

Further details regarding coated abrasive articles can be found, for example, in U.S. Pat. No. 4,734,104 (Broberg), U.S. Pat. No. 4,737,163 (Larkey), U.S. Pat. No. 5,203,884 (Buchanan et al.), U.S. Pat. No. 5,152,917 (Pieper et al.), U.S. Pat. No. 5,378,251 (Culler et al.), U.S. Pat. No. 5,417,726 (Stout et al.), U.S. Pat. No. 5,436,063 (Follett et al.), U.S. Pat. No. 5,496,386 (Broberg et al.), U.S. Pat. No. 5, 609,706 (Benedict et al.), U.S. Pat. No. 5,520,711 (Helmin), U.S. Pat. No. 5,954,844 (Law et al.), U.S. Pat. No. 5,961,674 (Gagliardi et al.), and U.S. Pat. No. 5,975,988 (Christianson), the disclosures of which are incorporated herein by reference. Further details regarding bonded abrasive articles can be found, for example, in U.S. Pat. No. 4,543,107 (Rue), U.S. Pat. No. 4,741,743 (Narayanan et al.), U.S. Pat. No. 4,800, 685 (Haynes et al.), U.S. Pat. No. 4,898,597 (Hay et al.), U.S. Pat. No. 4,997,461 (Markhoff-Matheny et al.), U.S. Pat. No. 5,037,453 (Narayanan et al.), U.S. Pat. No. 5,110,332 (Narayanan et al.), and U.S. Pat. No. 5,863,308 (Qi et al.) the disclosures of which are incorporated herein by reference. Further details regarding vitreous bonded abrasives can be found, for example, in U.S. Pat. No. 4,543,107 (Rue), U.S. Pat. No. 4,898,597 (Hay et al.), U.S. Pat. No. 4,997,461 (Markhoff-Matheny et al.), U.S. Pat. No. 5,094,672 (Giles Jr. et al.), U.S. Pat. No. 5,118,326 (Sheldon et al.), U.S. Pat. No. 5,131,926 (Sheldon et al.), U.S. Pat. No. 5,203,886 (Sheldon et al.), U.S. Pat. No. 5,282,875 (Wood et al.), U.S. Pat. No. 5,738,696 (Wu et al.), and U.S. Pat. No. 5,863,308 (Qi), the disclosures of which are incorporated herein by reference. Further details regarding nonwoven abrasive articles can be found, for example, in U.S. Pat. No. 2,958,593 (Hoover et al.), the disclosure of which is incorporated herein by reference.

The present invention provides a method of abrading a surface, the method comprising contacting at least one abrasive particle according to the present invention, with a surface of a workpiece; and moving at least of one the abrasive particle or the contacted surface to abrade at least a portion of said surface with the abrasive particle. Methods for abrading with abrasive particles according to the present invention range of snagging (i.e., high pressure high stock removal) to polishing (e.g., polishing medical implants with coated abrasive belts), wherein the latter is typically done with finer grades (e.g., less ANSI 220 and finer) of abrasive particles. The abrasive particle may also be used in precision abrading applications, such as grinding cam shafts with vitrified bonded wheels. The size of the abrasive particles used for a particular abrading application will be apparent to those skilled in the art.

Abrading with abrasive particles according to the present invention may be done dry or wet. For wet abrading, the liquid may be introduced supplied in the form of a light mist to complete flood. Examples of commonly used liquids include: water, water-soluble oil, organic lubricant, and emulsions. The liquid may serve to reduce the heat associated with abrading and/or act as a lubricant. The liquid may contain minor amounts of additives such as bactericide, antifoaming agents, and the like.

Abrasive particles according to the present invention may be used to abrade workpieces such as aluminum metal, carbon steels, mild steels, tool steels, stainless steel, hardened steel, titanium, glass, ceramics, wood, wood like materials, paint, painted surfaces, organic coated surfaces and the like. The applied force during abrading typically ranges from about 1 to about 100 kilograms.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated. Unless otherwise stated, all examples contained no significant amount of $SiO_2$, $B_2O_3$, $P_2O_5$, $GeO_2$, $TeO_2$, $As_2O_3$, and $V_2O_5$.

EXAMPLES

Example 1

A polyethylene bottle was charged with 263.5 grams of alumina particles (obtained under the trade designation "APA-0.5" from Condea Vista, Tucson, Ariz.), 143.5 grams of yttrium oxide particles (obtained from H. C. Starck, Newton, Mass.), 93 grams of zirconium oxide particles (with a nominal composition of 100 percent by weight (wt-%) $ZrO_2$ ($+HfO_2$); obtained under the trade designation "DK-2" from Zirconia Sales, Inc. of Marietta, Ga.) and 300 grams of isopropyl alcohol. About 800 grams of the zirconia milling media (obtained from Tosoh Ceramics, Division of Bound Brook, N.J., under the trade designation "YTZ") were added to the bottle, and the mixture was milled at 120 revolutions per minute (rpm) for 24 hours. After the milling, the milling media were removed and the slurry was poured onto a glass ("PYREX") pan where it was dried using a heat-gun. The dried mixture was ground with a mortar and pestle and screened through a 70-mesh screen (212-micrometer opening size screen).

After grinding and screening, some of the particles were fed into a hydrogen/oxygen torch flame. The torch used to melt the particles, thereby generating melted glass beads, was a Bethlehem bench burner PM2D model B, obtained from Bethlehem Apparatus Co., Hellertown, Pa., delivering hydrogen and oxygen at the following rates. For the inner ring, the hydrogen flow rate was 8 standard liters per minute (SLPM) and the oxygen flow rate was 3 SLPM. For the outer ring, the hydrogen flow rate was 23 (SLPM) and the oxygen flow rate was 9.8 SLPM. The dried and sized particles were fed directly into the torch flame, where they were melted and transported to an inclined stainless steel surface (approximately 51 centimeters (cm) (20 inches) wide with the slope angle of 45 degrees) with cold water running over (approximately 8 liters/minute) the surface to form beads.

About 50 grams of the resulting beads were placed in a graphite die and hot-pressed using a uniaxial pressing apparatus (obtained under the trade designation "HP-50", Thermal Technology Inc., Brea, Calif.). The hot-pressing was carried out at 960° C. in an argon atmosphere and 13.8 megapascals (MPa) (2000 pounds per square inch (2 ksi)) pressure. The resulting hot-pressed disk was about 48 millimeters (mm) in diameter, and about 5 mm thick.

The hot-pressed disk was heat-treated in a furnace (an electrically heated furnace (obtained under the trade designation "Model KKSK-666-3100" from Keith Furnaces of Pico Rivera, Calif.)) as follows. The disk was first heated from room temperature (about 25° C.) to about 900° C. at a rate of about 10° C./minutes and then held at 900° C. for about 1 hour. Next, the disk was heated from about 900° C. to about 1300° C. at a rate of about 10° C./minute and then held at 1300° C. for about 1 hour, before cooling back to room temperature by turning off the furnace.

FIG. 1 is a scanning electron microscope (SEM) photomicrograph of a polished section of hot-pressed and heat-treated Example 1 material showing the fine crystalline nature of the material. The polished section was prepared using conventional mounting and polishing techniques. Polishing was done using a polisher (obtained from Buehler of Lake Bluff, Ill. under the trade designation "ECOMET 3 TYPE POLISHER-GRINDER"). The sample was polished for about 3 minutes with a diamond wheel, followed by three minutes of polishing with each of 45, 30, 15, 9, and 3-micrometer diamond slurries. The polished sample was sputter coated with a thin layer of gold-palladium and viewed using JEOL SEM (Model JSM 840A).

The average microhardnesses of the material of this Example was determined as follows. Loose beads (about 125 micrometers in size) were mounted in mounting resin (obtained under the trade designation "EPOMET" from Buehler Ltd., Lake Bluff, Ill.). The resulting cylinder of resin was about 2.5 cm (1 inch) in diameter and about 1.9 cm (0.75 inch) tall. The mounted samples were polished using a conventional grinder/polisher (obtained under the trade designation "EPOMET" from Buehler Ltd.) and conventional diamond slurries with the final polishing step using a 1 micrometer diamond slurry (obtained under the trade designation "METADI" from Buehler Ltd.) to obtain polished cross-sections of the sample.

The microhardness measurements were made using a conventional microhardness tester (obtained under the trade designation "MITUTOYO MVK-VL" from Mitutoyo Corporation, Tokyo, Japan) fitted with a Vickers indenter using a 500-gram indent load. The microhardness measurements were made according to the guidelines stated in ASTM Test Method E384 Test Methods for Microhardness of Materials (1991), the disclosure of which is incorporated herein by reference. The microhardness values were an average of 20 measurements. The average microhardness of the material prior to heat treatment was about 8.5 GPa. The average microhardness of the material after heat-treatment (determined as described above except beads were heat-treated at 1300° C. for 1 hour) was 15.9 GPa.

Examples 2-16

Examples 2-16 beads were prepared as described in Example 1, except the raw materials and the amounts of raw materials used are listed in Table 1, below, and the milling of the raw materials was carried out in 90 ml of isopropyl alcohol with 200 grams of the ziconia media (obtained from Tosoh Ceramics, Division of Bound Brook, N.J., under the designation "YTZ") at 120 rpm for 24 hours. The sources of the raw materials used are listed in Table 2, below.

TABLE 1

| Example | Weight percent of components | Batch amounts, g |
|---|---|---|
| 2 | $Y_2O_3$: 28.08<br>$Al_2O_3$: 58.48<br>$ZrO_2$: 13.43 | $Y_2O_3$: 14.04<br>$Al_2O_3$: 29.24<br>$ZrO_2$: 6.72 |
| 3 | $Y_2O_3$: 27.6<br>$Al_2O_3$: 57.5<br>$ZrO_2$: 14.9 | $Y_2O_3$: 13.8<br>$Al_2O_3$: 23.75<br>$ZrO_2$: 7.45 |
| 4 | $Y_2O_3$: 27.44<br>$Al_2O_3$: 57.14<br>$ZrO_2$: 15.43 | $Y_2O_3$: 13.72<br>$Al_2O_3$: 28.57<br>$ZrO_2$: 7.71 |
| 5 | $Y_2O_3$: 28.7<br>$Al_2O_3$: 55.7<br>$ZrO_2$: 15.5 | $Y_2O_3$: 14.35<br>$Al_2O_3$: 27.85<br>$ZrO_2$: 7.75 |
| 6 | $Y_2O_3$: 19<br>$Al_2O_3$: 51<br>$ZrO_2$: 17.9<br>$La_2O_3$: 12.1 | $Y_2O_3$: 9.5<br>$Al_2O_3$: 25.5<br>$ZrO_2$: 8.95<br>$La_2O_3$: 6.05 |
| 7 | $Y_2O_3$: 19.3<br>$Al_2O_3$: 50.5<br>$ZrO_2$: 17.8<br>$Nd_2O_3$: 12.4 | $Y_2O_3$: 9.65<br>$Al_2O_3$: 25.25<br>$ZrO_2$: 8.9<br>$Nd_2O_3$: 6.2 |
| 8 | $Y_2O_3$: 19.1<br>$Al_2O_3$: 50<br>$ZrO_2$: 17.8<br>$Gd_2O_3$: 13.1 | $Y_2O_3$: 9.55<br>$Al_2O_3$: 25<br>$ZrO_2$: 8.9<br>$Gd_2O_3$: 6.55 |
| 9 | $Y_2O_3$: 19.0<br>$Al_2O_3$: 49.7<br>$ZrO_2$: 17.55<br>$Er_2O_3$: 13.8 | $Y_2O_3$: 9.5<br>$Al_2O_3$: 24.85<br>$ZrO_2$: 8.77<br>$Er_2O_3$: 6.9 |
| 10 | $Y_2O_3$: 27.4<br>$Al_2O_3$: 50.3<br>$ZrO_2$: 17.8<br>$Li_2CO_3$: 4.5 | $Y_2O_3$: 13.7<br>$Al_2O_3$: 25.15<br>$ZrO_2$: 8.9<br>$Li_2CO_3$: 2.25 |
| 11 | $HfO_2$: 20.08<br>$Al_2O_3$: 46.55<br>$Y_2O_3$: 25.37 | $HfO_2$: 14.04<br>$Al_2O_3$: 23.27<br>$Y_2O_3$: 12.67 |
| 12 | $Y_2O_3$: 27.4<br>$Al_2O_3$: 50.3<br>$ZrO_2$: 17.8<br>MgO: 4.5 | $Y_2O_3$: 13.7<br>$Al_2O_3$: 25.15<br>$ZrO_2$: 8.9<br>MgO: 2.25 |
| 13 | $Y_2O_3$: 27.4<br>$Al_2O_3$: 50.3<br>$ZrO_2$: 17.8<br>CaO: 4.5 | $Y_2O_3$: 13.7<br>$Al_2O_3$: 25.15<br>$ZrO_2$: 8.9<br>CaO: 2.25 |
| 14 | $Y_2O_3$: 27.4<br>$Al_2O_3$: 50.3<br>$ZrO_2$: 17.8<br>$TiO_2$: 4.5 | $Y_2O_3$: 13.7<br>$Al_2O_3$: 25.15<br>$ZrO_2$: 8.9<br>$TiO_2$: 2.25 |
| 15 | $Y_2O_3$: 27.4<br>$Al_2O_3$: 50.3<br>$ZrO_2$: 17.8<br>$NaHCO_3$: 2.25 | $Y_2O_3$: 13.7<br>$Al_2O_3$: 25.15<br>$ZrO_2$: 8.9<br>$NaHCO_3$: 2.25 |
| 16 | $Y_2O_3$: 27.4<br>$Al_2O_3$: 50.3<br>$ZrO_2$: 17.8<br>$SiO_2$: 2.25 | $Y_2O_3$: 13.7<br>$Al_2O_3$: 25.15<br>$ZrO_2$: 8.9<br>$SiO_2$: 2.25 |

TABLE 2

| Raw Material | Source |
|---|---|
| Alumina particles ($Al_2O_3$) | Obtained from Condea Vista, Tuscon, AZ under the trade designation "APA-0.5" |
| Calcium oxide particles (CaO) | Obtained from Alfa Aesar, Ward Hill, MA |
| Hafnium oxide particles ($HfO_2$) | Obtained from Teledyne Wah Chang Albany Company, Albany, OR |
| Lanthanum oxide particles ($La_2O_3$) | Obtained from Molycorp Inc., Mountain Pass, CA |
| Gadolinium oxide particles ($Gd_2O_3$) | Obtained from Molycorp Inc. |
| Erbium oxide particles ($Er_2O_3$) | Obtained from Aldrich Chemical Co., Milwaukee, WI |
| Lithium carbonate particles ($Li_2CO_3$) | Obtained from Aldrich Chemical Co. |
| Magnesium oxide particles (MgO) | Obtained from Aldrich Chemical Co. |
| Neodymium oxide particles ($Nd_2O_3$) | Obtained from Molycorp Inc. |
| Silica particles ($SiO_2$) | Obtained from Alfa Aesar |
| Sodium bicarbonate particles ($NaHCO_3$) | Obtained from Aldrich Chemical Co. |
| Titanium dioxide particles ($TiO_2$) | Obtained from Kemira Inc., Savannah, GA |
| Yttria-stabilized zirconium oxide particles (Y-PSZ) | Obtained from Zirconia Sales, Inc. of Marietta, GA under the trade designation "HSY-3" |

Various properties/characteristics of some Example 2-16 materials were measured as follows. Powder X-ray diffraction (using an X-ray diffractometer (obtained under the trade designation "PHILLIPS XRG 3100" from Phillips, Mahwah, N.J) with copper K (1 radiation of 1.54050 Angstrom) was used to qualitatively measure phases present in example materials. The presence of a broad diffused intensity peak was taken as an indication of the amorphous nature of a material. The existence of both a broad peak and well-defined peaks was taken as an indication of existence of crystalline matter within an amorphous matrix. Phases detected in various examples are reported in Table 3, below.

TABLE 3

| Example | Phases detected via X-ray diffraction | Color | $T_g$, °C. | $T_x$, °C. | Hot-pressing temp, °C. |
|---|---|---|---|---|---|
| 2 | Amorphous* and Crystalline | Clear/milky | 874 | 932 | 980 |
| 3 | Amorphous* and Crystalline | Clear/milky | 871 | 934 | — |
| 4 | Amorphous* and Crystalline | Clear/milky | 874 | 937 | — |
| 5 | Amorphous* and Crystalline | Clear/milky | 870 | 942 | — |
| 6 | Amorphous* | Clear | 843 | 938 | 970 |
| 7 | Amorphous* | Blue/pink | 848 | 934 | 970 |
| 8 | Amorphous* and Crystalline | Clear/milky | 880 | 943 | |
| 9 | Amorphous* and Crystalline | Pink | 876 | 936 | |
| 10 | Amorphous* | Clear | 821 | 927 | 970 |
| 11 | Amorphous* and Crystalline | Clear/Greenish | 867 | 948 | — |
| 12 | Amorphous* and Crystalline | Clear/milky | 869 | 934 | — |
| 13 | Amorphous* | Clear | 845 | 922 | 970 |
| 14 | Amorphous* and Crystalline | Clear/milky | 870 | 933 | |
| 15 | Amorphous* | Clear | 831 | 916 | 970 |
| 16 | Amorphous* | Clear | 826 | 926 | 970 |

*Glass, as the example has a $T_g$.

For differential thermal analysis (DTA), a material was screened to retain beads in the 90-125 micrometer size range. DTA runs were made (using an instrument obtained from Netzsch Instruments, Selb, Germany under the trade designation "NETZSCH STA 409 DTA/TGA"). The amount of each screened sample placed in a 100-microliter $Al_2O_3$ sample holder was 400 milligrams. Each sample was heated in static air at a rate of 10° C./minute from room temperature (about 25° C.) to 1200° C.

Figure 2:
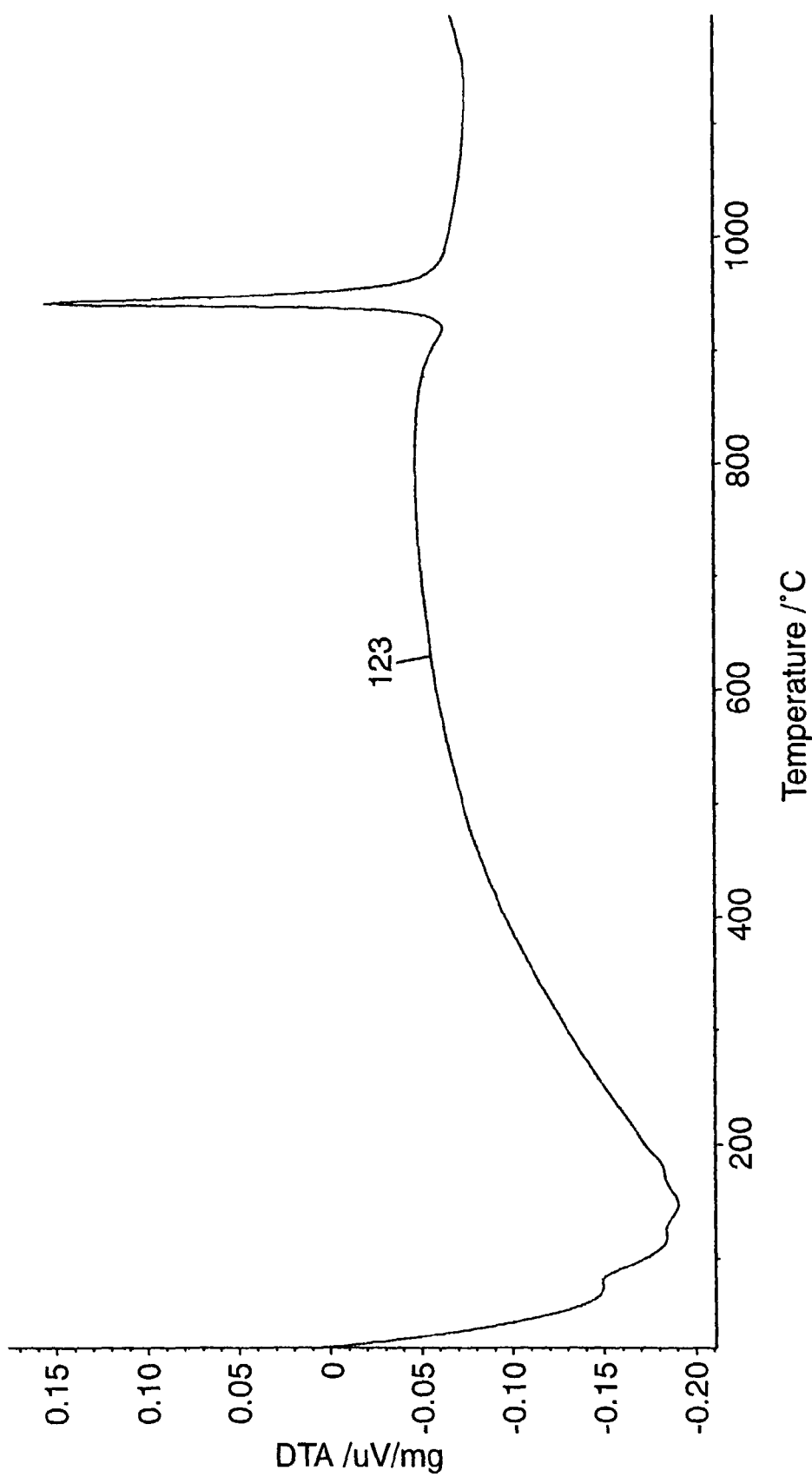
FIG. 2 is a DTA curve of Example 1 material.

Referring to FIG. 2, line 123 is the plotted DTA data for the Example 1 material. Referring to FIG. 2 line 123, the material exhibited an endothermic event at a temperature around 875° C., as evidenced by the downward curve of line 123. It was believed that this event was due to the glass transition ($T_g$) of the material. At about 941° C., an exothermic event was observed as evidenced by the sharp peak in line 123. It was believed that this event was due to the crystallization ($T_g$) of the material. These $T_g$ and $T_x$ values for other examples are reported in Table 3, above.

The hot-pressing temperature at which appreciable glass flow occurred, as indicated by the displacement control unit of the hot pressing equipment described above, are reported for various examples in Table 3, above.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. Glass comprising $Al_2O_3$, $Y_2O_3$, and $ZrO_2$, wherein at least 80 percent by weight of the glass collectively comprises the $Al_2O_3$, $Y_2O_3$, and $ZrO_2$, and wherein the glass comprise at least 30 percent by weight $Al_2O_3$, at least 20 percent by weight $Y_2O_3$, and $ZrO_2$ in a range from 15.43 to 30 percent by weight, based on the total weight of the glass.

2. Ceramic comprising the glass according to claim 1.

3. A method for making glass comprising $Al_2O_3$, $Y_2O_3$, and $ZrO_2$, wherein at least 80 percent by weight of the glass collectively comprises the $Al_2O_3$, $Y_2O_3$, and $ZrO_2$, and wherein the glass comprise at least 30 percent by weight $Al_2O_3$, at least 20 percent by weight $Y_2O_3$, and $ZrO_2$ in a range from 15.43 to 30 percent by weight, based on the total weight of the glass, the method comprising:
melting sources of at least $Al_2O_3$, $Y_2O_3$, and $ZrO_2$ to provide a melt; and
cooling the melt to provide the glass.

4. A method for making ceramic comprising glass, wherein the class comprises $Al_2O_3$, $Y_2O_3$, and $ZrO_2$, wherein at least 80 percent by weight of the glass collectively comprises the $Al_2O_3$, $Y_2O_3$, and $ZrO_2$, and wherein the glass comprise at least 30 percent by weight $Al_2O_3$, at least 20 percent by weight $Y_2O_3$, and $ZrO_2$ in a range from 15.43 to 30 percent by weight, based on the total weight of the glass, the method comprising:
melting sources of at least $Al_2O_3$, $Y_2O_3$, and $ZrO_2$ to provide a melt; and
cooling the melt to provide the ceramic.

5. A method for making an article comprising glass comprising $Al_2O_3$, $Y_2O_3$, and at least one of $ZrO_2$ or $HfO_2$, wherein at least 80 percent by weight of the glass collectively comprises the $Al_2O_3$, $Y_2O_3$, and at least one of $ZrO_2$ or $HfO_2$, based on the total weight of the class the method comprising:
melting at least sources $Al_2O_3$, $Y_2O_3$, and at least one of $ZrO_2$ or $HfO_2$ to provide a melt;
cooling the melt to provide glass beads comprising glass comprising $Al_2O_3$, $Y_2O_3$, and at least one of $ZrO_2$ or $HfO_2$, wherein at least 80 percent by weight of the glass collectively comprises the $Al_2O_3$, $Y_2O_3$, and at least one of $ZrO_2$ or $HfO_2$, based on the total weight of the glass, the glass having a $T_g$;
heating the glass beads above the $T_g$ such that the glass beads coalesce to form a shape; and
cooling the coalesced shape to provide the article.

6. A method for making an article comprising glass comprising $Al_2O_3$, $Y_2O_3$, and at least one of $ZrO_2$ or $HfO_2$, wherein at least 60 percent by weight of the glass collectively comprises the $Al_2O_3$, $Y_2O_3$, and at least one of $ZrO_2$ or $HfO_2$, and less than 20 percent by weight $SiO_2$ and less than 20 percent by weight $B_2O_3$, based on the total weight of the glass, the method comprising:
melting at least sources of $Al_2O_3$, $Y_2O_3$, and at least one of $ZrO_2$ or $HfO_2$ to provide a melt;
cooling the melt to provide glass beads comprising glass comprising $Al_2O_3$, $Y_2O_3$, and at least one of $ZrO_2$ or $HfO_2$, wherein at least 60 percent by weight of the glass collectively comprises the $Al_2O_3$, $Y_2O_3$, and at least one of $ZrO_2$ or $HfO_2$, and less than 20 percent by weight $SiO_2$ and less than 20 percent by weight $B_2O_3$, based on the total weight of the glass, the glass having a $T_g$;
heating the glass beads above the $T_g$ such that the glass beads coalesce to form a shape; and
cooling the coalesced shape to provide the article.

7. A method for making an article comprising glass comprising $Al_2O_3$, $Y_2O_3$, and at least one of $ZrO_2$ or $HfO_2$, wherein at least 60 percent by weight of the glass collectively comprises the $Al_2O_3$, $Y_2O_3$, and at least one of $ZrO_2$ or $HfO_2$, and less than 40 percent by weight collectively $SiO_2$, $B_2O_3$, and $P_2O_5$, based on the total weight of the glass, the method comprising:

melting at least sources of $Al_2O_3$, $Y_2O_3$, and at least one of $ZrO_2$ or $HfO_2$ to provide a melt;

cooling the melt to provide glass beads comprising glass comprising $Al_2O_3$, $Y_2O_3$, and at least one of $ZrO_2$ or $HfO_2$, wherein at least 60 percent by weight of the glass collectively comprises the $Al_2O_3$, $Y_2O_3$, and at least one of $ZrO_2$ or $HfO_2$, and less than 40 percent by weight collectively $SiO_2$, $B_2O_3$, and $P_2O_5$, based on the total weight of the glass, the glass having a $T_g$;

heating the glass beads above the $T_g$ such that the glass beads coalesce to form a shape; and cooling the coalesced shape to provide the article.

8. A method for making an article comprising glass comprising $Al_2O_3$, $Y_2O_3$, and at least one of $ZrO_2$ or $HfO_2$, wherein at least 80 percent by weight of the glass collectively comprises the $Al_2O_3$, $Y_2O_3$, and at least one of $ZrO_2$ or $HfO_2$, based on the total weight of the glass, the method comprising:

melting at least sources of $Al_2O_3$, $Y_2O_3$, and at least one of $ZrO_2$ or $HfO_2$ to provide a melt;

cooling the melt to provide glass beads comprising glass comprising $Al_2O_3$, $Y_2O_3$, and at least one of $ZrO_2$ or $HfO_2$, wherein at least 80 percent by weight of the glass collectively comprises the $Al_2O_3$, $Y_2O_3$, and at least one of $ZrO_2$ or $HfO_2$, based on the total weight of the glass, the glass having a $T_g$;

converting the glass beads to provide glass powder;

heating the glass powder above the $T_g$ such that the glass powder coalesces to form a shape; and cooling the coalesced shape to provide the article.

9. A method for making an article comprising glass comprising $Al_2O_3$, $Y_2O_3$, and at least one of $ZrO_2$ or $HfO_2$, wherein at least 60 percent by weight of the glass collectively comprises the $Al_2O_3$, $Y_2O_3$, and at least one of $ZrO_2$ or $HfO_2$, and less than 20 percent by weight $SiO_2$ and less than 20 percent by weight $B_2O_3$, based on the total weight of the glass, the method comprising:

melting at least sources of $Al_2O_3$, $Y_2O_3$, and at least one of $ZrO_2$ or $HfO_2$ to provide a melt;

cooling the melt to provide glass beads comprising glass comprising $Al_2O_3$, $Y_2O_3$, and at least one of $ZrO_2$ or $HfO_2$, wherein at least 60 percent by weight of the glass collectively comprises the $Al_2O_3$, $Y_2O_3$, and at least one of $ZrO_2$ or $HfO_2$, and less than 20 percent by weight $SiO_2$ and less than 20 percent by weight $B_2O_3$, based on the total weight of the glass, the glass having a $T_g$;

converting the glass beads to provide glass powder;

heating the glass powder above the $T_g$ such that the glass powder coalesces to form a shape; and cooling the coalesced shape to provide the article.

10. A method for making an article comprising glass comprising $Al_2O_3$, $Y_2O_3$, and at least one of $ZrO_2$ or $HfO_2$, wherein at least 60 percent by weight of the glass collectively comprises the $Al_2O_3$, $Y_2O_3$, and at least one of $ZrO_2$ or $HfO_2$, and less than 40 percent by weight collectively $SiO_2$, $B_2O_3$, and $P_2O_5$, based on the total weight of the glass, the method comprising:

melting at least sources of $Al_2O_3$, $Y_2O_3$, and at least one of $ZrO_2$ or $HfO_2$ to provide a melt;

cooling the melt to provide glass beads comprising glass comprising $Al_2O_3$, $Y_2O_3$, and at least one of $ZrO_2$ or $HfO_2$, wherein at least 60 percent by weight of the glass collectively comprises the $Al_2O_3$, $Y_2O_3$, and at least one of $ZrO_2$ or $HfO_2$, and less than 40 percent by weight collectively $SiO_2$, $B_2O_3$, and $P_2O_5$, based on the total weight of the glass, the glass having a $T_g$;

converting the glass beads to provide glass powder;

heating the glass powder above the $T_g$ such that the glass powder coalesces to form a shape; and cooling the coalesced shape to provide the article.

11. Ceramic comprising at least 75 percent by volume glass, the glass comprising $Al_2O_3$, $Y_2O_3$, and $ZrO_2$, wherein at least 80 percent by weight of the glass collectively comprises the $Al_2O_3$, $Y_2O_3$, and $ZrO_2$, and wherein the glass comprise at least 30 percent by weight $Al_2O_3$, at least 20 percent by weight $Y_2O_3$, and $ZrO_2$ in a range from 15.43 to 30 percent by weight, based on the total weight of the glass.

12. Glass-ceramic comprising $Al_2O_3$, $Y_2O_3$, and at least one of $ZrO_2$ or $HfO_2$, wherein at least 80 percent by weight of the glass-ceramic collectively comprises the $Al_2O_3$, $Y_2O_3$, and at least one of $ZrO_2$ or $HfO_2$, based on the total weight of the glass-ceramic.

13. The glass-ceramic according to claim 12 collectively comprising at least 80 percent by weight of the $Al_2O_3$, $Y_2O_3$, and $ZrO_2$, based on the total weight of the glass-ceramic.

14. Glass-ceramic comprising $Al_2O_3$, $Y_2O_3$, and at least one of $ZrO_2$ or $HfO_2$, wherein at least 60 percent by weight of the glass-ceramic collectively comprises the $Al_2O_3$, $Y_2O_3$, and at least one of $ZrO_2$ or $HfO_2$, and less than 20 percent by weight $SiO_2$ and less than 20 percent by weight $B_2O_3$, based on the total weight of the glass-ceramic.

15. The glass-ceramic according to claim 14 collectively comprising at least 60 percent by weight of the $Al_2O_3$, $Y_2O_3$, and $ZrO_2$, based on the total weight of the glass-ceramic.

16. Glass-ceramic comprising $Al_2O_3$, $Y_2O_3$, and at least one of $ZrO_2$ or $HfO_2$, wherein at least 60 percent by weight of the glass-ceramic collectively comprises the $Al_2O_3$, $Y_2O_3$, and at least one of $ZrO_2$ or $HfO_2$, and less than 40 percent by weight collectively $SiO_2$, $B_2O_3$, and $P_2O_5$, based on the total weight of the glass-ceramic.

17. The glass-ceramic according to claim 16 collectively comprising at least 60 percent by weight of the $Al_2O_3$, $Y_2O_3$, and $ZrO_2$, based on the total weight of the glass-ceramic.

18. A method for making glass-ceramic comprising $Al_2O_3$, $Y_2O_3$, and at least one of $ZrO_2$ or $HfO_2$, wherein at least 80 percent by weight of the glass-ceramic collectively comprises the $Al_2O_3$, $Y_2O_3$, and at least one of $ZrO_2$ or $HfO_2$, based on the total weight of the glass-ceramic, the method comprising:

heat-treating glass comprising $Al_2O_3$, $Y_2O_3$, and at least one of $ZrO_2$ or $HfO_2$, wherein at least 80 percent by weight of the glass collectively comprises the $Al_2O_3$, $Y_2O_3$, and at least one of $ZrO_2$ or $HfO_2$, based on the total weight of the glass to provide the glass-ceramic.

19. A method for making glass-ceramic comprising $Al_2O_3$, $Y_2O_3$, and at least one of $ZrO_2$ or $HfO_2$, wherein at least 80 percent by weight of the glass-ceramic collectively comprises the $Al_2O_3$, $Y_2O_3$, and at least one of $ZrO_2$ or $HfO_2$, based on the total weight of the glass-ceramic, the method comprising:

heat-treating ceramic comprising glass, wherein the glass comprises $Al_2O_3$, $Y_2O_3$, and at least one of $ZrO_2$ or $HfO_2$, wherein at least 80 percent by weight of the glass collectively comprises the $Al_2O_3$, $Y_2O_3$, and at least one of $ZrO_2$ or $HfO_2$, based on the total weight of the glass to provide the glass-ceramic.

20. A method for making glass-ceramic comprising $Al_2O_3$, $Y_2O_3$, and at least one of $ZrO_2$ or $HfO_2$, wherein at least 60 percent by weight of the glass-ceramic collectively comprises the $Al_2O_3$, $Y_2O_3$, and at least one of $ZrO_2$ or $HfO_2$, and less than 20 percent by weight $SiO_2$ and less than 20 percent by weight $B_2O_3$, based on the total weight of the glass-ceramic, the method comprising:

heat-treating glass comprising $Al_2O_3$, $Y_2O_3$, and at least one of $ZrO_2$ or $HfO_2$, wherein at least 60 percent by weight of the glass collectively comprises the $Al_2O_3$, $Y_2O_3$, and at least one of $ZrO_2$ or $HfO_2$, and less than 20 percent by weight $SiO_2$ and less than 20 percent by weight $B_2O_3$, based on the total weight of the glass to provide the glass-ceramic.

21. A method for making glass-ceramic comprising $Al_2O_3$, $Y_2O_3$, and at least one of $ZrO_2$ or $HfO_2$, wherein at least 60 percent by weight of the glass-ceramic collectively comprises the $Al_2O_3$, $Y_2O_3$, and at least one of $ZrO_2$ or $HfO_2$, and less than 20 percent by weight $SiO_2$ and less than 20 percent by weight $B_2O_3$, based on the total weight of the glass-ceramic, the method comprising:

heat-treating ceramic comprising glass, wherein the glass comprises $Al_2O_3$, $Y_2O_3$, and at least one of $ZrO_2$ or $HfO_2$, wherein at least 60 percent by weight of the glass collectively comprises the $Al_2O_3$, $Y_2O_3$, and at least one of $ZrO_2$ or $HfO_2$, and less than 20 percent by weight $SiO_2$ and less than 20 percent by weight $B_2O_3$, based on the total weight of the glass to provide the glass-ceramic.

22. A method for making glass-ceramic comprising $Al_2O_3$, $Y_2O_3$, and at least one of $ZrO_2$ or $HfO_2$, wherein at least 60 percent by weight of the glass-ceramic collectively comprises the $Al_2O_3$, $Y_2O_3$, and at least one of $ZrO_2$ or $HfO_2$, and less than 40 percent by weight collectively $SiO_2$, $B_2O_3$, and $P_2O_5$, based on the total weight of the glass-ceramic, the method comprising:

heat-treating glass comprising $Al_2O_3$, $Y_2O_3$, and at least one of $ZrO_2$ or $HfO_2$, wherein at least 60 percent by weight of the glass collectively comprises the $Al_2O_3$, $Y_2O_3$, and at least one of $ZrO_2$ or $HfO_2$, and less than 40 percent by weight collectively $SiO_2$, $B_2O_3$, and $P_2O_5$, based on the total weight of the glass to provide the glass-ceramic.

23. A method for making glass-ceramic comprising $Al_2O_3$, $Y_2O_3$, and at least one of $ZrO_2$ or $HfO_2$, wherein at least 60 percent by weight of the glass-ceramic collectively comprises the $Al_2O_3$, $Y_2O_3$, and at least one of $ZrO_2$ or $HfO_2$, and less than 40 percent by weight collectively $SiO_2$, $B_2O_3$, and $P_2O_5$, based on the total weight of the glass-ceramic, the method comprising:

heat-treating ceramic comprising glass, wherein the glass comprises $Al_2O_3$, $Y_2O_3$, and at least one of $ZrO_2$ or $HfO_2$, wherein at least 60 percent by weight of the glass collectively comprises the $Al_2O_3$, $Y_2O_3$, and at least one of $ZrO_2$ or $HfO_2$, and less than 40 percent by weight collectively $SiO_2$, $B_2O_3$, and $P_2O_5$, based on the total weight of the glass to provide the glass-ceramic.

24. A method for making glass-ceramic comprising $Al_2O_3$, $Y_2O_3$, and at least one of $ZrO_2$ or $HfO_2$, the method comprising:

heat-treating glass comprising $Al_2O_3$, $Y_2O_3$, and at least one of $ZrO_2$ or $HfO_2$ to provide the glass-ceramic, wherein the glass-ceramic (a) exhibits a microstructure comprising crystallites having an average crystallite size of less than 1 micrometer, and (b) is free of eutectic microstructure features.

25. A method for making glass-ceramic comprising $Al_2O_3$, $Y_2O_3$, and at least one of $ZrO_2$ or $HfO_2$, the method comprising:

heat-treating ceramic comprising glass, wherein the glass comprises $Al_2O_3$, $Y_2O_3$, and at least one of $ZrO_2$ or $HfO_2$ to provide the glass-ceramic wherein the glass-ceramic (a) exhibits a microstructure comprising crystallites having an average crystallite size of less than 1 micrometer, and (b) is free of eutectic microstructure features.

26. A method for making a glass-ceramic article, the method comprising:

converting glass to provide glass powder, the glass comprising $Al_2O_3$, $Y_2O_3$, and at least one of $ZrO_2$ or $HfO_2$, wherein at least 80 percent by weight of the glass collectively comprises the $Al_2O_3$, $Y_2O_3$, and at least one of $ZrO_2$ or $HfO_2$, based on the total weight of the glass, the glass having a $T_g$;

heating the glass powder above the $T_g$ such that the glass powder coalesces to form a shape;

cooling the coalesced shape to provide a glass article; and heat-treating the glass article to provide a glass-ceramic article.

27. A method for making a glass-ceramic article, the method comprising:

converting glass to provide glass powder, the glass comprising $Al_2O_3$, $Y_2O_3$, and at least one of $ZrO_2$ or $HfO_2$, wherein at least 60 percent by weight of the glass collectively comprises the $Al_2O_3$, $Y_2O_3$, and at least one of $ZrO_2$ or $HfO_2$, and less than 20 percent by weight $SiO_2$ and less than 20 percent by weight $B_2O_3$, based on the total weight of the glass, the glass having a $T_g$;

heating the glass powder above the $T_g$ such that the glass powder coalesces to form a shape;

cooling the coalesced shape to provide a glass article; and heat-treating the glass article to provide a glass-ceramic article.

28. A method for making a glass-ceramic article, the method comprising:

converting glass to provide glass powder, the glass comprising $Al_2O_3$, $Y_2O_3$, and at least one of $ZrO_2$ or $HfO_2$, wherein at least 60 percent by weight of the glass collectively comprises the $Al_2O_3$, $Y_2O_3$, and at least one of $ZrO_2$ or $HfO_2$, and less than 40 percent by weight collectively $SiO_2$, $B_2O_3$, and $P_2O_5$, based on the total weight of the glass, the glass having a $T_g$;

heating the glass powder above the $T_g$ such that the glass powder coalesces to form a shape;

cooling the coalesced shape to provide a glass article; and heat-treating the glass article to provide a glass-ceramic article.

29. Glass-ceramic comprising $Al_2O_3$, $Y_2O_3$, and at least one of $ZrO_2$ or $HfO_2$, wherein the glass-ceramic (a) exhibits a microstructure comprising crystallites having an average crystallite size of less than 200 nanometers and (b) has a density of at least 90% of theoretical density.

30. Glass-ceramic comprising $Al_2O_3$, $Y_2O_3$, and at least one of $ZrO_2$ or $HfO_2$, wherein the glass-ceramic (a) exhibits a microstructure comprising crystallites, wherein none of the crystallites are greater than 200 nanometers in size and (b) has a density of at least 90% of theoretical density.

31. Glass-ceramic comprising $Al_2O_3$, $Y_2O_3$, and at least one of $ZrO_2$ or $HfO_2$, wherein the glass-ceramic (a) exhibits a microstructure comprising crystallites, wherein at least a portion of the crystallites are not greater than 150 nanometers in size and (b) has a density of at least 90% of theoretical density.

32. Ceramic comprising at least 75 percent by volume glass-ceramic, the glass-ceramic comprising $Al_2O_3$, $Y_2O_3$, and at least one of $ZrO_2$ or $HfO_2$, wherein the ceramic (a) exhibits a microstructure comprising crystallites having an average crystallite size of less than 200 nanometers and (b) has a density of at least 90% of theoretical density.

33. Ceramic comprising at least 75 percent by volume glass-ceramic, the glass-ceramic comprising $Al_2O_3$, $Y_2O_3$, and at least one of $ZrO_2$ or $HfO_2$, wherein the ceramic (a) exhibits a microstructure comprising crystallites, wherein none of the crystallites are greater than 200 nanometers in size and (b) has a density of at least 90% of theoretical density.

34. Ceramic comprising at least 75 percent by volume glass-ceramic, the glass-ceramic comprising $Al_2O_3$, $Y_2O_3$, and at least one of $ZrO_2$ or $HfO_2$, wherein the ceramic (a) exhibits a microstructure comprising crystallites, wherein at least a portion of the crystallites are not greater than 150 nanometers in size and (b) has a density of at least 90% of theoretical density.

35. Ceramic comprising at least 75 percent by volume glass-ceramic, the glass-ceramic comprising $Al_2O_3$, $Y_2O_3$, and at least one of $ZrO_2$ or $HfO_2$, wherein the ceramic (a) exhibits a microstructure comprising crystallites having an average crystallite size not greater than 200 nanometer, in size and (b) has a density of at least 90% of theoretical density.

36. The ceramic according to claim 35 wherein the glass-ceramic comprising $Al_2O_3$, $Y_2O_3$, and $ZrO_2$.

37. Abrasive particle comprising a glass-ceramic comprising $Al_2O_3$, $Y_2O_3$, and at least one of $ZrO_2$ or $HfO_2$, wherein at least 80 percent by weight of the glass-ceramic collectively comprises the $Al_2O_3$, $Y_2O_3$, and at least one of $ZrO_2$ or $HfO_2$, based on the total weight of the glass-ceramic.

38. Abrasive particle comprising a glass-ceramic comprising $Al_2O_3$, $Y_2O_3$, and at least one of $ZrO_2$ or $HfO_2$, wherein at least 60 percent by weight of the glass-ceramic collectively comprises the $Al_2O_3$, $Y_2O_3$, and at least one of $ZrO_2$ or $HfO_2$, and less than 20 percent by weight $SiO_2$ and less than 20 percent by weight of the glass-ceramic.

39. Abrasive particle comprising a glass-ceramic comprising $Al_2O_3$, $Y_2O_3$, and at least one of $ZrO_2$ or $HfO_2$, wherein at least 60 percent by weight of the glass-ceramic collectively comprises the $Al_2O_3$, $Y_2O_3$, and at least one of $ZrO_2$ or $HfO_2$, and less than 40 percent by weight collectively $SiO_2$, $B_2O_3$, and $P_2O_5$, based on the total weight of the glass-ceramic.

40. A method for making abrasive particles, the method comprising:
heat-treating glass particles comprising $Al_2O_3$, $Y_2O_3$, and at least one of $ZrO_2$ or $HfO_2$, wherein at least 80 percent by weight of the glass collectively comprises the $Al_2O_3$, $Y_2O_3$, and at least one of $ZrO_2$ or $HfO_2$, based on the total weight of the glass particles, to provide glass-ceramic abrasive particles.

41. A method for making abrasive particles, the method comprising:
heat-treating particles comprising glass, wherein the glass comprises $Al_2O_3$, $Y_2O_3$, and at least one of $ZrO_2$ or $HfO_2$, wherein at least 80 percent by weight of the glass collectively comprises the $Al_2O_3$, $Y_2O_3$, and at least one of $ZrO_2$ or $HfO_2$, based on the total weight of the glass particles, to provide glass-ceramic abrasive particles.

42. A method for making abrasive particles, the method comprising:
heat-treating glass comprising $Al_2O_3$, $Y_2O_3$, and at least one of $ZrO_2$ or $HfO_2$, wherein at least 80 percent by weight of the glass collectively comprises the $Al_2O_3$, $Y_2O_3$, and at least one of $ZrO_2$ or $HfO_2$, based on the total weight of the glass, to provide glass-ceramic; and
converting the glass-ceramic to provide abrasive particles.

43. A method for making abrasive particles, the method comprising:
heat-treating ceramic comprising glass, wherein the glass comprises $Al_2O_3$, $Y_2O_3$, and at least one of $ZrO_2$ or $HfO_2$, wherein at least 80 percent by weight of the glass collectively comprises the $Al_2O_3$, $Y_2O_3$, and at least one of $ZrO_2$ or $HfO_2$, based on the total weight of the glass, to provide glass-ceramic; and
converting the glass-ceramic to provide abrasive particles.

44. A method for making abrasive particles, the method comprising:
heat-treating glass particles comprising $Al_2O_3$, $Y_2O_3$, and at least one of $ZrO_2$ or $HfO_2$, wherein at least 60 percent by weight of the glass collectively comprises the $Al_2O_3$, $Y_2O_3$, and at least one of $ZrO_2$ or $HfO_2$, and less than 20 percent by weight $SiO_2$ and less than 20 percent by weight $B_2O_3$, based on the total weight of the glass particles, to provide glass-ceramic abrasive particles.

45. A method for making abrasive particles, the method comprising:
heat-treating particles comprising glass, wherein the glass comprises $Al_2O_3$, $Y_2O_3$, and at least one of $ZrO_2$ or $HfO_2$, wherein at least 60 percent by weight of the glass collectively comprises the $Al_2O_3$, $Y_2O_3$, and at least one of $ZrO_2$ or $HfO_2$, and less than 20 percent by weight $SiO_2$ and less than 20 percent by weight $B_2O_3$, based on the total weight of the glass particles, to provide glass-ceramic abrasive particles.

46. A method for making abrasive particles, the method comprising:
heat-treating glass comprising $Al_2O_3$, $Y_2O_3$, and at least one of $ZrO_2$ or $HfO_2$, wherein at least 60 percent by weight of the glass collectively comprises the $Al_2O_3$, $Y_2O_3$, and at least one of $ZrO_2$ or $HfO_2$, and less than 20 percent by weight $SiO_2$ and less than 20 percent by weight $B_2O_3$, based on the total weight of the glass, to provide glass-ceramic; and
converting the glass-ceramic to provide abrasive particles.

47. A method for making abrasive particles, the method comprising:
heat-treating ceramic comprising glass, wherein the glass comprises $Al_2O_3$, $Y_2O_3$, and at least one of $ZrO_2$ or $HfO_2$, wherein at least 60 percent by weight of the glass collectively comprises the $Al_2O_3$, $Y_2O_3$, and at least one of $ZrO_2$ or $HfO_2$, and less than 20 percent by weight $SiO_2$ and less than 20 percent by weight $B_2O_3$, based on the total weight of the glass, to provide glass-ceramic; and
converting the glass-ceramic to provide abrasive particles.

48. A method for making abrasive particles, the method comprising:
heat-treating glass particles comprising $Al_2O_3$, $Y_2O_3$, and at least one of $ZrO_2$ or $HfO_2$, wherein at least 60 percent by weight of the glass collectively comprises the $Al_2O_3$, $Y_2O_3$, and at least one of $ZrO_2$ or $HfO_2$, and less than 40 percent by weight collectively $SiO_2$, $B_2O_3$, and $P_2O_5$, based on the total weight of the glass particles, to provide glass-ceramic abrasive particles.

49. A method for making abrasive particles, the method comprising:
heat-treating particles comprising glass, wherein the glass comprises $Al_2O_3$, $Y_2O_3$, and at least one of $ZrO_2$ or $HfO_2$, wherein at least 60 percent by weight of the glass collectively comprises the $Al_2O_3$, $Y_2O_3$, and at least one of $ZrO_2$ or $HfO_2$, and less than 40 percent by weight collectively $SiO_2$, $B_2O_3$, and $P_2O_5$, based on the total weight of the glass particles, to provide glass-ceramic abrasive particles.

50. A method for making abrasive particles, the method comprising:
heat-treating glass comprising $Al_2O_3$, $Y_2O_3$, and at least one of $ZrO_2$ or $HfO_2$, wherein at least 60 percent by weight of the glass collectively comprises the $Al_2O_3$, $Y_2O_3$, and at least one of $ZrO_2$ or $HfO_2$, and less than 40 percent by weight collectively $SiO_2$, $B_2O_3$, and $P_2O_5$, based on the total weight of the glass, to provide glass-ceramic; and converting the glass-ceramic to provide abrasive particles.

51. A method for making abrasive particles, the method comprising:

heat-treating ceramic comprising glass, wherein the glass comprises $Al_2O_3$, $Y_2O_3$, and at least one of $ZrO_2$ or $HfO_2$, wherein at least 60 percent by weight of the glass collectively comprises the $Al_2O_3$, $Y_2O_3$, and at least one of $ZrO_2$ or $HfO_2$, and less than 40 percent by weight collectively $SiO_2$, $B_2O_3$, and $P_2O_5$, based on the total weight of the glass, to provide glass-ceramic; and converting the glass-ceramic to provide abrasive particles.

52. A method for making abrasive particles, the method comprising:

heat-treating glass particles comprising $Al_2O_3$, $Y_2O_3$, and at least one of $ZrO_2$ or $HfO_2$ to provide the glass-ceramic abrasive particles, wherein the glass-ceramic (a) exhibits a microstructure comprising crystallites having an average crystallite size of less than 1 micrometer, and (b) is free of eutectic microstructure features.

53. A method for making abrasive particles, the method comprising:

heat-treating particles comprising glass, wherein the glass comprises $Al_2O_3$, $Y_2O_3$, and at least one of $ZrO_2$ or $HfO_2$ to provide the glass-ceramic abrasive particles, wherein the glass-ceramic (a) exhibits a microstructure comprising crystallites having an average crystallite size of less than 1 micrometer, and (b) is free of eutectic microstructure features.

54. A method for making abrasive particles, the method comprising:

heat-treating glass comprising $Al_2O_3$, $Y_2O_3$, and at least one of $ZrO_2$ or $HfO_2$ to provide the glass-ceramic, wherein the glass-ceramic (a) exhibits a microstructure comprising crystallites having an average crystallite size of less than 1 micrometer, and (b) is free of eutectic microstructure features; and converting the glass-ceramic to provide abrasive particles.

55. A method for making abrasive particles, the method comprising:

heat-treating ceramic comprising glass, wherein the glass comprises $Al_2O_3$, $Y_2O_3$, and at least one of $ZrO_2$ or $HfO_2$ to provide the glass-ceramic, wherein the glass-ceramic (a) exhibits a microstructure comprising crystallites having an average crystallite size of less than 1 micrometer, and (b) is free of eutectic microstructure features; and converting the glass-ceramic to provide abrasive particles.

56. Abrasive particle comprising a glass-ceramic comprising $Al_2O_3$, $Y_2O_3$, and at least one of $ZrO_2$ or $HfO_2$, wherein the glass-ceramic (a) exhibits a microstructure comprising crystallites having an average crystallite size of less than 200 nanometers and (b) a density of at least 90% of theoretical density.

57. The abrasive particle according to claim 56 comprising at least 90 percent by volume of said ceramic, based on the total volume of said abrasive particle.

58. Abrasive particle comprising a glass-ceramic comprising $Al_2O_3$, $Y_2O_3$, and at least one of $ZrO_2$ or $HfO_2$, wherein the glass-ceramic (a) exhibits a microstructure comprising crystallites, wherein none of the crystallites are greater than 200 nanometers in size and (b) a density of at least 90% of theoretical density.

59. The abrasive particle according to claim 58 comprising at least 90 percent by volume of said ceramic, based on the total volume of said abrasive particle.

60. Abrasive particle comprising a glass-ceramic comprising $Al_2O_3$, $Y_2O_3$, and at least one of $ZrO_2$ or $HfO_2$, wherein the glass-ceramic (a) exhibits a microstructure comprising crystallites, wherein at least a portion of the crystallites are not greater than 150 nanometers in size and (b) a density of at least 90% of theoretical density.

61. The abrasive particle according to claim 60 comprising at least 90 percent by volume of said ceramic, based on the total volume of said abrasive particle.

62. Abrasive particle comprising ceramic comprising at least 75 percent by volume glass-ceramic, the glass-ceramic comprising $Al_2O_3$, $Y_2O_3$, and at least one of $ZrO_2$ or $HfO_2$, wherein the ceramic (a) exhibits a microstructure comprising crystallites having an average crystallite size of less than 200 nanometer, and (b) a density of at least 90% of theoretical density.

63. The abrasive particle according to claim 62 comprising at least 90 percent by volume of said ceramic, based on the total volume of said abrasive particle.

64. Abrasive particle comprising ceramic comprising at least 75 percent by volume glass-ceramic the glass-ceramic comprising $Al_2O_3$, $Y_2O_3$, and at least one of $ZrO_2$ or $HfO_2$, wherein the ceramic (a) exhibits a microstructure comprising crystallites, wherein none of the crystallites are greater than 200 nanometers in size and (b) a density of at least 90% of theoretical density.

65. The abrasive particle according to claim 64 comprising at least 90 percent by volume of said ceramic, based on the total volume of said abrasive particle.

66. Abrasive particle comprising ceramic comprising at least 75 percent by volume glass-ceramic the glass-ceramic comprising $Al_2O_3$, $Y_2O_3$, and at least one of $ZrO_2$ or $HfO_2$, wherein the ceramic (a) exhibits a microstructure comprising crystallites, wherein at least a portion of the crystallites are greater than 150 nanometers in size and (b) a density of at least 90% of theoretical density.

67. The abrasive particle according to claim 66 comprising at least 90 percent by volume of said ceramic, based on the total volume of said abrasive particle.

68. Abrasive particle comprising ceramic comprising at least 75 percent by volume glass-ceramic the glass-ceramic comprising $Al_2O_3$, $Y_2O_3$, and at least one of $ZrO_2$ or $HfO_2$, wherein the ceramic (a) exhibits a microstructure comprising crystallites having an average crystallite size not greater than 200 nanometers in size and (b) a density of at least 90% of theoretical density.

69. The abrasive particle according to claim 68 comprising at least 90 percent by volume of said ceramic, based on the total volume of said abrasive particle.

70. A plurality of abrasive particles having a specified nominal grade, wherein at least a portion of the plurality of abrasive particles comprise alpha $Al_2O_3$, crystalline $ZrO_2$, and a first complex $Al_2O_3.Y_2O_3$, wherein at least one of the alpha $Al_2O_3$, the crystalline $ZrO_2$, or the first complex $Al_2O_3.Y_2O_3$ has an average crystal size not greater than 150 nanometers, and wherein the abrasive particles of the portion have a density of at least 90 percent of theoretical density.

71. An abrasive article comprising a binder and a plurality of abrasive particles, wherein at least a portion of the abrasive particles comprise alpha $Al_2O_3$, crystalline $ZrO_2$, and a first complex $Al_2O_3.Y_2O_3$, and wherein at least one of the alpha $Al_2O_3$, the crystalline $ZrO_2$, or the first complex $Al_2O_3.Y_2O_3$ has an average crystal size not greater than 150 nanometers, and wherein the abrasive particles of the portion have a density of at least 90 percent of theoretical density.

72. A method of abrading a surface, the method comprising:
   providing an abrasive article comprising a binder and a plurality of abrasive particles, wherein at least a portion of the abrasive particles comprise alpha $Al_2O_3$, crystalline $ZrO_2$, and a first complex $Al_2O_3.Y_2O_3$, wherein at least one of the alpha $Al_2O_3$, the crystalline $ZrO_2$, or the first complex $Al_2O_3.Y_2O_3$ has an average crystal size not greater than 150 nanometers, and wherein the abrasive particles of the portion have a density of at least 90 percent of theoretical density;
   contacting at least one of the abrasive particles comprising the alpha $Al_2O_3$, the crystalline $ZrO_2$, and the first complex $Al_2O_3.Y_2O_3$ with a surface of a workpiece; and
   moving at least one of the contacted abrasive particles comprising the alpha $Al_2O_3$, the crystalline $ZrO_2$, and the first complex $Al_2O_3.Y_2O_3$ or the contacted surface to abrade at least a portion of the surface with the contacted abrasive particle comprising the alpha $Al_2O_3$, the crystalline $ZrO_2$, and the first complex $Al_2O_3.Y_2O_3$.

73. A plurality of abrasive particles having a specified nominal grade, wherein at least a portion of the plurality of abrasive particles comprise a first complex $Al_2O_3.Y_2O_3$, a second, different complex $Al_2O_3.Y_2O_3$, and crystalline $ZrO_2$, wherein for at least one of the first complex $Al_2O_3.Y_2O_3$, the second complex $Al_2O_3.Y_2O_3$, or the crystalline $ZrO_2$, at least 90 percent by number of the crystal sizes thereof are not greater than 200 nanometers, and wherein the abrasive particles of the portion have a density of at least 90 percent of theoretical density.

74. An abrasive article comprising a binder and a plurality of abrasive particles, wherein at least a portion of the abrasive particles comprise a first complex $Al_2O_3.Y_2O_3$, a second, different complex $Al_2O_3.Y_2O_3$, and crystalline $ZrO_2$, wherein in such portion, for at least one of the first complex $Al_2O_3.Y_2O_3$, the second complex $Al_2O_3.Y_2O_3$, or the crystalline $ZrO_2$, at least 90 percent by number of the crystal sizes thereof are not greater than 200 nanometers, and wherein the abrasive particles of the portion have a density of at least 90 percent of theoretical density.

75. A method of abrading a surface, the method comprising:
   providing an abrasive article comprising a binder and a plurality of abrasive particles, wherein at least a portion of the abrasive particles comprise a first complex $Al_2O_3.Y_2O_3$, a second, different complex $Al_2O_3.Y_2O_3$, and crystalline $ZrO_2$, wherein in such portion, for at least one of the first complex $Al_2O_3.Y_2O_3$, the second complex $Al_2O_3.Y_2O_3$, or the crystalline $ZrO_2$, at least 90 percent by number of the crystal sizes thereof are not greater than 200 nanometers, and wherein the abrasive particles of the portion have a density of at least 90 percent of theoretical density;
   contacting at least one of the abrasive particles comprising the first complex $Al_2O_3.Y_2O_3$, the second complex $Al_2O_3.Y_2O_3$, and the crystalline $ZrO_2$ with a surface of a workpiece; and
   moving at least one of the contacted abrasive particles comprising the first complex $Al_2O_3.Y_2O_3$, the second complex $Al_2O_3.Y_2O_3$, and the crystalline $ZrO_2$ or the contacted surface to abrade at least a portion of the surface with the contacted abrasive particle comprising the first complex $Al_2O_3.Y_2O_3$, the second complex $Al_2O_3.Y_2O_3$, and the crystalline $ZrO_2$.

76. Glass comprising $Al_2O_3$, $Y_2O_3$, and at least one of $ZrO_2$ or $HfO_2$, wherein at least 80 percent by weight of the glass collectively comprises the $Al_2O_3$, $Y_2O_3$, and at least one of $ZrO_2$ or $HfO_2$, based on the total weight of the glass, wherein the glass has x, y, and z dimensions each perpendicular to each other, and wherein each of the x, y, and z dimensions is at least 5 mm.

77. The glass according to claim 76 collectively comprising at least 80 percent by weight of the $Al_2O_3$, $Y_2O_3$, and $ZrO_2$, based on the total weight of the glass.

78. Ceramic comprising the glass aecordine to claim 76.

79. A method for making glass comprising $Al_2O_3$, $Y_2O_3$, and at least one of $ZrO_2$ or $HfO_2$, wherein at least 80 percent by weight glass collectively comprises the $Al_2O_3$, $Y_2O_3$, and at least one of $ZrO_2$ or $HfO_2$, based on the total weight of the glass, the method comprising:
   melting sources of at least $Al_2O_3$, $Y_2O_3$, and at least one of $ZrO_2$ or $HfO_2$ to provide a melt; and
   cooling the melt to provide the glass, wherein the glass has x, y, and z dimensions each perpendicular to each other, and wherein each of the x, y, and z dimensions is at least 5 mm.

80. A method for making ceramic comprising glass, wherein the glass comprises $Al_2O_3$, $Y_2O_3$, and at least one of $ZrO_2$ or $HfO_2$, wherein at least 80 percent by weight of the glass collectively comprises the $Al_2O_3$, $Y_2O_3$, and at least one of $ZrO_2$ or $HfO_2$, based on the total weight of the glass, wherein class has x, y, and z dimensions each perpendicular to each other, and wherein each of the x, y, and z dimensions is at least 5 mm the method comprising:
   melting sources of at least $Al_2O_3$, $Y_2O_3$, and at least one of $ZrO_2$ or $HfO_2$ to provide a melt; and
   cooling the melt to provide the ceramic.

* * * * *

UNITED STATES PATENT AND TRADEMARK OFFICE
CERTIFICATE OF CORRECTION

PATENT NO. : 7,507,268 B2  Page 1 of 9
APPLICATION NO. : 10/211638
DATED : March 24, 2009
INVENTOR(S) : Anatoly Z. Rosenflanz It is certified that error appears in the above-identified patent and that said Letters Patent is hereby corrected as shown below:

Column Page 3 Col. 1 (Other Publications) – Line 47 - After "5,395,407" delete "A" and insert -- B1 --, therefor.

Column Page 3 Col. 1 (Other Publications) – Line 70 - Delete "Hoffmann" and insert -- Hofmann --, therefor.

Column Page 4 Col. 1 (Other Publications) – Line 11 - Delete "Fundamentsal" and insert -- Fundamentals --, therefor.

Column Page 6 Col. 2 (Other Publications) – Line 37 - Delete "Equilbria" and insert -- Equilibria --, therefor.

Column Page 6 Col. 2 (Other Publications) – Line 41 - Delete "Oaraie" and insert -- Oarai --, therefor.

Column Page 6 Col. 2 (Other Publications) – Line 41 - Delete "Reasearch" and insert -- Research --, therefor.

Column Page 6 Col. 2 (Other Publications) – Line 53 - Delete "AI2103" and insert -- $Al_2O_3$ --, therefor.

Column Page 7 Col. 2 (Other Publications) – Line 13 - Delete "Solidifiction" and insert -- Solidification --, therefor.

Column 3 – Line 40 - Delete "$Y_3AL_5O_{12}$" and insert -- $Y_3Al_5O_{12}$ --, therefor.

Column 3 – Line 42 - Delete "$Al_2O_3.Y_2O_3$" and insert -- $Al_2O_3 \cdot Y_2O_3$ --, therefor.

Column 4 – Line 27 - Delete "$Al_2O_3.Y_2O_3$" and insert -- $Al_2O_3 \cdot Y_2O_3$ --, therefor.

Column 6 – Line 12 (Approx.) - Delete "$Al_2O_3.Y_2O_3$" and insert -- $Al_2O_3 \cdot Y_2O_3$ --, therefor.

Column 6 – Line 22 - Delete "$Al_2O_3.Y_2O_3$" and insert -- $Al_2O_3 \cdot Y_2O_3$ --, therefor.

Column 6 – Line 48 - Delete "$Al_2O_3.Y_2O_3$" and insert -- $Al_2O_3 \cdot Y_2O_3$ --, therefor.

Column 6 – Line 56 - Delete "$Al_2O_3.Y_2O_3$" and insert -- $Al_2O_3 \cdot Y_2O_3$ --, therefor.

UNITED STATES PATENT AND TRADEMARK OFFICE
CERTIFICATE OF CORRECTION

PATENT NO. : 7,507,268 B2
APPLICATION NO. : 10/211638
DATED : March 24, 2009
INVENTOR(S) : Anatoly Z. Rosenflanz It is certified that error appears in the above-identified patent and that said Letters Patent is hereby corrected as shown below:

Column 7 – Line 6-13 - Delete "wherein at least 60 (65, 70, 75, 80, 85, 90, 95, 97, 98, 99, or even 100) percent by volume crystalline ceramic), the crystalline ceramic comprises the $Al_2O_3$, $Y_2O_3$, and at least one of $ZrO_2$ or $HfO_2$, wherein at least 60 (65, 70, 75, 80, 85, 90, 95, 97, 98, 99, or even 100) percent by weight of the crystalline ceramic collectively comprises the $Al_2O_3.Y_2O_3$, and at least one of $ZrO_2$ or $HfO_2$, and less than 20" and insert -- wherein at least 60 (65, 70, 75, 80, 85, 90, 95, 97, 98, 99, or even 100) percent by weight of the crystalline ceramic collectively comprises the $Al_2O_3$, $Y_2O_3$, and at least one of $ZrO_2$ or $HfO_2$, and less than 20 --, therefor.

Column 7 – Line 19 - Delete "$Al_2O_3.Y_2O_3$" and insert -- $Al_2O_3 \bullet Y_2O_3$ --, therefor.

Column 7 – Line 28 - Delete "$Al_2O_3.Y_2O_3$" and insert -- $Al_2O_3 \bullet Y_2O_3$ --, therefor.

Column 7 – Line 53 - Delete "$Al_2O_3.Y_2O_3$" and insert -- $Al_2O_3 \bullet Y_2O_3$ --, therefor.

Column 7 – Line 62 - Delete "$Al_2O_3.Y_2O_3$" and insert -- $Al_2O_3 \bullet Y_2O_3$ --, therefor.

Column 8 – Line 15 - Delete "$Al_2O_3.Y_2O_3$" and insert -- $Al_2O_3 \bullet Y_2O_3$ --, therefor.

Column 8 – Line 23 - Delete "$Al_2O_3.Y_2O_3$" and insert -- $Al_2O_3 \bullet Y_2O_3$ --, therefor.

Column 8 – Line 46 - Delete "$Al_2O_3.Y_2O_3$" and insert -- $Al_2O_3 \bullet Y_2O_3$ --, therefor.

Column 8 – Line 55 - Delete "$Al_2O_3.Y_2O_3$" and insert -- $Al_2O_3 \bullet Y_2O_3$ --, therefor.

Column 9 – Line 14-15 - Delete "$Al_2O_3\ Y_2O_3$" and insert -- $Al_2O_3 \bullet Y_2O_3$ --, therefor.

Column 9 – Line 23 - Delete "$Al_2O_3.Y_2O_3$" and insert -- $Al_2O_3 \bullet Y_2O_3$ --, therefor.

Column 9 – Line 48 - Delete "$Al_2O_3\ Y_2O_3$" and insert -- $Al_2O_3 \bullet Y_2O_3$ --, therefor.

Column 9 – Line 56 - Delete "$Al_2O_3.Y_2O_3$" and insert -- $Al_2O_3 \bullet Y_2O_3$ --, therefor.

Column 10 – Line 5 - Delete "$Al_2O_3.Y_2O_3$" and insert -- $Al_2O_3 \bullet Y_2O_3$ --, therefor.

Column 10 – Line 21 - Delete "$Al_2O_3.Y_2O_3$" and insert -- $Al_2O_3 \bullet Y_2O_3$ --, therefor.

UNITED STATES PATENT AND TRADEMARK OFFICE
CERTIFICATE OF CORRECTION

PATENT NO. : 7,507,268 B2
APPLICATION NO. : 10/211638
DATED : March 24, 2009
INVENTOR(S) : Anatoly Z. Rosenflanz It is certified that error appears in the above-identified patent and that said Letters Patent is hereby corrected as shown below:

Column 10 – Line 36 - Delete "$Al_2O_3.Y_2O_3$" and insert -- $Al_2O_3 \bullet Y_2O_3$ --, therefor.

Column 10 – Line 52 - Delete "$Al_2O_3.Y_2O_3$" and insert -- $Al_2O_3 \bullet Y_2O_3$ --, therefor.

Column 11 – Line 1 - Delete "$Al_2O_3.Y_2O_3$" and insert -- $Al_2O_3 \bullet Y_2O_3$ --, therefor.

Column 11 – Line 17 - Delete "$Al_2O_3.Y_2O_3$" and insert -- $Al_2O_3 \bullet Y_2O_3$ --, therefor.

Column 11– Line 33 - Delete "$Al_2O_3.Y_2O_3$" and insert -- $Al_2O_3 \bullet Y_2O_3$ --, therefor.

Column 11 – Line 49 - Delete "$Al_2O_3.Y_2O_3$" and insert -- $Al_2O_3 \bullet Y_2O_3$ --, therefor.

Column 11 – Line 63 - Delete "$Al_2O_3.Y_2O_3$" and insert -- $Al_2O_3 \bullet Y_2O_3$ --, therefor.

Column 11 – Line 64 - Delete "$Al_2O_3.Y_2O_3$" and insert -- $Al_2O_3 \bullet Y_2O_3$ --, therefor.

Column 12 – Line 7 - Delete "$Al_2O_3.Y_2O_3$" and insert -- $Al_2O_3 \bullet Y_2O_3$ --, therefor.

Column 12 – Line 9 - Delete "$Al_2O_3.REO$" and insert -- $Al_2O_3 \bullet REO$ --, therefor.

Column 12 – Line 11 - Delete "$Al_2O_3.Y_2O_3$" and insert -- $Al_2O_3 \bullet Y_2O_3$ --, therefor.

Column 12 – Line 12 - Delete "$Al_2O_3.Y_2O_3$" and insert -- $Al_2O_3 \bullet Y_2O_3$ --, therefor.

Column 12 – Line 13 - Delete "$Al_2O_3.Y_2O_3$" and insert -- $Al_2O_3 \bullet Y_2O_3$ --, therefor.

Column 12 – Line 14 - Delete "$Al_2O_3.Y_2O_3$" and insert -- $Al_2O_3 \bullet Y_2O_3$ --, therefor.

Column 12 – Line 24 - Delete "$Al_2O_3.Y_2O_3$" and insert -- $Al_2O_3 \bullet Y_2O_3$ --, therefor.

Column 12 – Line 25 - Delete "$Al_2O_3.REO$" and insert -- $Al_2O_3 \bullet Y_2O_3$ --, therefor.

Column 12 – Line 27 - Delete "$Al_2O_3.Y_2O_3$" and insert -- $Al_2O_3 \bullet Y_2O_3$ --, therefor.

Column 12 – Line 28 - Delete "$Al_2O_3.Y_2O_3$" and insert -- $Al_2O_3 \bullet Y_2O_3$ --, therefor.

Column 12 – Line 29 - Delete "$Al_2O_3.Y_2O_3$" and insert -- $Al_2O_3 \bullet Y_2O_3$ --, therefor.

Column 12 – Line 30 - Delete "$Al_2O_3.Y_2O_3$" and insert -- $Al_2O_3 \bullet Y_2O_3$ --, therefor.

UNITED STATES PATENT AND TRADEMARK OFFICE
CERTIFICATE OF CORRECTION

PATENT NO.        : 7,507,268 B2
APPLICATION NO.   : 10/211638
DATED             : March 24, 2009
INVENTOR(S)       : Anatoly Z. Rosenflanz It is certified that error appears in the above-identified patent and that said Letters Patent is hereby corrected as shown below:

Column 12 – Line 41 - Delete "$Al_2O_3.Y_2O_3$" and insert -- $Al_2O_3 \bullet Y_2O_3$ --, therefor.

Column 12 – Line 42 - Delete "$Al_2O_3.REO$" and insert -- $Al_2O_3 \bullet REO$ --, therefor.

Column 12 – Line 45 (Approx.) - Delete "$Al_2O_3.Y_2O_3$" and insert -- $Al_2O_3 \bullet Y_2O_3$ --, therefor.

Column 12 – Line 46 (Approx.) - Delete "$Al_2O_3.Y_2O_3$" and insert -- $Al_2O_3 \bullet Y_2O_3$ --, therefor.

Column 12 – Line 47 (Approx.) - Delete "$Al_2O_3.Y_2O_3$" and insert -- $Al_2O_3 \bullet Y_2O_3$ --, therefor.

Column 12 – Line 48 (Approx.) - Delete "$Al_2O_3.Y_2O_3$" and insert -- $Al_2O_3 \bullet Y_2O_3$ --, therefor.

Column 12 – Line 57 (Approx.) - Delete "$Al_2O_3.REO$" and insert -- $Al_2O_3 \bullet REO$ --, therefor.

Column 13 – Line 20 - Delete "$Al_2O_3$.metal oxide" and insert -- $Al_2O_3 \bullet$ metal oxide --, therefor.

Column 13 – Line 24 (Approx.) - Delete "$Al_2O_3.Y_2O_3$" and insert -- $Al_2O_3 \bullet Y_2O_3$ --, therefor.

Column 13 – Line 27 (Approx.) - Delete "$Al_2O_3.REO$" and insert -- $Al_2O_3 \bullet REO$ --, therefor, Column 13 – Line 43 - After "gadolinium" insert -- oxide --.

Column 13 – Line 48 - After "thulium" insert -- oxide --.

Column 13 – Line 52 - Delete "$Al_2O_3$.metal oxide" and insert -- $Al_2O_3 \bullet$ metal oxide --, therefor.

Column 13 – Line 63 - Delete "$Al_2O_3$.metal oxides" and insert -- $Al_2O_3 \bullet$ metal oxides --, therefor.

Column 16 – Line 20 - Delete "$Al_2O_3$.metal oxides" and insert -- $Al_2O_3 \bullet$ metal oxides --, therefor.

UNITED STATES PATENT AND TRADEMARK OFFICE
CERTIFICATE OF CORRECTION

PATENT NO. : 7,507,268 B2
APPLICATION NO. : 10/211638
DATED : March 24, 2009
INVENTOR(S) : Anatoly Z. Rosenflanz It is certified that error appears in the above-identified patent and that said Letters Patent is hereby corrected as shown below:

Column 16 – Line 29 - Delete "$Y_2O_3$ metal" and insert -- $Y_2O_3 \bullet$ metal --, therefor.

Column 20 – Line 67 - After "conducted" delete "at".

Column 22 – Line 47 - Delete "$Al_2O_3$.metal oxide(s)" and insert -- $Al_2O_3 \bullet$ metal oxide(s) --, therefor.

Column 22 – Line 47 - Delete "$Al_2O_3$.REO" and insert -- $Al_2O_3 \bullet$ REO --, therefor.

Column 22 – Line 48 - Delete "$GdAlO_3$ $LaAlO_3$" and insert -- $GdAlO_3$ and $LaAlO_3$ --, therefor.

Column 22 – Line 50 - Delete "$Al_2O_3.Y_2O_3$" and insert -- $Al_2O_3 \bullet Y_2O_3$ --, therefor.

Column 22 – Line 50 - Delete "$ZrO_2$.REO" and insert -- $ZrO_2 \bullet$ REO --, therefor.

Column 22 – Line 55 - Delete "$Al_2O_3$.metal oxide" and insert -- $Al_2O_3 \bullet$ metal oxide --, therefor.

Column 22 – Line 55 - Delete "$Al_2O_3.Y_2O_3$" insert -- $Al_2O_3 \bullet Y_2O_3$ --, therefor.

Column 22 – Line 58 - Delete "$Al_2O_3.Y_2O_3$" and insert -- $Al_2O_3 \bullet Y_2O_3$ --, therefor.

Column 22 – Line 61 - Delete "$Al_2O_3.Y_2O_3$" and insert -- $Al_2O_3 \bullet Y_2O_3$ --, therefor.

Column 23 – Line 7 - Delete "$Al_2O_3$.metal oxide" and insert -- $Al_2O_3 \bullet$ metal oxide --, therefor.

Column 23 – Line 7 - Delete "$Al_2O_3$.REO" and insert -- $Al_2O_3 \bullet$ REO --, therefor.

Column 23 – Line 9 - Delete "$Al_2O_3$.REO" and insert -- $Al_2O_3 \bullet$ REO --, therefor.

Column 23 – Line 12 - Delete "$Al_2O_3$.REO" and insert -- $Al_2O_3 \bullet$ REO --, therefor.

Column 24 – Line 13 - Delete "$Al_2O_3$ metal" and insert -- $Al_2O_3 \bullet$ metal --, therefor.

Column 24 – Line 14 - Delete "$Al_2O_3$ $Y_2O_3$" and insert -- $Al_2O_3 \bullet Y_2O_3$ --, therefor.

Column 28 – Line 5-23 - Delete "Producers....JIS8-220." and insert the same on Col. 28, Line 4 after "European" as a continuation of the paragraph.

UNITED STATES PATENT AND TRADEMARK OFFICE
CERTIFICATE OF CORRECTION

PATENT NO.      : 7,507,268 B2
APPLICATION NO. : 10/211638
DATED           : March 24, 2009
INVENTOR(S)     : Anatoly Z. Rosenflanz It is certified that error appears in the above-identified patent and that said Letters Patent is hereby corrected as shown below:

Column 28 – Line 15 - After "P1000," insert -- and --.

Column 28 – Line 18 - Delete "JIS524" and insert -- JIS24 --, therefor.

Column 28 – Line 20 - Delete "J280" and insert -- JIS280 --, therefor.

Column 31 – Line 12 - Delete "tetrachloronaphtalene" and insert -- tetrachloronaphthalene --, therefor.

Column 31 – Line 15 - Delete "tetrafluoroboate" and insert -- tetrafluoroborate --, therefor.

Column 35 – Line 45 - Delete "ziconia" and insert -- zirconia --, therefor.

Column 35 – Line 46 - After "the" insert -- trade --.

Column 36 – Line 44 (Approx.) - Delete "Tuscon" and insert -- Tucson --, therefor.

Column 37 – tine 56 (Approx.) - Delete "$T_g$" and insert -- $T_x$ --, therefor.

Column 38 – Line 5 - In Claim 1, delete "$Al_3O_3$" and insert -- $Al_2O_3$ --, therefor.

Column 38 – Line 20 - In Claim 4, delete "class" and insert -- glass --, therefor.

Column 38 – Line 34 - In Claim 5, delete "class" and insert -- glass, --, therefor.

Column 38 – Line 35 - In Claim 5, after "sources" insert -- of --.

Column 43 – Line 19 - In Claim 36, delete "comprising" and insert -- comprises --, therefor.

Column 46 – Line 18 - In Claim 62, delete "nanometer," and insert -- nanometers --, therefor.

Column 46 – Line 24 (Approx.) - In Claim 64, after "ceramic" insert -- , --.

Column 46 – Line 34 (Approx.) - In Claim 66, after "ceramic" insert -- , --.

Column 46 – Line 37 (Approx.) - In Claim 66, after "are" insert -- not --.

UNITED STATES PATENT AND TRADEMARK OFFICE
CERTIFICATE OF CORRECTION

PATENT NO. : 7,507,268 B2
APPLICATION NO. : 10/211638
DATED : March 24, 2009
INVENTOR(S) : Anatoly Z. Rosenflanz It is certified that error appears in the above-identified patent and that said Letters Patent is hereby corrected as shown below:

Column 46 – Line 45 - In Claim 68, after "ceramic" insert -- , --.

Column 46 – Line 49 - In Claim 68, delete "nanometers" and insert -- nanometer, --, therefor, Column 46 – Line 57 - In Claim 70, delete "$Al_2O_3.Y_2O_3$" and insert -- $Al_2O_3 \bullet Y_2O_3$ --, therefor.

Column 46 – Line 59 - In Claim 70, delete "$Al_2O_3.Y_2O_3$" and insert -- $Al_2O_3 \bullet Y_2O_3$ --, therefor.

Column 46 – Line 65 - In Claim 71, delete "$Al_2O_3.Y_2O_3$" and insert -- $Al_2O_3 \bullet Y_2O_3$--, therefor.

Column 46 – Line 66 - In Claim 71, delete "$Al_2O_3.Y_2O_3$" and insert -- $Al_2O_3 \bullet Y_2O_3$ --, therefor.

Column 47 – Line 8 - In Claim 72, delete "$Al_2O_3.Y_2O_3$" insert -- $Al_2O_3 \bullet Y_2O_3$ --, therefor.

Column 47 – Line 10 - In Claim 72, delete "$Al_2O_3.Y_2O_3$" and insert -- $Al_2O_3 \bullet Y_2O_3$ --, therefor.

Column 47 – Line 16 - In Claim 72, delete "$Al_2O_3.Y_2O_3$" and insert -- $Al_2O_3 \bullet Y_2O_3$ --, therefor.

Column 47 – Line 19 - In Claim 72, delete "$Al_2O_3.Y_2O_3$" and insert -- $Al_2O_3 \bullet Y_2O_3$ --, therefor.

Column 47 – Line 22 - In Claim 72, delete "$Al_2O_3.Y_2O_3$" and insert -- $Al_2O_3 \bullet Y_2O_3$ --, therefor.

Column 47 – Line 25 - In Claim 73, delete "$Al_2O_3.Y_2O_3$" and insert -- $Al_2O_3 \bullet Y_2O_3$ --, therefor.

Column 47 – Line 26 - In Claim 73, delete "$Al_2O_3.Y_2O_3$" and insert -- $Al_2O_3 \bullet Y_2O_3$ --, therefor.

UNITED STATES PATENT AND TRADEMARK OFFICE
CERTIFICATE OF CORRECTION

PATENT NO. : 7,507,268 B2
APPLICATION NO. : 10/211638
DATED : March 24, 2009
INVENTOR(S) : Anatoly Z. Rosenflanz It is certified that error appears in the above-identified patent and that said Letters Patent is hereby corrected as shown below:

Column 47 – Line 27 - In Claim 73, delete "$Al_2O_3.Y_2O_3$" and insert -- $Al_2O_3 \cdot Y_2O_3$ --, therefor.

Column 47 – Line 28 - In Claim 73, delete "$Al_2O_3.Y_2O_3$" and insert -- $Al_2O_3 \cdot Y_2O_3$ --, therefor.

Column 47 – Line 35 - In Claim 74, delete "$Al_2O_3.Y_2O_3$" and insert -- $Al_2O_3 \cdot Y_2O_3$ --, therefor.

Column 47 – Line 36 - In Claim 74, delete "$Al_2O_3.Y_2O_3$" and insert -- $Al_2O_3 \cdot Y_2O_3$ --, therefor.

Column 47 – Line 38 - In Claim 74, delete "$Al_2O_3.Y_2O_3$" and insert -- $Al_2O_3 \cdot Y_2O_3$ --, therefor.

Column 47 – Line 38 - In Claim 74, delete "$Al_2O_3.Y_2O_3$" and insert -- $Al_2O_3 \cdot Y_2O_3$ --, therefor.

Column 47 – Line 49 - In Claim 75, delete "$Al_2O_3.Y_2O_3$" and insert -- $Al_2O_3 \cdot Y_2O_3$ --, therefor.

Column 47 – Line 49 - In Claim 75, delete "$Al_2O_3.Y_2O_3$" and insert -- $Al_2O_3 \cdot Y_2O_3$ --, therefor.

Column 47 – Line 51 - In Claim 75, delete "$Al_2O_3.Y_2O_3$" and insert -- $Al_2O_3 \cdot Y_2O_3$ --, therefor.

Column 48 – Line 1 - In Claim 75, delete "$Al_2O_3.Y_2O_3$" and insert -- $Al_2O_3 \cdot Y_2O_3$ --, therefor.

Column 48 – Line 7 - In Claim 75, delete "$Al_2O_3.Y_2O_3$" and insert -- $Al_2O_3 \cdot Y_2O_3$ --, therefor.

Column 48 – Line 8 - In Claim 75, delete "$Al_2O_3.Y_2O_3$" and insert -- $Al_2O_3 \cdot Y_2O_3$ --, therefor.

Column 48 – Line 11 - In Claim 75, delete "$Al_2O_3.Y_2O_3$" and insert -- $Al_2O_3 \cdot Y_2O_3$ --, therefor.

UNITED STATES PATENT AND TRADEMARK OFFICE
CERTIFICATE OF CORRECTION

PATENT NO. : 7,507,268 B2
APPLICATION NO. : 10/211638
DATED : March 24, 2009
INVENTOR(S) : Anatoly Z. Rosenflanz It is certified that error appears in the above-identified patent and that said Letters Patent is hereby corrected as shown below:

Column 48 – Line 12 - In Claim 75, delete "$Al_2O_3.Y_2O_3$" and insert -- $Al_2O_3 \cdot Y_2O_3$ --, therefor.

Column 48 – Line 15 - In Claim 75, delete "$Al_2O_3.Y_2O_3$" and insert -- $Al_2O_3 \cdot Y_2O_3$ --, therefor.

Column 48 – Line 16 - In Claim 75, delete "$Al_2O_3.Y_2O_3$" and insert -- $Al_2O_3 \cdot Y_2O_3$ --, therefor.

Column 48 – Line 27 - In Claim 78, delete "aecordine" and insert -- according --, therefor.

Column 48 – Line 30 - In Claim 79, after "weight" insert -- of the --.

Column 48 – Line 30 - In Claim 79, delete "$Y_2O_3$,and" and insert -- $Y_2O_3$, and --, therefor.

Column 48 – Line 44 - In Claim 80, delete "class" and insert -- glass --, therefor.

Signed and Sealed this

First Day of December, 2009

David J. Kappos
*Director of the United States Patent and Trademark Office*